United States Patent
Becker et al.

(10) Patent No.: US 8,165,054 B2
(45) Date of Patent: Apr. 24, 2012

(54) MULTICAST SERVICE PROVISION IN A MOBILE COMMUNICATION SYSTEM HAVING OVERLAPPING POOL AREAS

(75) Inventors: Ralf Becker, Neu-Isenburg (DE); Osvaldo Gonsa, Frankfurt (DE)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 12/445,925

(22) PCT Filed: Oct. 9, 2007

(86) PCT No.: PCT/EP2007/008766
§ 371 (c)(1),
(2), (4) Date: May 27, 2009

(87) PCT Pub. No.: WO2008/046540
PCT Pub. Date: Apr. 24, 2008

(65) Prior Publication Data
US 2010/0322128 A1   Dec. 23, 2010

(30) Foreign Application Priority Data

Oct. 17, 2006 (EP) .................................. 06021776
Mar. 22, 2007 (EP) .................................. 07005938
Apr. 23, 2007 (EP) .................................. 07008246

(51) Int. Cl.
*H04W 20/71* (2009.01)
*H04W 4/00* (2009.01)
*H04H 1/00* (2006.01)

(52) U.S. Cl. ..................... 370/312; 370/331; 455/3.01

(58) Field of Classification Search .......... 370/252–338; 709/206; 340/539.13; 375/E7.012; 713/162, 713/163; 348/729; 455/3.01–3.06; 707/39, 707/40
See application file for complete search history.

(56) References Cited

U.S. PATENT DOCUMENTS

2007/0155401 A1* 7/2007 Ward et al. ................. 455/456.1
2007/0182547 A1* 8/2007 Wachter et al. .......... 340/539.13

OTHER PUBLICATIONS

3GPP TR 25.912 V7.0.0, Technical Specification Group Radio Access Network. pp. 1-57, Jun. 2006.*
International Search Report dated Apr. 3, 2008.
3GPP TR 25.912 V7.0.0, (Jun. 2006); Technical Specification Group Radio Access Network; Feasibility study for evolved Universal Terrestrial Radio Access (UTRA) and Universal Terrestrial Radio Access-Network (UTRAN) (Release 7) Jun. 2006, pp. 1-57.

(Continued)

*Primary Examiner* — Afsar M. Qureshi
(74) *Attorney, Agent, or Firm* — Dickinson Wright PLLC

(57) ABSTRACT

A method and apparatus for establishing a user plane between a user plane entity and different access nodes assigned to different pool areas simultaneously for multicast or broadcast service provision. The method includes receiving at a respective access node assigned to the different pool areas simultaneously plural session start messages indicating different user plane entities of the different pool areas, selecting by the respective access node one user plane entity out of the indicated user plane entities indicated in the session start messages based on a selection rule common to all access nodes assigned to the different pool areas simultaneously, the selection rule ensuring that the access nodes assigned to different pool areas simultaneously select the same user plane entity out of one of the different pool areas, and establishing by the access nodes a respective user plane to the same selected user plane entity.

20 Claims, 25 Drawing Sheets

OTHER PUBLICATIONS

3GPP TS 23.236 V6.3.0 (Mar. 2006); Technical Specification 3rd Generation Partnership Project; Technical Specification Group Services and System Aspects; Intra-domain connection of Radio Access Network (RAN) nodes to multiple Core Network (CN) nodes (Release 6), Mar. 2006, pp. 1-37.

Technical Specification Group Radio Access Network: 3GPP TR R3.018 V0.1.0: Evolved UTRA and UTRAN; Radio Access Architecture and Interfaces (Release 7), 3rd Generation Partnership Project, (Jan. 2006), XP002416232, Jan. 2006, pp. 1-18.

Technical Specification Group Radio Access Network: 3GPP TR R3.018 V0.4.1: Evolved UTRA and UTRAN; Radio Access Architecture and Interfaces (Release 7), 3rd Generation Partnership Project, (May 2006), XP002416232, May 2006, pp. 1-67.

Technical Specification Group Radio Access Network: 3GPP TR R3.018 V0.7.0: Evolved UTRA and UTRAN; Radio Access Architecture and Interfaces (Release 7), 3rd Generation Partnership Project, (Oct. 2006), XP002416232, Oct. 2006, pp. 1-138.

* cited by examiner

MULTICAST SERVICE PROVISION IN A MOBILE COMMUNICATION SYSTEM HAVING OVERLAPPING POOL AREAS

FIELD OF THE INVENTION

One aspect of the invention relates to the establishment of a user plane between a user plane entity and different access nodes assigned to different pool areas simultaneously for multicast or broadcast service provision.

Another aspect of the invention relates to a method for ensuring service continuity of a multicast service received by a mobile terminal from an access node, wherein the access node is assigned to a first and at least a second pool area simultaneously. Further, the invention relates to the different entities of a communication network, such as a mobile terminal, a mobility management entity, a user plane entity and an access node.

DESCRIPTION OF THE RELATED ART

For mobile communications systems it is generally required that a mobile terminal first attaches to/registers with the network before being able to receive desired services. This attachment/registration usually comprises authentication and authorization of the mobile terminal in the network and is often referred to as "network attachment". For each mobile terminal attaching/registering with the network context state information and signaling messages are generated at the network entity handling the network attach. So obviously each mobile terminal creates some load at this entity. Of course there is an upper bound for the load a specific network entity can process, resulting in an upper bound regarding the number of mobile terminals such an entity can handle. Therefore, it might be required to spread the load caused by the mobile terminals across several network entities.

Generally mobile communications systems can be split into logically separated parts providing dedicated functionalities. These parts are usually called core network (CN) and access network (AN) with several access nodes. Particularly for wireless mobile communications systems the latter part is usually referred to as radio access network (RAN).

Typically the network entities handling the network attach functionality are located in the core network of the mobile communications system. Entities in the radio access network and core network utilize defined interfaces to communicate between each other. In order to allow a distribution of the load caused by the mobile terminals across several core network entities, each radio access network entity handling the radio connection with the mobile terminal has to have a relation (i.e. interface) to a plurality of core network entities. As there are several radio access network entities deployed in a mobile communications system, this results in a many-to-many relation between the core network entities and the radio access network entities (see for example 3GPP TR 25.912, "Feasibility study for evolved Universal Terrestrial Radio Access (UTRA) and Universal Terrestrial Radio Access Network (UTRAN)", version 7.0.0, and being incorporated herein by reference).

Considering the deployment of a mobile communications system in a large area, e.g. a whole country, it becomes obvious that a many-to-many relation might not exist between all radio access network entities and all core network entities. As transport network connectivity may be regionally restricted, e.g. due to security reasons or due to other network operational reason, only a subset of all radio access network entities might have an interface to a subset of all core network entities. All those entities with an interface between them can be considered as being part of a logic region within the entire mobile communications network, which is typically called pool area. Taking into account network deployment aspects, such a pool area consists of a number of radio access network entities, which are geographically related to one or several core network entities and where an interface exits between each entity of that pool area. Further, considering network deployment aspects it could be the case that different pool areas overlap each other (see for example 3GPP TR R3.018, "Evolved UTRA and UTRAN; Radio Access Architecture and Interfaces", version 0.4.1, and being incorporated herein by reference).

This might be required in order to avoid excessive signaling, which would occur when a mobile terminal is moving along a hard border between different pool areas. In such a case the mobile would frequently switch the association from one to the other pool area due to varying signal strengths received from the respective radio access network entities. Such a switch of association might require some signaling to update context state information maintained in the network. The deployment of overlapping pool areas introduces some kind of hysteresis for this kind of procedure avoiding the need for frequent updating of the context state information.

Another aspect for configuring overlapping pool areas is the possibility to separate the overall load according to different terminal moving pattern, e.g. considering multiple pool areas where each covers a separate residential area and all cover the same city centre (see for example 3GPP TS 23.236, "Intra-domain connection of Radio Access Network (RAN) nodes to multiple Core Network (CN) nodes", version 6.3.0, and being incorporated herein by reference).

Taking into account above considerations a solution to spread the load caused by the mobile terminals across several core network entities is that on network attach a radio access network node randomly selects one of the core network entities of its pool area (to which it has an interface) and forwards the network attach request to this entity. When considering multiple mobile terminals this might result in the situation that two or more terminals connected to the same radio access network entity (access node) are assigned to different core network entities, which additionally could be part of different pool area in case the radio access network entity is located in an overlapping pool area. Each UE perform network attachment with their assigned core network entity. Eventually the (individually) requested services are delivered from different core network entities (of possibly different pool areas) via the same radio access network entity to the mobile terminals. FIG. 1 exemplifies the concept of overlapping pool areas and the distribution of the mobile terminals across several core network entities.

Another concept in the development of 3GPP-based systems is the concept of having tracking areas (TAs). The target of this concept is to limit the amount of signaling (e.g. resulting from mobility) and required context information stored in the network for user equipments in the so-called idle state (or idle mode). The tracking area comprises a number of access nodes (base stations), within which the mobile terminals in idle states can move without the need to update their location at the core network entities. In 3GPP TR R3.018 "Evolved UTRA and UTRAN; Radio Access Architecture and Interfaces", version 0.7.0 (incorporated herein by reference) two alternative tracking area concepts exist: overlapping tracking area and multi-tracking registration.

Regarding overlapping tracking areas an access node of the radio access network (e.g. eNodeB) is assigned to one or more tracking areas, i.e. might broadcast multiple tracking area identifiers (TA-IDs) in its cells. Using this concept a mobile terminal is always assigned to a single tracking area. The mobile terminal may update its location at the core network entities only in case it selects an eNodeB that does not broadcast its current TA-ID.

Regarding multi-TA registration an eNodeB is always assigned to a single tracking area, i.e. broadcasts only a single TA-ID in its cells. Using this concept a mobile terminal could be assigned to multiple tracking areas in parallel. In this case the mobile terminal updates its location at the core network entities, when it selects an eNodeB that does not broadcast any of the TA-IDs the mobile terminal is currently assigned to.

Generally, utilization of the concepts for pool area and tracking area are independent of each other. However, it may be assured for simplicity that a pool area always contains complete tracking area(s). FIG. 14 and FIG. 15 show the relation between mobility management entity/user plane entity pool areas and the different tracking area concepts.

Several mobility management entity or user plane entity functional entities are part of a mobility management entity pool or user plane entity pool respectively. All entities within a pool are configured to handle the same set of access nodes (here eNodeBs). The area covered by these access nodes are referred to as the pool area, within which a mobile terminal may move without the need to change an assigned core network entity (mobility management entity or user plane entity). Overlapping pool areas may be created when entities in different pools are configured to handle (partly) same set of access nodes.

As mentioned above, pool areas should contain complete tracking area(s). Depending on the used tracking area concept this results in different implications regarding the overlapping area, which are depicted in FIG. 14 and FIG. 15. Using the overlapping tracking area concept, some tracking areas will extend from access nodes in the non-overlapping part to the overlapping part of a pool area. On the other hand, for multi-tracking area registration concept the resulting situation will be that the overlapping part of a pool area consists of complete tracking area(s). This means there is a hard tracking area border between the non-overlapping and the overlapping part of a pool area.

The invention is inter alfa related to the provisioning of multicast services in cellular mobile communications networks. Such types of networks are usually designed to support terminal mobility in a highly efficient and secure way (e.g. efficient management of network resources and radio resources, establishment of and use of secure communication channels). In order to realize this, usually a tunnel-based scheme is adopted using protocols like Mobile IP standardized in IETF or GPRS Tunneling Protocol (GTP) as standardized in 3GPP. These kind of tunneling protocols efficiently and securely support point-to-point communications services like Voice over IP (VoIP). However, they usually do not inherently support point-to-multipoint services like multicast or broadcast.

In order to allow efficient support for multicast or broadcast services specific extensions the tunneling protocols and network architectures have to be made. For example the 3GPP Rel-6 Multimedia Broadcast/Multicast Service (MBMS) represents such an extension for the UMTS architecture.

Traditionally (also in 3GPP SAE/LTE systems) the cellular networks are split into a control plane (also denoted C-plane) handling all control information and procedures and a user plane (also denoted U-Plane) handling the actual user data traffic, which also applies for the multicast architecture. The invention assumes that the multicast control plane can be handled by all core network control plane entities, which are assigned to the mobile terminals during network attachment or mobility. With respect to the SAE/LTE system the Mobility Management Entity (MME) performs the core network control plane functionality. For exemplary purposes all MMEs that also contain multicast management functionality may be referred to as a Multicast-MME (M-MME). On the other hand, for the SAE/LTE system the core network user plane functionality is contained in the User Plane Entity (UPE). It is assumed that each UPE also provides user plane functionality for a multicast service and may be referred to as a Multicast-UPE (M-UPE), if it is selected by an M-MME to handle the multicast service data. Further, depending on the pool area size and/or MME(s)/UPE(s) capability, at least one M-UPE per pool area may be selected for a multicast service. From the perspective of a mobile terminal, the M-MME is the same MME as assigned during network attach or mobility. Thereby, it may be possible that the M-UPE serving point-to-multipoint (p-t-m) services is different from the UPE assigned for point-to-point (p-t-p) services. However, for multicast services there is no direct relation between the mobile terminal and the M-UPE, i.e. the terminal does not maintain a user plane bearer to the M-UPE. In fact the multicast service data is delivered from the M-UPE to the access nodes (eNodeBs), which broadcast the data to all mobile terminals present in their respective service area. E.g. IP multicast transport may be utilized in the network between the M-UPE and access nodes for transmission of the multicast service data.

The functional slit in user plane and control plane and an exemplary resulting scenario configuration of user plane and control plane for two mobile terminals that attach to an access node assigned to two pool areas simultaneously is shown in FIG. 2. The two mobile terminals, UE #1 and UE #2 are both attached to the same access node (eNode B) that is located in an overlapping part of pool areas #1 and #2. While UE #1 is assigned to pool area #1 and thus served by core network entities of this pool area, UE #2 is assigned to pool area #1 and thus served by core network entities of pool area #2. Accordingly, the control plane is provided between UE #1 and one of the MMEs in pool area #1, while for UE #2 the control plane is provided between UE #2 and a MME in pool area #2. Similarly, both mobile terminals would receive multicast service data via a user plane established in pool area #1 and pool area #2 respectively.

FIG. 3 shows an exemplary multicast architecture for the 3GPP SAE/LTE system taking into account overlapping pool areas based on which potential drawbacks of existing solutions on providing multicast services to users will be outlined. In this exemplary communication system, it may be assumed for exemplary purposes that the two pool areas are provided, pool area #1 and pool area #2.

For simplicity, it is assumed that data of a multicast service is provided via a single user plane entity in a respective pool area. However, it is of course also possible to have more than one user plane entity providing multicast service data to the respective access nodes (here eNodeBs) of a pool area. Hence, one user plane entity M-UPE #1 is provided in pool area #1 and one user plane entity M-UPE #2 is provided in pool area #2. Further, the control plane for the mobile terminals attached to the access nodes of a pool area may be established to several mobility management entities in a respective pool area, i.e. M-MME #10, M-MME #11 and M-MME #12 in pool area #1 and M-MME #20, M-MME #21 and M-MME #22 in pool area #2. For exemplary purposes a BM-SC (Broadcast/Multicast Service Center) is shown which could be the source of the multicast service to be provided to mobile terminals in the two pool areas.

Similar to the system shown in FIG. 1, it may be further assumed for exemplary purposes that the core network entities, i.e. the mobility management entities and the user plane entity of a respective pool area are interconnected via interfaces for communication and signaling. Further, the core network entities may also be connected to the different access nodes assigned to each pool area.

In the exemplary embodiment shown in FIG. 3, it is assumed that there are one or more access nodes (eNodeB#1) assigned to only pool area #1, one or more access nodes (eNodeB#2) assigned to pool area #1 and pool area #2 and one or more access nodes (eNodeB#3) assigned to pool area #2.

As already discussed two or more mobile terminals connected to the same base station in an overlapping pool area might be assigned to different core network control plane entities, which might additionally belong to different pool areas. Regarding the multicast architecture depicted in FIG. 4 it might therefore happen that UEs (UE#1 and UE#2) connected to the same base station (eNodeB#2) in an overlapping pool area, activate the same multicast service at different M-MMEs (M-MME #10 and M-MME #20) located in different pool areas (Pool Area #1 and Pool Area #2).

Receiving this multicast service activation request from the mobile terminals, each M-MME registers 401 at an M-UPE in its own pool area configuring multicast user plane parameters (including for example a private IP multicast address for distribution of the multicast service data). When triggered by the multicast server (e.g. the BM-SC) each M-MME having received a multicast service activation request sends 402 a session start message to all access nodes (base stations/eNodeBs) in its pool area including the multicast user plane configuration so as to trigger the establishment of the user plane in its pool area. This might comprise a multicast (MC) service identifier (e.g. TMGI) and the configured private IP multicast address.

Generally, an access node receiving a session start message for a multicast service checks, if there are mobile terminals requiring that service. For mobile terminals in active mode the access node might be able to derive this information from the stored context information of a respective mobile terminal (UE context information). For mobile terminals in idle mode, which are supposed to be unknown to the access nodes, it might trigger some kind of paging procedure, e.g. sometimes also called counting, to gain the required information about mobile terminals interested in the multicast service. The access node would only establish a multicast user plane, when it detects that there are mobile terminals present that require the multicast service. In case there are no such mobile terminals, the access node would reject all session start messages, e.g. using a NACK message with an appropriate cause.

Obviously, in the scenario discussed here, the access node in the overlapping pool area receives multiple session start messages for the same multicast service, which can be identified using the multicast service identifier (e.g. TMGI). The session start messages received from different pool areas contain different user plane configurations (i.e. different IP multicast addresses). The session start messages all refer to the same multicast service (containing the same service data), but the access node needs to receive the service data only once. Therefore, the access node selects one of the provided multicast user plane configurations and informs 403, 404 the respective M-MMEs from which it received the multicast session start messages about its decision, e.g. using ACK and NACK messages respectively. This results in establishment of a multicast user plane only to one of the pool areas avoiding duplicate user planes for the same multicast service, which would represent a waste of network resources.

In the system above a strict separation of control plane and user plane functionality between M-MME and M-UPE has been assumed. However, regarding multicast services another option is that there is a separation of terminal-based and session-based control procedures between M-MME and M-UPE. On the one hand, terminal-based control comprises all procedures that are triggered individual from/for each service participating terminal, e.g. service activation or de-activation procedures. On the other hand, session-based control comprises all procedures that are triggered for the entire service session commonly affecting all terminals, e.g. session start or stop procedures. With respect to above multicast service architecture this would imply that session start/stop messages are rather sent by M-UPEs then M-MMEs. However, also for this variant the same scenario, i.e. reception of multiple session start messages for the same multicast service, exists regarding access nodes in overlapping pool areas. In this case the access node would receive the multiple session start messages from different M-UPEs in different pool areas.

Considering above service scenario, there could be the case that all mobile terminals attached to the pool area to which the multicast user plane was established no longer receive the service in that pool area. For example they might deactivate the service, detach from the network, move to a different pool area or the like. In any case this would result in the removal of their context state information from their attached M-MME. If an M-MME detects that it no longer hosts any terminal for a particular service, e.g. when the last context is removed, it de-registers from the M-UPE. Further, the M-MME also sends a deregistration message to all the access nodes in its pool area which previously established a multicast user plane, i.e. from which it received an ACK message in response to a session start message. Obviously this also comprises the access node in the overlapping pool area. An access node receiving such a deregistration message from a M-MME leaves the private IP multicast transmission, which eventually terminates the multicast user plane to the M-UPE in its pool area. However, as discussed above, regarding the access node in the overlapping pool area there might be terminals present which initially activated the multicast service in different pool areas. So, terminating the user plane to the access node in the overlapping pool area because of terminals attached one pool area, results in loss of the multicast service for the remaining terminals attached to the other pool area.

FIG. 5 depicts this situation. In this example the mobile terminal UE #1 attached to pool area #1 no longer receives the multicast service. As this terminal is the last mobile terminal in pool area #1 which activated the multicast service, its serving M-MME #10 de-registers 501 from M-UPE #1 to which the user plane for the multicasts service has been established and sends 502 a deregistration message to the access nodes (eNodeB #1 and eNodeB #2) which established a multicast user plane for the multicast service so as to release the respective user planes. However, when the access node (eNodeB #2) in an overlapping pool area terminates the multicast user plane, the mobile terminals attached to pool area #2, e.g. UE #2 can no longer receive the multicast service.

Another problem that may occur in a network with overlapping pool area regions is exemplarily illustrated in the following referring to FIGS. 22 and 23. Similar to FIG. 3 exemplary network architecture for the 3GPP SAE/LTE system comprising two overlapping pool areas is assumed in this scenario. It may be assumed that all M-MMEs located in a pool area choose the same M-UPE and register there for an MBMS service provided from the BM-SC. Accordingly, the M-MMEs in pool area #1 and in pool area #2 will select M-UPE#1 and M-UPE#2, respectively. The user plane entities located in different pool areas typically utilize different private IP multicast addresses for distribution of the same multicast service within the respective pool area. This private IP multicast address is provided to the eNode Bs within session start messages from M-MMEs of the respective pool area. This is illustrated in FIG. 22 by the dashed arrows from the MMEs to the respective eNode Bs in pool area #1 and pool area #2. The different style of the arrows indicates that the session start messages of the MMEs of pool area #1 and the MMEs of pool area #2 indicate different private IP multicast addresses and identify different UPEs of the pool areas, i.e. M-UPE#1 and M-UPE#2, respectively.

The eNodeBs #3, #4 and #5 located in overlapping region of the pool areas therefore receive multiple session start messages for the same service containing different configurations, i.e. indicating different UPEs to which a user plane should established. All eNodeBs #3, #4 and #5 in the overlapping part of the pool areas independently choose one UPE from multiple session start messages and join the selected private IP multicast address of this selected UPE. Hence, the eNodeBs #3, #4 and #5 in the overlapping part of the pool areas potentially select different UPEs located in different pool areas to provide the multicast service.

This may however result in an inefficient utilization of transmission network resources for distribution of the multicast service to eNodeBs #3, #4 and #5 located in the overlapping areas.

FIG. 23 exemplarily illustrates the established user planes via intermediate hops (such as intermediate switches, hubs, routers, etc.) for a scenario where different UPEs have been chosen by the eNode Bs in the overlapping region of the pool areas for providing the service. As illustrated in FIG. 23, multiple (e.g. two) multicast distribution trees would be established to the overlapping area distributing same content. eNodeBs #4 and #5 which is assumed having selected M-UPE#1 will received the service data through a user plane in pool area #1, while eNodeB #3 which is assumed having selected M-UPE#2 will received the service data through a user plane in pool area #2. In the transmission network between the UPEs and the eNodeBs in the overlapping region of the pool areas, this results in unnecessarily increased allocation of resources. For example, some links in the user planes are part of both user planes, i.e. the same content is distributed on this link twice. Apparently a single distribution tree would be sufficient to provide the service content to all eNodeBs in the overlapping part of the pool areas. The inefficiency of resource utilization might increase with the number of pool areas that overlap, as this might result in even further distribution trees for the same content.

BRIEF SUMMARY OF THE INVENTION

One object of the invention is to suggest a mechanism that facilitates efficient resource utilization in the distribution of service data to access nodes (e.g. eNode Bs) that are located in an overlapping region of pool areas.

Another object of the invention is to enable service continuity of a multicast service received by a mobile terminal in a communication network where access nodes may be assigned to several pool areas simultaneously. Another object of the invention is to improve the management of the user plane in a communication network, where access nodes may be assigned to several pool areas simultaneously.

At least one of these objects is solved by the subject matter of the independent claims.

Advantageous embodiments are subject to the dependent claims.

One aspect of the invention is to ensure the selection of a single user plane entity to provide the user plane for a service to the access nodes located in a network region where two or more pool areas overlap each other. Thereby, the selection may be made irrespective of the actual assignment of the user plane entity to a particular pool area. The selection of a common user plane entity to provide the user plane for the overlapping pool areas may be realized in different fashions.

One possibility is to ensure that the access nodes in the overlapping part of different pool areas select the same user plane entity if they receive session start messages indicating user plane entities of the different pool areas. This may be for example realized by the access nodes individually processing the received session start messages according to a selection rule that leads to all access nodes selecting the same user plane entity for the user plane of the service.

Alternatively, the user plane entity to provide the user plane may be "pre-selected" by the mobility management entities of the different pool areas that overlap. Accordingly, the messages asking the access nodes in the overlapping part of the pool area to establish a user plane for a service will only indicate a single user plane entity so that no selection of different user plane entities by the access nodes is possible.

Another aspect of the invention is to ensure service continuity of a multicast service received by a mobile terminal. For example, in case an access node may establish a user plane for a multicast service to either one of two pool areas (i.e. is assigned to either one of the pool areas simultaneously), it is proposed that mobility management entity may register for the multicast service at a user plane entity. Thereby, the registration of the mobility management entity is independent of the mobility management entity's actual pool area. Hence, the mobility management entity of a first pool area may register for a multicast service at a user plane entity belonging to another, second pool area, if the user plane for the multicast service is (to be) established to the user plane entity of the second pool area.

Accordingly, the last mobility management entity deregistering from the multicast service at the user plane entity to which the user plane is established will terminate the user plane to the access nodes assigned to two or more pool areas.

Both aspects outlined above may be readily combined so as to enable service continuity and efficient resource utilization in the overlapping part of pool areas simultaneously.

With respect to ensuring efficient resource utilization in the distribution of service data to access nodes (e.g. eNode Bs) that are located in an overlapping region of pool areas, one embodiment of the invention proposes a method for establishing a user plane between a user plane entity and different access nodes assigned to different pool areas simultaneously for multicast or broadcast service provision. A respective access node assigned to the different pool areas simultaneously may receive plural session start messages indicating different user plane entities of the different pool areas. Accordingly, a respective access node assigned to the different pool areas simultaneously will select one user plane entity out of the indicated user plane entities indicated in the session start messages based on a selection rule common to all access nodes assigned to the different pool areas simultaneously. This selection rule ensures that the access nodes assigned to different pool areas simultaneously select the same user plane entity out of one of the different pool areas. Furthermore, the access nodes may establish a respective user plane to the same selected user plane entity for multicast or broadcast service provision.

In a further embodiment, the service start messages received at the access nodes assigned to the different pool areas for the multicast or broadcast service further comprise a common service identifier identifying the multicast or broadcast service. Session start messages that belong to a single multicast or broadcast service may for example be identified based on the common service identifier.

In another embodiment of the invention the service data of the multicast or broadcast service may be tunneled from the selected user plane entity to the respective access nodes assigned to the different pool areas via the established user plane.

According to another embodiment of the invention, the session start messages are received from mobility management entities of the different pool areas. The mobility management entities may serve mobile terminals to receive the multicast or broadcast service in respective ones of the different pool areas.

In a variation of the embodiment, a positive acknowledgement may be transmitted from a respective access node having received session start messages for the multicast or broadcast service to a mobility management entity having indicated the selected user plane entity in its session start message.

In another variation, the mobility management entities having transmitted a session start message indicating an unselected user plane entity may by notified on the selected user plane entity. This notification may for example be transmitted by a respective access node having received session start messages for the multicast or broadcast service.

Further, the notification may be for example transmitted together with or in a negative acknowledgment transmitted by an access node to a mobility management entity in response to receiving a session start message from the mobility management entity.

In a further variation the notification could include an identifier of the selected user plane entity or identifies the pool area of the selected user plane entity.

According to another embodiment of the invention a respective access node may delay the selection of the user plane entity to establish a user plane to by a configurable time interval.

This time interval may be for example based on the round trip time of data exchanged between an access node and respective mobility management entities which the access node is capable of communicating with. Alternatively, the time interval may be set to the highest round trip time of data exchanged between an access node and respective mobility management entities which the access node is capable of communicating with.

In another example, the time interval may be set to the highest round trip time of data exchanged between an access node and respective mobility management entities which the access node is capable of communicating with plus an additional processing delay of the mobility management entities.

In one further embodiment, the selection rule defines a processing of the at least one parameter in the respective session start messages at a user plane entity for selecting a user plane entity of one of the different pool areas out of the plural indicated user plane entities. Thereby, the session start messages could for example comprise at least one selection parameter for influencing the outcome of the selection step. Further, the at least one selection parameter may be for example at least one of a pool area identifier of the mobility management entity's pool area, an identifier of the user plane entity indicated in a session start message, an identifier of a mobility management entity transmitting a session start message, and the number of mobile terminals having registered for the multicast or broadcast service at a mobility management entity transmitting a session start message.

Another alternative solution to enable efficient resource utilization according to another embodiment relates to another method for establishing a user plane between a user plane entity and different access nodes in an overlap region of overlapping pool areas for multicast or broadcast service provision. In this exemplary embodiment, the mobility management entities of different at least partly overlapping pool areas that are serving mobile terminals in the different pool areas may determine a user plane entity of one of the pool areas to which access nodes of the overlapping part of the different pool areas are to establish a user plane for a multicast or broadcast service to be provided to the mobile terminals. At least one message (e.g. a session start message) may be further transmitted to a respective one of the access nodes of the overlapping part of the different pool areas that is explicitly or implicitly identifying the user plane entity to which the user plane is to be established.

In one further embodiment, each mobility management entity in the different pool areas transmits a session start message to each access nodes in the overlapping part of the different pool areas, wherein all transmitted session start messages identify the user plane entity to which the user plane is to be established.

In another embodiment of the invention, the determination of the user plane entity to which the user plane is to be established is triggered by a mobility management entity upon receiving a service activation message for the multicast or broadcast service.

Another possibility is that the determination of the user plane entity to which the user plane is to be established is triggered by a notification from an access node indicating that session start messages for the same multicast or broadcast service identifying different user plane entities have been received, and the at least one message is transmitted in response to the notification. This notification may be for example transmitted to a mobility management entity and indicates the other mobility management entities from which session start messages have been received.

Further, in another embodiment, the determination of the user plane entity to which the user plane for the multicast or broadcast service is to be established includes control signaling between mobility management entities in the different pool areas. The control signaling may include transmitting control messages via point-to-point communication links or via point-to-multipoint communication links.

In a variation, the mobility management entities of different overlapping pool areas are assigned a IP multicast address and the control messages are addressed to the IP multicast address. In another variation the control signaling is exchanged between one preconfigured or selected mobility management entity of each pool area of said different at least partly overlapping pool areas.

According to a further embodiment, the determination of the user plane entity to which the user plane is to be established comprises requesting at a multicast or broadcast service centre an explicit or implicit identification of a user plane entity providing a user plane to access nodes in the overlapping part of the different pool areas. In a variation of this embodiment, the request identifies a user plane entity of the pool area of the requesting mobility management entity.

Moreover, in another embodiment of the invention, a multicast or broadcast service centre may determine whether a user plane entity providing a user plane to access nodes in the overlapping part of the different pool areas for a multicast or broadcast service has been registered for the multicast or broadcast service indicated in a request, and if not, it may derive a user plane entity from a received request, register at the multicast or broadcast service centre the user plane entity indicated in the request as the user plane entity providing a user plane to access nodes in the overlapping part of the different pool areas and indicate the derived user plane entity as the user plane entity providing a user plane to access nodes in the overlapping part of the different pool areas to the requesting mobility management entity in response to the request.

In a further embodiment, the for each pool area of the different pool areas one user plane entity is preconfigured for the provision of multicast or broadcast services.

Another embodiment of the invention related to an access node for establishing a user plane between a user plane entity and the access node wherein the access node is assigned to different pool areas simultaneously for multicast or broadcast service provision. The access node comprises a communication unit (such as for example a transmitter and a receiver) for receiving plural session start messages indicating different user plane entities of the different pool areas, and further, a processing unit (or processor) for selecting one user plane entity out of the indicated user plane entities indicated in the session start messages based on a selection rule common to all access nodes assigned to the different pool areas simultaneously, wherein the selection rule ensures that all access nodes assigned to different pool areas simultaneously select the same user plane entity out of one of the different pool areas. The communication unit may be further used to establish a respective user plane to the same selected user plane entity for multicast or broadcast service provision.

According to another embodiment, an access node may comprise a receiver for receiving from different mobility management entities of the different pool areas session start messages indicating different user plane entities of the different pool areas, and a transmitter for transmitting a notification indicating that session start messages for the same multicast or broadcast service identifying different user plane entities have been received, to at least one of the different mobility management entities. Further, the receiver may receive in response to the notification a message indicating a user plane entity of one of the different pool areas. Further, the access node could be adapted to establish a user plane to the indicated user plane entity for multicast or broadcast service provision.

Another embodiment of the invention related to a mobility management entity for establishing a user plane between a user plane entity and different access nodes located in an overlap region of overlapping pool areas for multicast or broadcast service provision. This mobility management entity comprises a processing unit (or processor) for determining a user plane entity of one of different pool areas to which access nodes of the overlapping part of the different pool areas are to establish a user plane for a multicast or broadcast service to be provided to mobile terminals served by the mobility management entity. Moreover, the mobility management entity may comprise a communication unit for transmitting a message to a respective one of the access nodes of the overlapping part of the different pool areas that is explicitly or implicitly identifying the user plane entity to which the user plane is to be established.

A further embodiment of the invention relates to a computer readable medium for storing instructions that, when executed by a processor of an access node, cause the access node to establish a user plane between a user plane entity and the access node wherein the access node is assigned to different pool areas simultaneously for multicast or broadcast service provision. The access node my be caused to establish a user plane by receiving plural session start messages indicating different user plane entities of the different pool areas, selecting one user plane entity out of the indicated user plane entities indicated in the session start messages based on a selection rule common to all access nodes assigned to the different pool areas simultaneously, wherein the selection rule ensures that all access nodes assigned to different pool areas simultaneously select the same user plane entity out of one of the different pool areas, and establishing by the access nodes a respective user plane to the same selected user plane entity for multicast or broadcast service provision.

Another embodiment of the invention relates to a computer readable medium for storing instructions that, when executed by a processor of an access node, cause the access node to establish a user plane between a user plane entity and the access node wherein the access node is assigned to different pool areas simultaneously for multicast or broadcast service provision. The access node my be caused to establish a user plane by receiving from different mobility management entities of the different pool areas session start messages indicating different user plane entities of the different pool areas, transmitting a notification indicating that session start messages for the same multicast or broadcast service identifying different user plane entities have been received, to at least one of the different mobility management entities, receiving in response to the notification a message indicating a user plane entity of one of the different pool areas, and establishing a user plane to the indicated user plane entity for multicast or broadcast service provision.

A further embodiment of the invention relates to a computer readable medium for storing instructions that, when executed by a processor of an access node, cause the access node to establish a user plane between a user plane entity and the access node wherein the access node is assigned to different pool areas simultaneously for multicast or broadcast service provision. The access node my be caused to establish a user plane by determining a user plane entity of one of different pool areas to which access nodes of the overlapping part of the different pool areas are to establish a user plane for a multicast or broadcast service to be provided to mobile terminals served by the mobility management entity, and transmitting a message to a respective one of the access nodes of the overlapping part of the different pool areas that is explicitly or implicitly identifying the user plane entity to which the user plane is to be established.

Further embodiments of the invention relate to ensuring service continuity as indicated above. According to one embodiment of the invention, a method for ensuring service continuity of a multicast service received by a mobile terminal from an access node is provided. Thereby the access node is assigned to a first and at least a second pool area simultaneously, i.e. is located in an area where two or more pool areas/tracking areas overlap. Further, it may be assumed that the mobile terminal is served by a mobility management entity of the first pool area. According to this embodiment, the mobility management entity of the first pool area may be registered for the multicast service at a user plane entity of the second pool area, if the access node serving the mobile terminal uses a user plane to the user plane entity of the second pool area.

The registration may be triggered by different mechanisms. For example in one embodiment, the registration of the mobility management entity at the user plane entity is performed in response to receiving a notification from an access node indicating the access node's decision to establish a user plane to the user plane entity which the user plane is to be established.

In another embodiment, the registration of the mobility management entity at the user plane entity is for example performed in response to receiving a service activation message from a mobile terminal for the multicast or broadcast service.

In a further embodiment, the registration of the mobility management entity at the user plane entity is for example performed in response to receiving a notification from another mobility management entity indicating the user plane to which the user plane is to be established.

According to another embodiment, the registration of the mobility management entity at the user plane entity is for example performed in response to receiving from a multicast or broadcast service centre an explicit or implicit identification of a user plane entity providing a user plane to access nodes in the overlapping part of the different pool areas.

Further embodiments relate to the trigger for such registration by a mobility management entity. For example, in one embodiment, multicast service information on at least the multicast service may be transmitted (e-g- broadcasted) from the access node to at least the mobile terminal served by the mobility management entity of the first pool area. This multicast service information may indicate the pool area of the user plane entity to which the user plane for the multicast service has been established or, alternatively, an identifier of the user plane entity to which the user plane for the multicast service has been established.

Accordingly, in a further embodiment of the invention, the mobility management entity of the first pool area (or tracking area) may register for the multicast service at the user plane entity of the second pool area (or tracking area) in response to receiving a notification from the mobile terminal that the user plane for the multicast service has been established to the user plane entity of the second pool area (or tracking area). This notification may be for example transmitted by the mobile terminal in response to detecting that the user plane entity to which the user plane of the multicast service is established is assigned to a pool area (or tracking area) different to that of the mobility management entity of the first pool area (or tracking area) serving the mobile terminal. This detection could be for example based on the multicast service information received by the mobile terminal from the access node.

Moreover, according to a further embodiment, the notification may be transmitted by the mobile terminal (only) once upon detecting that the user plane entity to which the user plane of the multicast service has been established belongs to a pool area (or tracking area) different to that of the mobility management entity of the first pool area (or tracking area) serving the mobile terminal.

Further, in another embodiment the multicast service information provided by the access node comprise further information. For example, the multicast service information on at least the multicast service may further indicate one or more pool areas (or tracking areas) of mobility management entities having registered for the multicast service at the user plane entity of the pool area (or tracking area) to which the user plane for the multicast service has been established.

In a variation of this embodiment, a notification transmitted by the mobile terminal may indicate to (or trigger) the mobility management entity of the first pool area (or tracking area) to register at the user plane entity of the second pool area (or tracking area). This notification may be sent by the mobile terminal only, if the multicast service information received from the access node does not indicate that a mobility management entity of the first pool area (or tracking area) has registered at the user plane entity of the second pool area (or tracking area).

Other embodiments of the invention relate to the access node's handling and selection of the user plane entity to which the user plane for the multicast service (multicast user plane) should be established. In one embodiment of the invention the access node may decide whether to establish or use a user plane to a user plane entity of the first pool area (or tracking area) or the user plane entity of the second pool area (or tracking area). This decision may for example result in the selection (and use) of the user plane to the user plane entity of the second pool area (or tracking area), if the user plane to the user plane entity of the second pool area (or tracking area) is already established upon receiving a request to establish a user plane for the multicast service from the mobility management entity of the first pool area (or tracking area).

Alternatively, the access node may decide the whether to establish or use the user plane to a user plane entity of the first pool area (or tracking area) or the user plane entity of the second pool area (or tracking area) upon receiving a respective request to establish a user plane for the multicast service from the mobility management entity of the first pool area (or tracking area) and a mobility management entity of the second pool area (or tracking area) serving at least one other mobile terminal requesting the multicast service through the access node. In this case the access node has the freedom to choose any pool area (or tracking area) to which it is associated for establishment of the multicast user plane based on the requests.

Generally, the access node may detect that requests to establish a user plane for a multicast service are related to the same multicast service based on an identifier of a respective multicast service. Similarly, also an established user plane may be detected to be associated to a multicast service by a multicast service identifier.

in one exemplary embodiment, the access node may establish the user plane to the user plane entity of the second pool area (or tracking area) for receiving the multicast service data at the access node and for forwarding same to mobile terminals registered to the multicast service within the service area of the access node.

In a further embodiment also relating to the trigger of a mobility management entity registration at a user plane entity, the mobility management entity of the first pool area (or tracking area) registers itself at the user plane entity of the second pool area (or tracking area) in response to receiving a notification from the access node that the user plane to the user plane entity of the second pool area (or tracking area) is to be used for the multicast service data.

In this exemplary embodiment, the notification may for example include an indication of the user plane entity of the second pool area (or tracking area) or identifies the second pool area (or tracking area). Hence, the mobility management entity may resolve the user plane entity (or rather an identifier thereof) to which the multicast user plane has been established based on the identification of the second pool area (or tracking area) in the notification—if the identifier is not already included in the notification.

In an exemplary embodiment, the notification is received encapsulated in a tracking area update message of the mobile terminal or a response to a session start message sent by an access node being assigned to the first and second pool area simultaneously.

In a variation, the access node assigned to the first and the second pool area simultaneously may determine whether a tracking area update message from the mobile terminal is destined to a mobility management entity located in the same pool area as the one to which the user plane has been established. If not, i.e. if a user plane needs to be established, the access node assigned to the first and the second pool area simultaneously may send the notification to the mobility management entity to which the tracking area update message is destined.

The determination of the access node may for example use context information on the mobile terminal maintained by the access node. This context information could comprise on the mobile terminal's services, e.g. identifies that the mobile terminal has registered for the multicast service. In one embodiment, the mobile terminal may be in idle mode first and may switch to active mode for performing a tracking area update (also denoted location area update) procedure. By switching to active mode, the access node may receive the context information which allows the access node to perform a determination on whether the user plane for the multicast service needs to be established for the tracking area.

To make the mobile terminals attaching to an access node being assigned to the first and the second pool area simultaneously performing a tracking area update, another embodiment of the invention foresees that the access nodes being assigned to the first and the second pool area simultaneously are assigned to at least one separate tracking area.

Accordingly, the notification sent by the access node assigned to the first and the second pool area simultaneously may be triggered by a tracking area update message sent by the mobile terminal in response to detecting a tracking area change to one of the at least one separate tracking area.

According to another embodiment of the invention the notification from the access node is received in response to a session start message for triggering the establishment of the user plane. Also in this embodiment, it may be of further advantage if the access nodes assigned to the first and the second pool area simultaneously are assigned to at least one separate tracking area. Upon receiving a tracking area update message from the access node assigned to the first and the second pool area simultaneously at the mobility management entity of the first pool area the mobility management entity of the first pool area may for example determine whether the user plane for the multicast service has been established to the access node(s) in the (at least one) tracking area to which access nodes assigned to the first and the second pool area simultaneously belongs (the tracking area update message may identify this tracking area).

If a user plane needs to be established the mobility management entity of the first pool area may transmit or may request a user plane entity in the first pool area to transmit a session start message for triggering the establishment of a user plane for the multicast service to at least said access node assigned to the first and the second pool area simultaneously.

in some exemplary embodiments of the invention, the mobile terminal served by the mobility management entity of the first pool area (or tracking area) may be in active mode, and may thus be known to the communication network on the access node level.

Further, in another embodiment, the mobile terminals potentially receiving the multicast service through the access node are in idle mode. In this case the access node may determine whether there is at least one mobile terminal to receive the multicast service in its service area. The access node may transmit the notification to the mobility management entity, if there is at least one at least one mobile terminal to receive the multicast service in its service area.

In another embodiment, relates to an approach of centrally registering user plane entities that established a user plane for a particular service. This central "register" could be for example maintained in a core network entity, for example a BM-SC for MBMS services. For an effective implementation, it may be advantageous, if access nodes assigned to the first and the second pool area simultaneously are assigned to a separate tracking area and the query indicates said separate tracking area. Generally, controlling and updating registrations of mobility management entities on a tracking area level may be advantageous, as tracking area updates may be used as triggers for checking the mobility entity's registration at the user plane entity for a service and potentially updating or establishing a registration.

According to this embodiment, the mobility management entity of the first pool area registers itself at the user plane entity of the second pool area in response to receiving from a core network entity a notification indicating that the user plane to the user plane entity of the second pool area is to be used for the multicast service data. This notification may for example include an indication of the user plane entity of the second pool area or identifies the second pool area.

In a variation the notification may for example be received by the mobility management entity in response to a query of this mobility management entity of the first pool area to the core network entity.

As indicated above, the tracking area update procedure may be advantageously used as a trigger mechanism. For example, the mobility management entity of the first pool area may receive a tracking area update message from the access node assigned to the first and the second pool area simultaneously, wherein the tracking area update message identifies said tracking area to which access nodes assigned to the first and the second pool area simultaneously belong. Based in this tracking area indication, the mobility management entity may then determine whether the user plane for the multicast service has been established to the access nodes in said tracking area to which access nodes assigned to the first and the second pool area simultaneously belong, and if not, the mobility management entity of the first pool area said query to the core network entity so as to resolve a user plane entity identification at which the mobility management entity may register itself for the multicast service.

In a further variation the mobility management entity of the first pool area may perform the following steps, if a response of the core network entity to the query indicates that no user plane entity has been yet registered for the tracking area. The mobility management entity of the first pool area may select a user plane entity of the first or second pool area, and may subsequently send a session start message to the access node assigned to the first and the second pool area simultaneously to initiate the establishment of a user plane for the multicast service to the selected user plane entity. Further, the mobility management entity of the first pool area may also register the selected user plane entity at the core network entity for the multicast service and tracking area.

Another aspect of the invention is the handling of multicast service deregistrations by the mobility management entities. In one exemplary embodiment of the invention a mobility management entity of a first pool area (or tracking area) is assumed to transmit a multicast service deregistration to the user plane entity of a second (other) pool area (or tracking area) to which the multicast user plane of the multicast service has been established. In response to the deregistration the mobility management entity may receive a confirmation message from the user plane entity of the second pool area (or tracking area), wherein the confirmation message indicates whether at least one other mobility management entity has registered for the multicast service at the user plane entity of the second pool area (or tracking area).

In another embodiment a mobility management entity of the second pool area may transmit a multicast service deregistration to the user plane entity of the second pool area and may receive in response to the deregistration a confirmation message at the mobility management entity from the user plane entity of the second pool area, wherein the confirmation message indicates whether at least one other mobility management entity has registered for the multicast service at the user plane entity of the second pool area. If the confirmation message indicates that another mobility management entity of the first pool area but no other mobility management entity of the second pool area is still registered for the multicast service at the user plane entity of the second pool area, the mobility management entity having transmitted the deregistration may transmit a user plane release notification to a respective access node of the second pool area except for those access nodes assigned to the first and second pool area simultaneously.

Moreover, in another embodiment the mobility management entity having transmitted the multicast service deregistration may transmit a user plane release notification to a respective access node of the second pool area, if the confirmation message indicates that no other mobility management entity has registered for the multicast service at the user plane entity of the second pool area.

According to a further embodiment of the invention, a mobility management entity of the first pool area may transmit a multicast service deregistration to the user plane entity of the second pool area. The mobility management entity of the first pool area may receive in response to the deregistration a confirmation message from the user plane entity of the second pool area, wherein the confirmation message indicates whether at least one other mobility management entity has registered for the multicast service at the user plane entity of the second pool area. If no other mobility management entity has registered for the multicast service at the user plane entity of the second pool area, the mobility management entity may transmit a multicast service registration status request to a user plane entity of the first pool area for requesting the user plane entity of the first pool area to indicate whether at least one other mobility management entity has registered for the multicast service at the user plane entity of the first pool area.

If a response from the user plane entity of the first pool received at the mobility management entity of the first pool area in response to the multicast service registration status request indicates that another mobility management entity of the first pool area is still registered for the multicast service at the user plane entity of the first pool area, the mobility management entity having transmitted the deregistration may further transmit a user plane release notification to a respective access node assigned to the first and second pool area simultaneously.

In a variation of the embodiment, the mobility management entity may transmit a user plane release notification to a respective access node of the first pool area, if the response from the user plane entity of the first pool indicates that no other mobility management entity of the first pool area is still registered for the multicast service at the user plane entity of the first pool area.

In one embodiment, the user plane release notification comprises an identifier of the multicast service so as to allow and identification of the multicast service for which the user plane is to be terminated. Accordingly, an access node may release the user plane to the user plane entity of the second pool area (or tracking area) in response to receiving the user plane release notification.

Another embodiment of the invention relates to another possible handling of the multicast service deregistrations. In this exemplary embodiment, a mobility management entity transmit a multicast service deregistration to the user plane entity of a second (other) pool area (or tracking area) to which the multicast user plane of the multicast service has been established. Again, in response to the deregistration the mobility management entity may receive a confirmation message from the user plane entity of the second pool area (or tracking area). In this exemplary embodiment, the confirmation message indicates that one or more mobility management entities of the first pool area (or tracking area) are still registered for the multicast service at the user plane entity of the second pool area (or tracking area). Accordingly, the deregistering mobility management entity may notify those access nodes being assigned to the first and second pool area (or tracking area) simultaneously to release the user plane to the user plane entity of the second pool area (or tracking area) upon having established a new user plane to a user plane entity of the first pool area (or tracking area).

Further, according to another embodiment, the deregistering mobility management entity may indicate to a mobility management entity of the first pool area (or tracking area) to trigger establishment of a user plane for the multicast service between the those access nodes being assigned to the first and second pool area (or tracking area) simultaneously and a user plane entity of the first pool area (or tracking area). Thereby, the multicast user plane may be relocated from the second pool area (or tracking area) to the first pool area (or tracking area) if only (one or more) mobility management entities of the first pool area (tracking area) are still registered at the user plane entity of the second pool area (or tracking area).

In a further enhancement according to another embodiment of the invention deregistration mobility management entity may request one or more mobility management entities of the first pool area (or tracking area) having registered for the multicast service at the user plane entity of the second pool area (or tracking area) to register for the multicast service at the user plane entity of the first pool area (or tracking area).

In another embodiment, the deregistering mobility management entity transmits a user plane release notification to a respective access node of the second pool area (or tracking area) except for access nodes assigned to the first and the second pool area (or tracking area) simultaneously.

Another aspect of the invention according to further embodiments is the handling of registrations in case a mobile terminal is handed over from a source access node not located in an overlapping part of a pool area (or a tracking area) to target access node located in an overlapping part of a pool area (or a tracking area). In this exemplary embodiment, the source access node of a first pool area (or tracking area) may transmit a handover request message to the access node being assigned to the first and second pool area (or tracking area) simultaneously (i.e. the target access node). This handover request message may comprise mobile terminal related context information on a multicast service of the mobile terminal to be handed over from the source access node to the target access node. The target access node receiving the handover request message may determine whether a user plane for the multicast service to the user plane entity of the first or the second pool area (or tracking area) is used based on the context information, and if the user plane for the multicast service to the user plane entity of the second pool area (or tracking area) is used, may trigger the mobility management entity of the first pool area (or tracking area) serving the mobile terminal in handover to register for the multicast service at the user plane entity of the second pool area (or tracking area).

In an alternative embodiment of the invention, a target access node may determine upon handover of the mobile terminal, whether a user plane for the multicast service to the user plane entity of the first or the second pool area (or tracking area) is used. This determination could be for example based on context information comprising information on a multicast service received by the mobile terminal to be handed over to the access node being assigned to the first and second pool area (or tracking area) simultaneously. If the user plane for the multicast service to the user plane entity of the second pool area (or tracking area) is used, the target access node may transmit a handover complete message from the access node to the mobility management entity of the first pool area (or tracking area), wherein the handover complete message triggers the mobility management entity of the first pool area (or tracking area) to register for the multicast service at the user plane entity of the second pool area (or tracking area).

Another embodiment of the invention relates to a mobility management entity of a first pool area (or tracking area) serving a mobile terminal to receive a multicast service. This mobility management entity comprises a transmitter for registering the mobility management entity for the multicast service at a user plane entity of a second, other pool area (or tracking area), if an access node serving the mobile terminal uses a user plane to the user plane entity of the second pool area (or tracking area).

In a further embodiment, the mobility management entity may comprise a receiver for receiving a notification that the user plane for the multicast service has been established to the user plane entity of the second pool area (or tracking area). The notification may be received from the mobile terminal, the access node or from a core network entity. The mobility management entity may register for the multicast service at the user plane entity of the second pool area (or tracking area) in response to the reception of the notification. The notification could for example comprise an identifier of the user plane entity of the second pool area (or tracking area) or an indication of the second pool area (or tracking area) so that the mobility management entity receiving the notification knows or may derive at which user plane entity and pool area (tracking area) it should register for the multicast service. The notification may be for example received from the access node assigned to the first and second pool area simultaneously or alternatively from a core network entity.

The mobility management entity according to another embodiment further comprises a processing unit for resolving an identifier of the user plane entity of the second pool area (or tracking area) based on the indication of the second pool area (or tracking area).

Another embodiment of the invention relates to a mobility management entity located in a first pool area serving a mobile terminal to receive a multicast service. The mobility management entity may comprise a transmitter for transmitting a multicast service deregistration to a user plane entity of the first pool area, and a receiver for receiving in response to the deregistration a confirmation message from the user plane entity of the first pool area, wherein the confirmation message indicates whether at least one other mobility management entity has registered for the multicast service at the user plane entity of the first pool area.

Further the transmitter of the mobility management entity may be adapted to transmit a user plane release notification to a respective access node of the first pool area except for those access nodes assigned to the first and second pool area simultaneously, if the confirmation message indicates that another mobility management entity of the second pool area but no other mobility management entity of the first pool area is still registered for the multicast service at the user plane entity of the first pool area.

The mobility management entity according to another embodiment may transmit a user plane release notification to a respective access node of the first pool area, if the confirmation message indicates that no other mobility management entity has registered for the multicast service at the user plane entity of the first pool area.

A further embodiment of the invention relates to a mobility management entity located in a first pool area serving a mobile terminal to receive a multicast service. This mobility management entity comprises a transmitter for transmitting a multicast service deregistration to a user plane entity of the second pool area, and a receiver for receiving in response to the deregistration a confirmation message from the user plane entity of the second pool area, wherein the confirmation message indicates whether at least one other mobility management entity has registered for the multicast service at the user plane entity of the second pool area.

The transmitter may transmit a multicast service registration status request to a user plane entity of the first pool area for requesting the user plane entity of the first pool area to indicate whether at least one other mobility management entity has registered for the multicast service at the user plane entity of the first pool area, if no other mobility management entity has registered for the multicast service at the user plane entity of the second pool area. Further, the transmitter may transmit a user plane release notification to a respective access node assigned to the first and second pool area simultaneously, if a response from the user plane entity of the first pool received at the mobility management entity of the first pool area in response to the multicast service registration status request indicates that another mobility management entity of the first pool area is still registered for the multicast service at the user plane entity of the first pool area.

The mobility management entity according to another embodiment, may further transmit a user plane release notification to a respective access node of the first pool area, if the response from the user plane entity of the first pool indicates that no other mobility management entity of the first pool area is still registered for the multicast service at the user plane entity of the first pool area.

In another embodiment, a further mobility management entity serving a mobile terminal to receive a multicast service is provided. In this embodiment, the mobility management entity comprises a transmitter for transmitting a multicast service deregistration to a user plane entity of a first pool area (or tracking area), and a receiver for receiving a confirmation message from the user plane entity of the first pool area (or tracking area) in response to the deregistration, wherein the confirmation message indicates that one or more other mobility management entities of a second pool area (or tracking area) are still registered for the multicast service at the user plane entity of the first pool area (or tracking area). Moreover, the mobility management entity may notify those access nodes being assigned to the first and a second, other pool area (or tracking area) simultaneously to release the user plane to the user plane entity of the first pool area (or tracking area) upon having established a user plane to a user plane entity of the second pool area (or tracking area).

The mobility management entity according to another embodiment may trigger a mobility management entity of the second pool area (or tracking area) to establish a user plane for the multicast service between the those access nodes being assigned to the first and the second pool area (or tracking area) simultaneously and the user plane entity of the second pool area (or tracking area).

Further, the mobility management according may for example also trigger the one or more mobility management entities of the second pool area (or tracking area) having registered for the multicast service at the user plane entity of the first pool area (or tracking area) to register for the multicast service at the user plane entity of the second pool area (or tracking area).

In a further embodiment, the transmitter of the mobility management entity may transmit a user plane a release notification to a respective access node of the first pool area (or tracking area) except for access nodes assigned to the first and the second pool area (or tracking area) simultaneously.

Another embodiment of the invention provides a mobility management entity that may perform or to participate in the steps of the methods and procedures according to any one of the different embodiments outlined herein.

A further embodiment of the invention relates to a mobile terminal for receiving a multicast service through an access node. The mobile terminal may comprise a receiver for receiving from the access node multicast service information on at least the multicast service, wherein the multicast service information indicates a pool area (or tracking area) of a user plane entity to which a user plane for the multicast service has been established or an identifier of a user plane entity to which the user plane for the multicast service has been established. Moreover the mobile terminal may include a transmitter for transmitting a notification to the mobility management entity serving the mobile terminal triggering a registration of the mobility management entity at the user plane entity to which the user plane for the multicast service has been established.

In one embodiment, the transmitter of the mobile terminal may transmit the notification in response to detecting that the user plane entity to which the user plane of the multicast service has been established is assigned to a different pool area (or tracking area) than the mobility management entity serving the mobile terminal. This detection may be for example based on the multicast service information.

The mobile terminal according to another embodiment of the invention, the transmitter may transmit the notification once upon detecting that the user plane entity to which the user plane of the multicast service has been established is assigned to a different pool area (or tracking area) than the mobility management entity serving the mobile terminal.

As already indicated before, in one embodiment of the invention the multicast service information indicates pool areas (or tracking areas) of mobility management entities having registered at the user plane entity of the pool area (or tracking area) to which the user plane for the multicast service has been established. Further, the transmitter of the mobile terminal may for example transmit the notification only, if the multicast service information received by the mobile terminal from the access node does not indicate that a mobility management entity of the first pool area (or tracking area) serving the mobile terminal has registered at a user plane entity of a second pool area (or tracking area).

Another embodiment of the invention provides a mobile terminal that may perform or to participate in the steps of the methods and procedures according to any one of the different embodiments outlined herein.

Further, other embodiments of the invention relate to an access node assigned to a first and a second pool area (or tracking area). In one embodiment, the access node comprises a transmitter for transmitting multicast service information on at least the multicast service to at least one mobile terminal to receive the multicast service, wherein the multicast service information indicates a pool area (or tracking area) of a user plane entity to which a user plane for the multicast service has been established or an identifier of a user plane entity to which the user plane for the multicast service has been established.

As mentioned previously, the multicast service information could for example indicate pool areas (or tracking areas)—i.e. one or more—of mobility management entities having registered at the user plane entity of the pool area (or tracking area) to which the user plane for the multicast service has been established.

The access node according to another embodiment may further comprise a receiver for receiving a notification from a mobility management entity, wherein the notification indicates to the access node that the mobility management entity has registered for the multicast service at the user plane entity to which the user plane for the multicast service has been established. The access node could also include a processing unit for updating the multicast service information in response to the notification.

In another embodiment, the access node comprises a processing unit for deciding whether to establish or use a user plane for the multicast service to a user plane entity of a first pool area (or tracking area) or the user plane entity of the a second pool area (or tracking area). The access node may be for example adapted to detect that requests for establishment of a user plane for a multicast service received by a receiver of the access node are related to the same multicast service based on an identifier of a respective multicast service.

A further embodiment relates to a further access node assigned to a first and a second pool area (or tracking area). This access node may comprise a receiver for receiving a request for establishment of a user plane for a multicast service to the first pool area (or tracking area) from a mobility management entity of the first pool area (or tracking area), and a transmitter for transmitting notification to the mobility management entity of the first pool, to trigger the registration of the mobility management entity of the first pool area (or tracking area) at a user plane entity of the second pool area (or tracking area) to which the user plane for the multicast service has been established.

The notification may for example include an identifier of the user plane entity of the second pool area (or tracking area) or an identification of the second pool area (or tracking area)

Moreover, according to another embodiment the access node may perform or participate in the steps of the methods and procedures according to any one of the different embodiments outlined herein.

Another embodiment relates to a communication system comprising a mobility management entity and/or mobile terminal and/or an access node according to one of the different embodiments described herein respectively.

Further, other embodiments relate to the provision of computer readable mediums storing instructions that when executed by a processing unit of a mobility management entity, mobile terminal according or an access node, cause the respective entity to perform or participate in the steps of the methods and procedures according to any one of the different embodiments outlined herein.

BRIEF DESCRIPTION OF THE SEVERAL VIEWS OF THE DRAWINGS

In the following the invention is described in more detail in reference to the attached figures and drawings. Similar or corresponding details in the figures are marked with the same reference numerals.

DETAILED DESCRIPTION OF THE INVENTION

Figure 1:
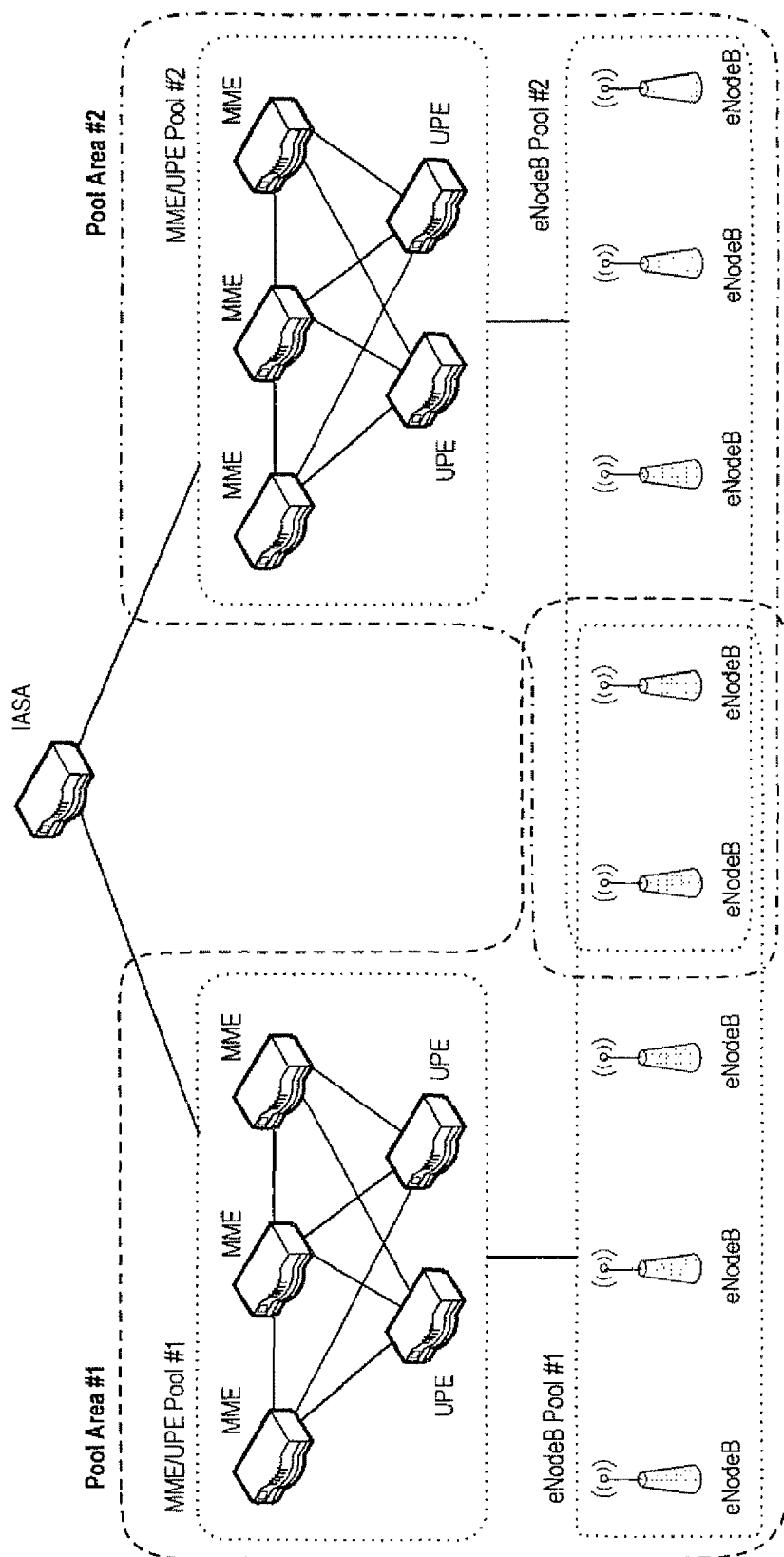
FIG. 1 shows an exemplary network architecture where two overlapping pool areas are provided.
Figure 2:
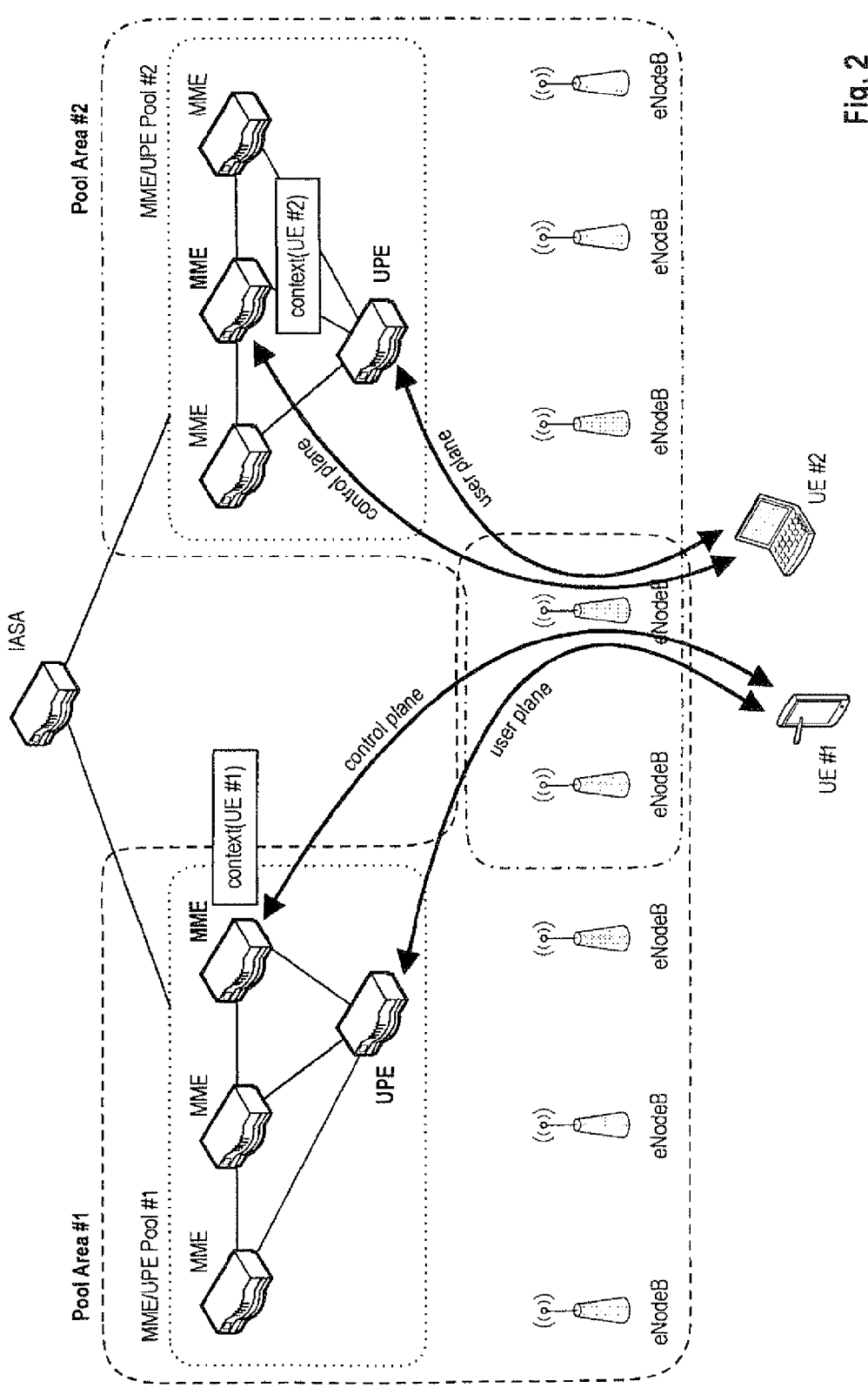
FIG. 2 shows the exemplary network architecture of FIG. 1 and further illustrates the establishment of user plane and control plane to respective core network entities of a first and second pool area by two mobile terminal attached to an access node (eNode B) located in the overlapping part of the pool areas.

The following paragraphs will describe various embodiments of the invention. For exemplary purposes only, most of the embodiments are outlined in relation to an (evolved) UMTS communication system according to the SAE/LTE discussed in the Background Art section above. It should be noted that the invention may be advantageously used for example in connection with a mobile communication system such as the SAE/LTE communication system previously described, but the invention is not limited to its use in this particular exemplary communication network.

The explanations given in the Technical Background section above are intended to better understand the mostly SAE/LTE specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

One aspect of the invention is to ensure the selection of a single user plane entity to provide the user plane for a service to the access nodes in a network region where two or more pool areas overlap each other. The selection may be made irrespective of the actual assignment of the user plane entity to a particular pool area. In one example this means that one user plane entity out of an arbitrary one of the overlapping pool areas is selected and mobility management entities of all the overlapping pool areas may register at the user plane entity irrespective of its their assignment to a particular pool area.

The selection of a common user plane entity to provide the user plane for the overlapping pool areas may be realized in different fashions. One exemplary solution may be denoted a reactive scheme as the selection of the common user plane entity to establish a user plane for the service (e.g. a multicast or broadcast service) is selected by the access nodes in response to receiving several session start messages yielding different user plane entities to establish a user plane for a particular service. To ensure that the access nodes in the overlapping part of different pool areas select the same user plane entity if they receive session start messages indicating user plane entities of the different pool area the access nodes may for example individually process the received session start messages according to a selection rule that leads to all access nodes selecting the same user plane entity for the user plane of the service.

Alternatively, the user plane entity to provide the user plane may be "pre-selected" by the mobility management entities of the different pool areas that overlap. Accordingly, the messages asking the access nodes in the overlapping part of the pool area to establish a user plane for a service will only indicate a single user plane entity so that no selection of different user plane entities by the access nodes is possible. The negotiation of a common user plane entity to which the user plane for a service is to be established may be either realized by a control signaling among mobility management entities of the different overlapping pool areas, or a centralized node such as a BM-SC may control/ensure the selection of a common user plane entity for the service by all mobility management entities of overlapping pool areas. The user plane entity selection within the core network by the mobility management entities and/or centralized control node may be either performed proactively, i.e. prior to requesting the access nodes in the overlapping part of the pool areas to establish the user plane for the service, or reactively, i.e. in response to receiving a notification indicating the potential selection of different user plane entities for a service and the resulting potential inefficient resource utilization.

Another aspect of the invention is to ensure service continuity of a multicast service received by a mobile terminal, especially for cases where at least one access node (for example, a base station, NodeB or eNodeB) is assigned to at least two pool areas. As described in the Technical Background section above such access nodes may establish a user plane for a multicast service to either one of two pool areas. This may for example allow for reducing the traffic overhead due to providing multicast service data for the same multicast service to an access node twice (or in even more copies), since a respective access node could be provided with the multicast service data only once.

The potential problems that could arise from this optimization and which could lead to a loose of service continuity for individual users may result from several factors as outlined in the following. Typically, the mobility management entities and the user plane entities of a specific pool area may not know if a multicast service is also required by mobile terminals attached to another pool area. Due to the concept of overlapping pool areas and the load distribution functionality a mobility management entity and user plane entity might not possess information about all mobile terminals connected to its interfacing access nodes.

The decision of the access node in an overlapping pool area on multicast user plane establishment is further only typically provided to the respective core network entities. Further, the access nodes typically only inform the mobile terminal about general service availability via broadcasted system information. Hence, also the mobile nodes receiving the service do typically not have information on the pool area from which the multicast service is provided.

Moreover, the mobile terminals may select an access point in an overlapping pool area when performing idle mode mobility (e.g. cell reselection) but have no means to inform their serving mobility management entity or user plane entity on their new point of attachment. Further, mobile terminals in idle mode are only known to their mobility management entity on a tracking area level. As the access node in the overlapping area belongs to the current tracking area of the mobile terminal, no tracking area update has to be performed.

To circumvent these potential problems as exemplarily outlined above for a 3GPP SAE/LTE system, it is proposed that the mobility management entities serving users that have registered to a multicast service and that receive the multicast service through an access node being assigned to more than one pool area simultaneously, may register for the multicast service at a user plane entity to which the user plane providing the multicast service data to the access node has been (or is to be) established. Thereby, the registration of the mobility management entity may be independent of the mobility management entity's actual pool area. For example, according to one embodiment of the invention, a mobility management entity of a first pool area may register for a multicast service at a user plane entity belonging to another, second pool area, if the user plane for the multicast service is (to be) established to the user plane entity of the second pool area.

A further aspect of the invention is to inform the mobile terminals about the access nodes' selection of a user plane entity in one of several pool areas to which the access node is assigned. Thereby, also service continuity may be assured for mobile terminal in idle mode (i.e. mobile terminals which have attached to the access node but have not established any signaling connection to the access node). According to this aspect an access node being assigned to two (or more) pool areas simultaneously may transmit information (e.g. via broadcast in the service area of the access node) about the pool area of the selected user plane entity (or alternatively an identifier of the selected user plane entity) in multicast service information. Receiving this information, a mobile terminal can detect whether a multicast service is provided from another pool area than the one to which the mobile terminal is currently attached. In this case, the mobile terminal may for example trigger its mobility management entity to update the service registration, i.e. to register for the multicast service at the user plane entity of the other pool area as described above.

Another aspect of the invention is the handling of the mobility management entity deregistering from the multicast service at the user plane entity to which the user plane for the multicast service has been established. This aspect of the invention takes into account that not only mobility management entities of a single pool area may register at the user plane entity for a multicast service, but that there may be registrations of mobility management entities at the user plane entity belonging to a different pool area than the user plane entity. One concept to tackle this exemplary situation is that the user plane entity indicates to a mobility management entity deregistering from the multicast service, whether other mobility management entities are still registered for the multicast service. If so, it should also be taken into account whether the registered mobility management entity (or entities) belongs to the pool area in which the user plane of the multicast service is established or to another pool area.

In cases where there are further mobility management entities registered, the mobility management entity deregistering from the multicast service should not terminate the user plane within its pool area. In cases where no other mobility management entities for the pool area of the deregistering mobility management entity are any longer registered for the multicast service, but there are one or more other mobility management entities of another pool area registered for the service at the user plane entity, the mobility management entity may terminate the user plane between the user plane entity for the multicast service in its pool area for all user planes to access nodes being exclusively assigned to the pool area of the mobility management entity, but not for access nodes being assigned to at least two pool areas simultaneously.

Accordingly, the last mobility management entity deregistering from the multicast service at the user plane entity to which the user plane is established will terminate the user plane to the access nodes assigned to two or more pool areas.

In some embodiments of the invention the pool area corresponds to one or more tracking areas. A tracking area is typically used to efficiently support terminal mobility in idle mode. In this embodiment the mobility management entities in a pool area are expected to require mapping information between tracking area IDs and cells in this tracking area for a particular geographical area. In other words, a pool area might comprise one or more tracking areas, but a mobility management entity may know which tracking areas belong to its own pool area.

In another embodiment, a multi-tracking area registration as described in the introduction of this document may be foreseen, so that each access node is always assigned to a single tracking area, i.e. broadcasts only a single tracking area identifier (e.g. TA-ID) in its radio cell(s). Using this concept a mobile terminal may be assigned to multiple tracking areas in parallel. Furthermore mobile terminals may update their location at the core network entities (such as typically the mobility management entity), if a respective mobile terminal has selected/attached to an access node that does not broadcast any of the tracking area identifiers the respective terminal is currently assigned to.

In one example, the access nodes of the overlapping part of pool areas may be summarized so as to form a single tracking area. This may provide the advantage that a mobile terminal when switching its point of attachment to an access node in this overlapping pool area region will also recognize a change in the broadcasted tracking area identifier and will initiate a tracking area update procedure. This mechanism may not only facilitate the detection of mobile terminals entering into an overlapping region of pool areas but may also facilitate the triggering of an appropriate registration of the serving mobility management entities at the user plane entity to which the user plane of the multicast service has been established for the overlapping pool area region as will be exemplified below in further detail.

Further, an access node may be considered an entity in the access system of a communications network to which mobile terminals attach. One exemplary embodiment of the invention relates to mobile communication systems, where the access nodes may be base stations or NodeBs (denoted eNodeBs in the 3GPP-based SAE/LTE system). In another embodiment, an access node may also denote an access point of a WLAN system.

A user plane may be understood as an established path between two network entities in a communication system for transmitting data (unidirectional or bidirectional). Typically, the user plane is assigned an identifier that allows a network node to distinguish different user planes. Optionally, there may be context information for a user plane established at the network nodes that include supplementary information on the user plane. In one exemplary embodiment related to a 3GPP based communication system, the user plane is typically established between a base station (or Node B) and a user plane entity. It carries the actual user data of the service requested by the user and is typically associated to some Quality-of-Service (QoS) parameters, e.g. depending on the service or the user subscription. In one exemplary embodiment of the invention it might be based on IP Multicast transport between the access nodes (base stations) and the user plane entity.

Moreover, for a better understanding of the invention the following paragraphs outline the typical procedures and steps for starting and terminating a multicast service in a communication system as also applicable to several embodiments of the invention described herein. Provision of multicast services typically comprises several phases, like subscription and service announcement, joining, session start and data transfer. Also for the termination of multicast services several phases can be identified, like session stop and leaving. From these phases subscription, joining and leaving are typically performed individually per user. The other phases are typically performed on a service basis, i.e. for all users interested in the related service.

The subscription establishes the relationship between the user and the service provider, which allows the user to receive the related multicast service offered by the operator. The service announcement is used to distribute to users information about the service, parameters required for service activation (e.g. IP multicast addresses) and possibly other service related parameters (e.g. service start time).

The joining is part of the service activation phase by which a subscriber joins (becomes a member of) a multicast group, i.e. the user indicates to the network that he/she wants to receive a specific multicast service. The user and/or UE choose the joining time possibly in response to a service announcement. This can be any time before, during or after the actual start of the multicast service. In case the service activation phase happens before the service start, this typically deploys relevant registration information in the network and reserves required resources without actually allocating them.

Finally, session start is the point at which the multicast service data is ready to be sent. As indicated above session start might occur independently of service activation by the users. It is the trigger for resource allocation and establishment in the network, i.e. comprising core network and radio network resources. Subsequently, the multicast service data can be transmitted to the users.

Complementary, session stop in the point at which there will be no more data sent for the multicast service. It triggers release of previously allocated resources in the network. While the leaving is the process by which a subscriber leaves (stops being a member of) a multicast group, i.e. the user no longer wants to receive a specific multicast service.

Similar to the provision of multicast services described above, also several phases can be identified for the provision of broadcast services. Typically, these phases comprise only those performed on a service basis, like service announcement, session start or stop. Phases performed individually per user, like service subscription, joining and leaving, might not be required for broadcast services.

Figure 3:
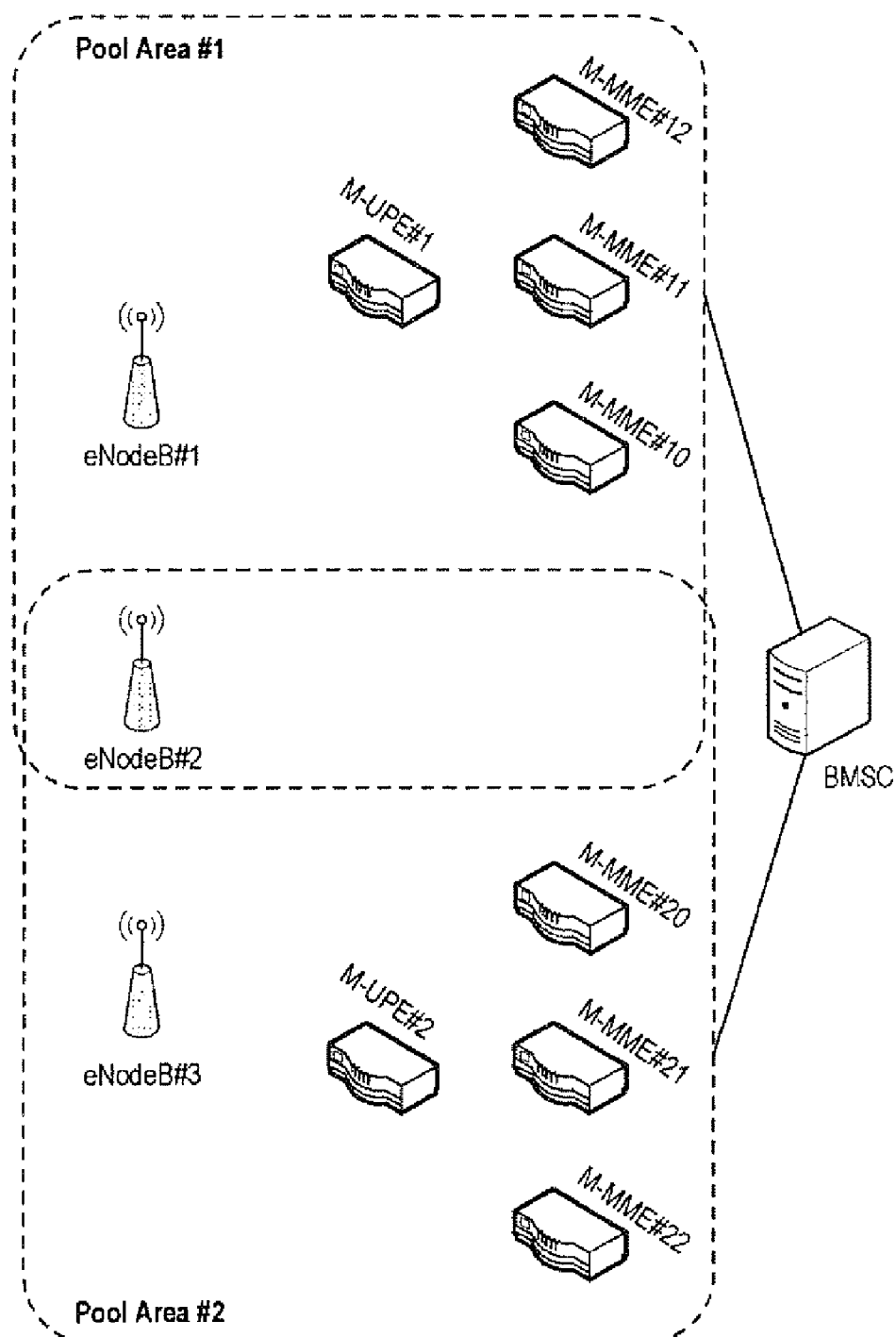
FIG. 3 shows an exemplary network architecture for the 3GPP SAE/LTE system comprising two overlapping pool areas, and based on which potential problems and solutions according to different embodiments of the invention will be outlined with respect to the other figures.
Figure 4:
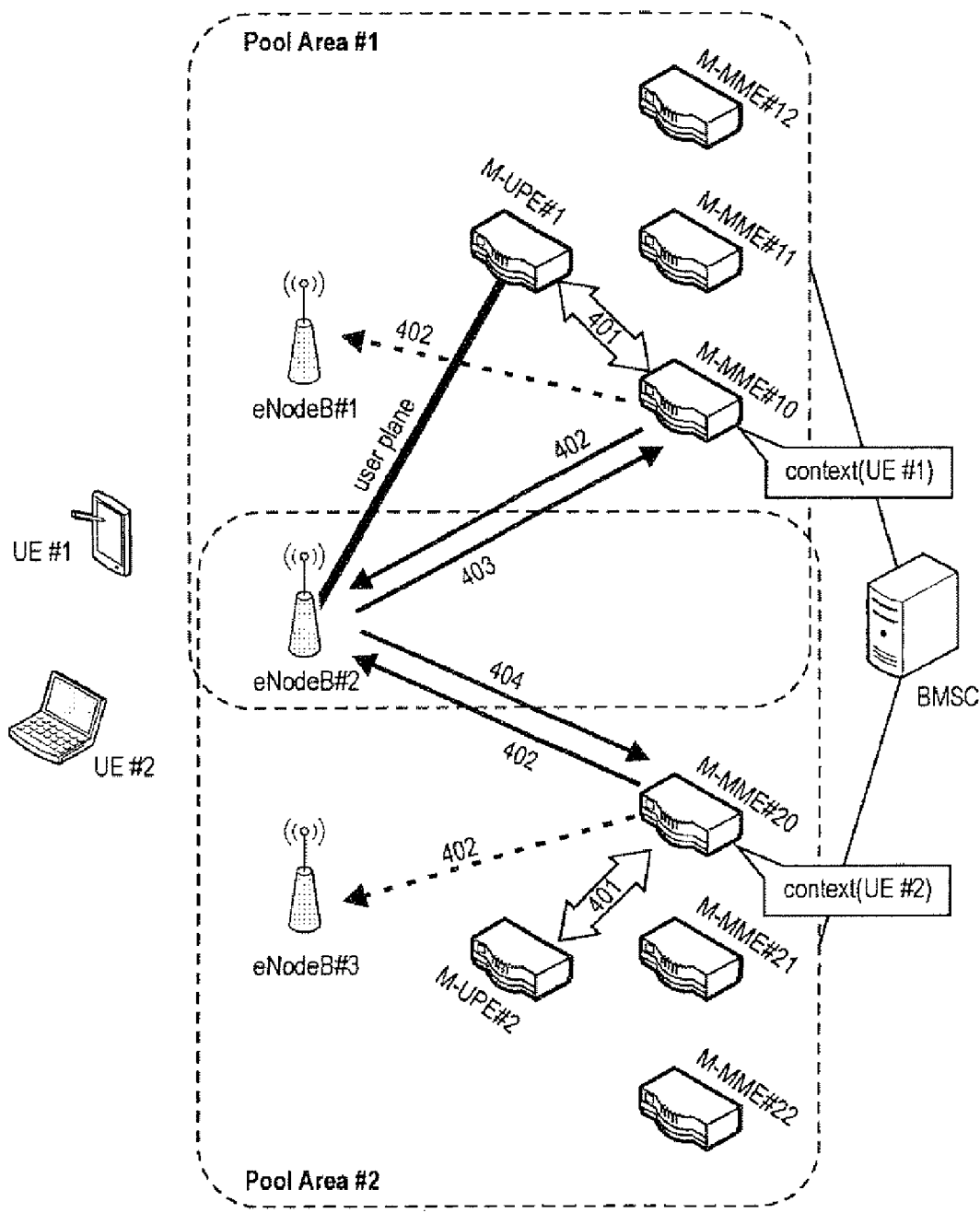
FIG. 4 shows illustrates the establishment of a single multicast user plane in a 3GPP SAE/LTE system in case a multicast service is requested by mobile terminals attached to an access node (eNode B) located in the overlapping part of the pool areas but being assigned to different pool areas.
Figure 5:
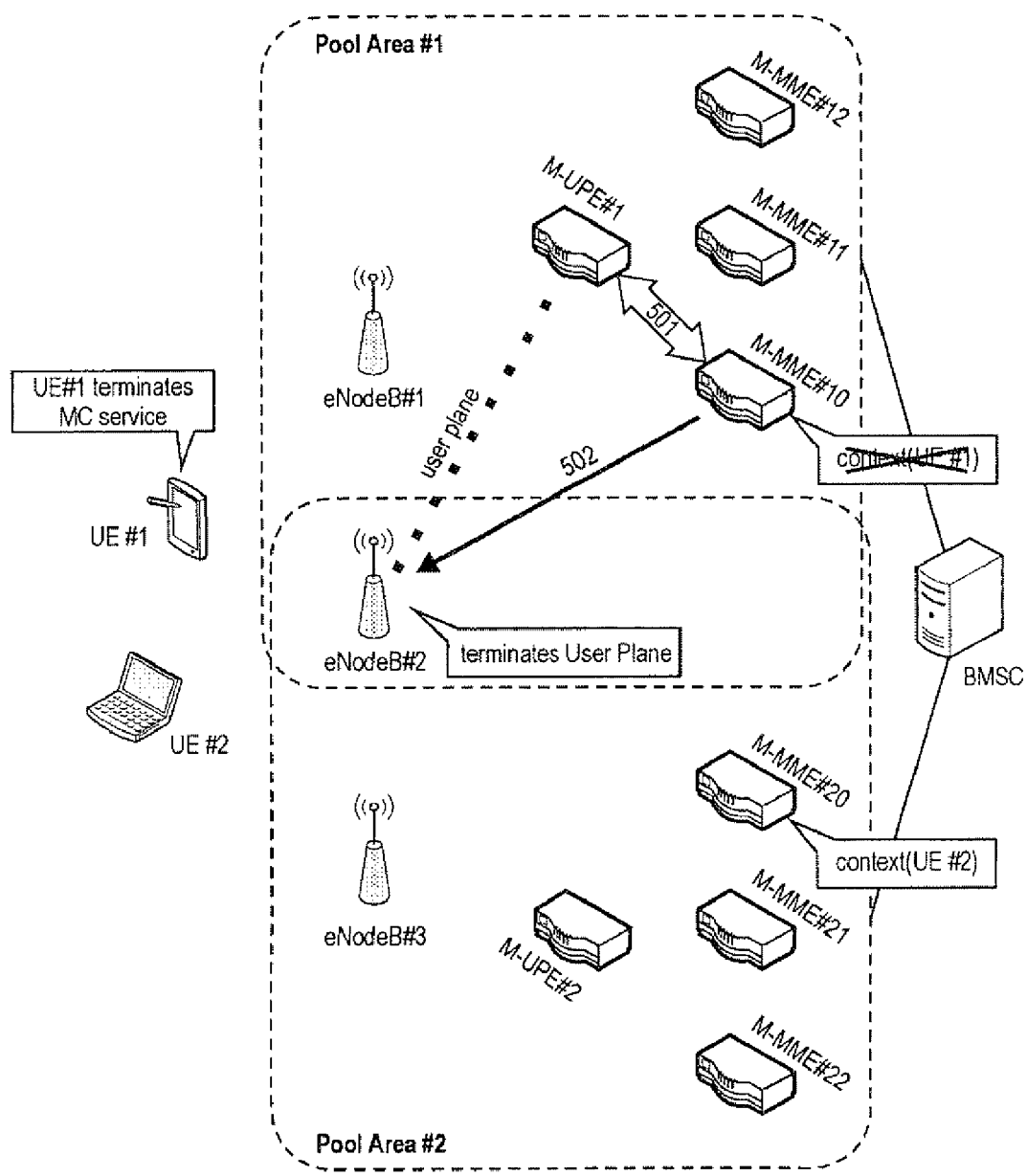
FIG. 5 shows illustrates the potential interruption of a multicast service in a 3GPP SAE/LTE system due to the termination of the single multicast user plane in response to a mobile terminal leaving the multicast service.

In the following the concepts and ideas of the invention according to different embodiments will be described with respect to a 3GPP based mobile communication system, such as a SAE/LTE system. For an easier understanding the following embodiments will be outlined with reference to a mobile communication system having—for exemplary purposes—a structure as shown in FIG. 3. It should be noted that reference to FIG. 3 is only made for exemplary purposes and that the concepts and ideas described herein are not intended to limit the invention to the exemplary architecture of a communication system as shown in FIG. 3 or to wireless communication systems only. Further, for exemplary purposes it is assumed that the base stations (eNodeBs) form access nodes for the mobile terminals (UEs).

When deploying a base station (denoted also eNodeB), the base station is typically configured with network information that are required for its proper use. This configuration may for example include information about the topological areas to which the base station might belong (e.g. pool area(s)/tracking area(s)) and the network nodes contained in theses areas and to which the base station may maintain an interface. In other words the base station may map a topological area, e.g. tracking area or pool area, to node identifiers, e.g. identifiers of the mobility management entities or user plane entities or other base stations, in this area and vice versa.

Therefore, a base station may know if it is located in an overlapping pool area, i.e. the base station is assigned to two or more pool areas simultaneously. Further, when such a base station receives a session start messages it can determine the originating pool area, e.g. by matching the identifier of the message source with the stored network configuration. In case the base station receives multiple multicast session start messages, it can determine whether these messages belong to the same service by analyzing the service identifier, e.g. TMGI/IP multicast address of the service, contained in each message.

Figure 22:
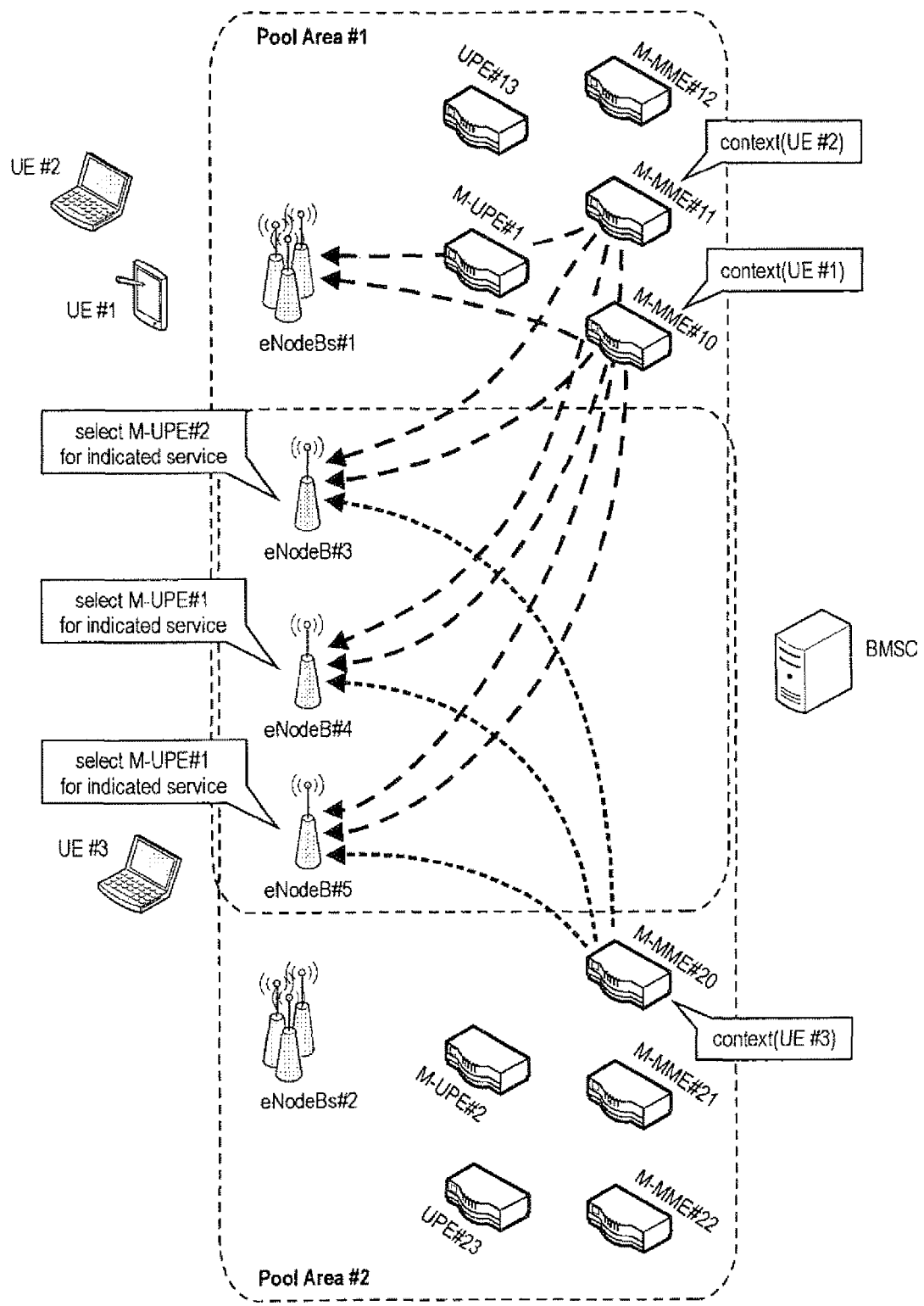
FIG. 22 exemplarily illustrates the transmission of session start messages by different mobility management entities in a in a 3GPP SAE/LTE system, wherein the session start messages indicate different user plane entities to the eNode Bs in the overlapping region of the pool areas for providing the user plane.

As explained before with respect to FIG. 22 and FIG. 23, one potential problem with base stations in the overlapping region of two or more pool areas may be an inefficient resource utilization between access network (base stations) and core network (e.g. user plane entities) in case the base stations individually select different user plane entities which may be even located in different pool areas.

If assuming for exemplary purposes, that a user plane entity for multicast/broadcast services (such as for example M-MME#1 in pool area #1) is pre-selected/configured within a pool area (e.g. due to pre-configuration by the network operator), it may be assured that within a pool are resources are utilized efficiently. However, this pre-configuration/selection may not resolve the problem for base stations belonging to different pool areas simultaneously. When mobility management entities are triggered to send session start—e.g. when receiving session start message from the BM-SC—the mobility management entities will distribute the message to all base station in a pool area includes one or more tracking areas (TAs)—given that a mobile terminal previously activated the service at the respective mobility management entity. The reason for distributing the session start messages to all base station is that the mobile terminals in idle state are only known on a tracking area level (which may correspond to a pool area or may be at least associated to pool area), i.e. it is unclear to which base station these terminals are currently connected. Regarding the overlapping area the mobility management entities might always send session start to all the base stations located there.

Figure 24:
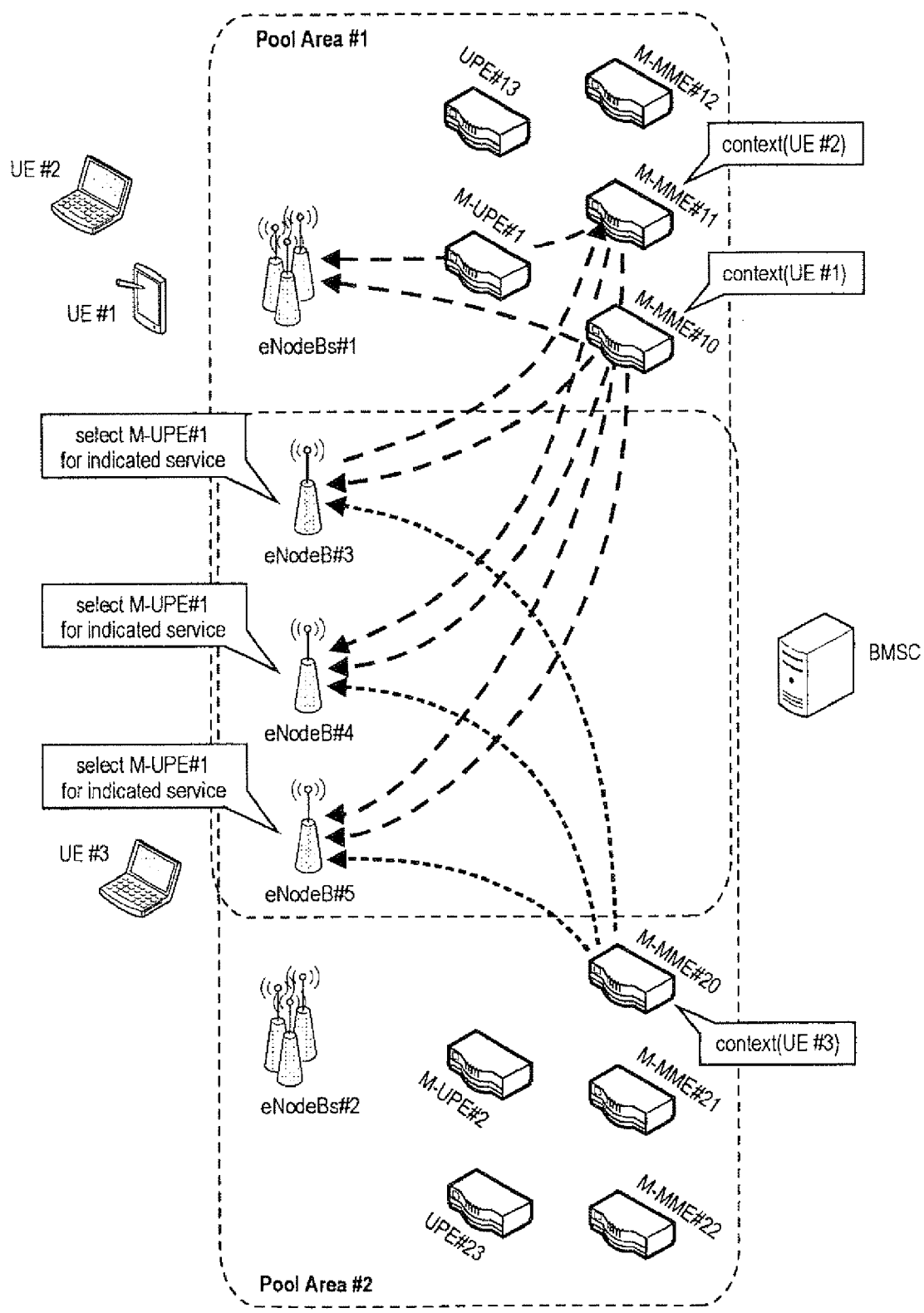
FIG. 24 exemplary shows the transmission of session start messages by different mobility management entities of overlapping pool areas in a 3GPP SAE/LTE system to base stations (eNodeBs) located in the overlapping region of the pool areas according to an exemplary embodiment of the invention.

FIG. 24 exemplary views the transmission of session start messages by different mobility management entities of overlapping pool areas in a 3GPP SAE/LTE system to base stations (eNodeBs) located in the overlapping region of the pool areas according to an exemplary embodiment of the invention. In this exemplary embodiment, it may be assumed for exemplary purposes only that the mobility management entities in Pool Area #1 have been preconfigured to select M-UPE#1 for multicast or broadcast service, while the mobility management entities in Pool Area #2 have been preconfigured to select M-UPE#2 for multicast or broadcast service.

For exemplary purposes, M-MME #10 and M-MME #11 are assumed to have received a service activation for a multicast or broadcast service (e.g. MBMS) from UE#1 and UE#2. Accordingly, the two mobility management entities have established a service context for the terminal (e.g. an MBMS UE context). Accordingly, upon having received a trigger from the a centralized network node providing the multicast or broadcast service, such as the BM-SC, M-MME #10 and M-MME #11 send session start messages to all access nodes in Pool Area #1, i.e. eNodeBs#1 and eNodeB #3, eNodeB #4 and eNodeB #5 in the overlapping pool area region of Pool Area #1 and Pool Area #2. These session start messages may be considered trigger messages for the receiving nodes to establish a user plane for a particular service. Accordingly, the session start messages of M-MME #10 and M-MME #11 indicate the service (e.g. by means of a service ID) as well as an identification of the user plane entity M-UPE #1 in Pool Area #1 (as indicated by the use of the identical shading of the arrows). Further, the messages from M-MME #10 and M-MME #11 may also indicate the private IP multicast address used to tunnel the multicast or broadcast service data from the indicated user plane entity to the base stations.

Similarly, it may be further assumed that UE #3 has previously activated the same service as UE #1 and UE #2 at M-MME #20 of Pool Area #2 which is also indicated by the context information maintained for UE #3 at M-MME #20. Also M-MME #20 sends session start messages to all access nodes in Pool Area #2, including eNodeB #3, eNodeB #4 and eNodeB #5 in the overlapping pool area region of Pool Area #1 and Pool Area #2. In contrast to the session start messages of M-MME #10 and M-MME #11, the session start messages of M-MME #20 comprise an identification of the user plane entity M-UPE #2 in Pool Area #2.

Accordingly, eNodeB #3, eNodeB #4 and eNodeB #5 will receive different session start messages for the same multicast or broadcast service (as can be for example identified based on the identical service identifiers in the session start messages) which yield different user plane entities in different pool areas. As the respective base stations eNodeB #3, eNodeB #4 and eNodeB #5 only need to receive the multicast or broadcast service data once (e.g. via private IP multicast within a pool area), they will individually select one of the two user plane entities and will establish a user plane for the multicast or broadcast service to this selected user plane entity. Accordingly, the respective base stations eNodeB #3, eNodeB #4 and eNodeB #5 will positively acknowledge the session start message yielding the selected user plane entity and will negatively acknowledge the other session start messages. Further, the mobility management entities which suggested a user plane entity that has not been selected may be informed on the selected user plane entity so that the respective mobility management entities may register at the selected user plane entity (as will be explained below in further detail).

For an efficient resource utilization, all base stations in the overlapping region of the pool areas (i.e. eNodeB #3, eNodeB #4 and eNodeB #5) should select the same user plane entity. In order to ensure the selection of the same user plane entity by all base stations in the overlapping region of the pool areas, the base stations may process some information in the session start message, wherein the processing result unambiguously yields one out of the plural user plane entities suggested in the session start messages (this may be also considered the base stations making their selection based on a predefined selection rule).

One simple solution may be to prioritize a user plane entity out of the available user plane entities to which the user plane should be established based on information already comprised in the session start message e.g. the user plane entity identifier and the base stations select the user plane entity that has the lowest or highest user plane entity identifier. In principle any information from the session start messages and/or potential other decision criteria may be used that yields an unambiguous selection of the same user plane entity by all base stations in the overlapping part of the pool areas.

However, this solution may not yield an optimal selection criterion, since it may be advantageous to further consider system requirements or system states in the selection, such as for example the number of mobile terminals that would be served by the user plane entity in the different pool areas.

To realize such more enhanced selection rules, some additional information may be added to the session start messages sent to the base stations in the overlapping region of the pool areas that may facilitate the selection of a common user plane entity by all base stations. As indicated above, the session start messages may be for example supplemented information on the number of relevant UE contexts maintained at the respective mobility management entity sending the session start message. Based on this information in the session start messages the respective base stations could determine the number of mobile terminals that are served from a respective one of the pool areas it is simultaneously connected to. As all base stations in the overlapping region of the pool areas receive the same set of session start messages, the base stations may utilize the additional information in the session start messages for the selection of a common user plane entity to which the user plane for the multicast or broadcast service is to be established.

If for example including the number of UE contexts at the respective mobility management entity (i.e. the number of terminals that have requested the service at the respective mobility management entity) to the session start messages and taking this number as a selection criterion, all base stations may for example select the user plane entity of the session start message indicating the highest number of UE contexts.

In a variation, the base stations may sum up the number of UE context per pool area first and may then select the user plane entity of the pool area in which most terminals have registered for the service. The base stations may for example identify the pool area to which the respective session start messages "belong" based on the respective mobility management entity identifier of the mobility management entity sending the message that is comprised in the respective session start messages (e.g. by means of identifying common prefixes of mobility management entity identifiers or utilizing the base station's knowledge on the network topology).

Another option may be to include a random number or hash value with a low probability of duplicates in the session start messages. In this case all base stations select the user plane entity of the session start message containing the lowest/highest number or hash value. Another option may be to add some sortable identifier (e.g. UPE-ID, MME-ID, PA-ID) to the session start messages, and all base stations select the user plane entity of the session start message corresponding to the, e.g., first ID in a sorted list.

Figure 25:
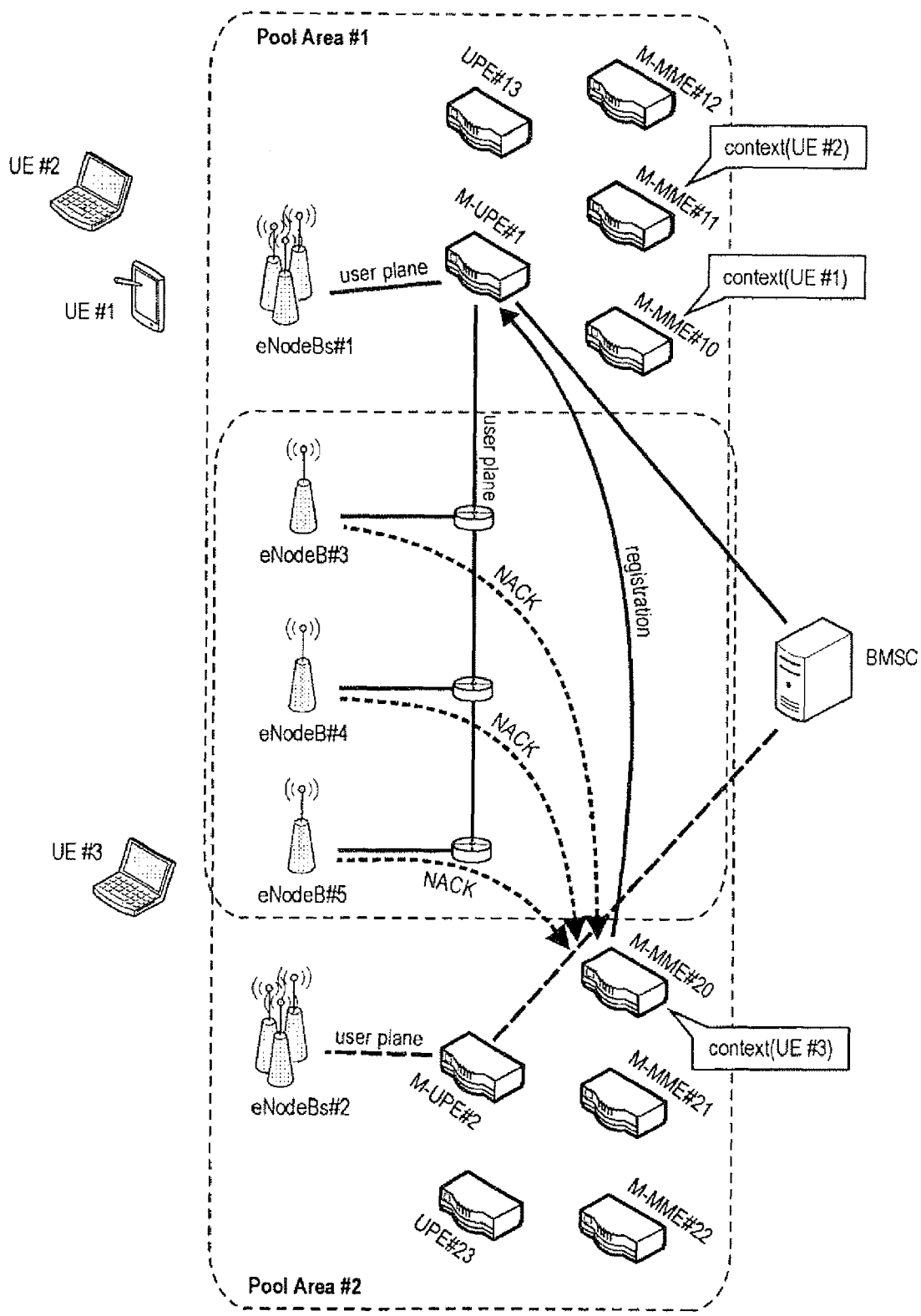
FIG. 25 exemplarily illustrates the established user planes via intermediate hops to a common user plane entity selected by the eNode Bs in the overlapping region of the pool areas for providing the service in response to the session start messages (see FIG. 24) and the exemplary registration of mobility management entities at the common user plane entity according to an exemplary embodiment of the invention.

As indicated in FIG. 25, it may be assumed for exemplary purposes that all base stations eNodeB #3, eNodeB #4 and eNodeB #5 in the overlapping region of Pool Area #1 and Pool Area #2 select M-UPE #1 of Pool Area #1 for providing the user plane for the service. The base stations may further positively acknowledge (ACK) the session start messages that have indicated the selected user plane entity M-UPE #1 (not shown in FIG. 25). All other session start messages are rejected (i.e. negatively acknowledged) by the base stations eNodeB #3, eNodeB #4 and eNodeB #5 by means of NACK messages. Further, the base stations eNodeB #3, eNodeB #4 and eNodeB #5 may send a notification to the mobility management entities of which session start messages have been rejected, wherein the notifications may include information on the selected user plane entity allowing the mobility management entities to update their service registration at the selected user plane entity (as will be explained below in further detail). This notification may for example be sent together with the rejection of the session start messages.

Figure 23:
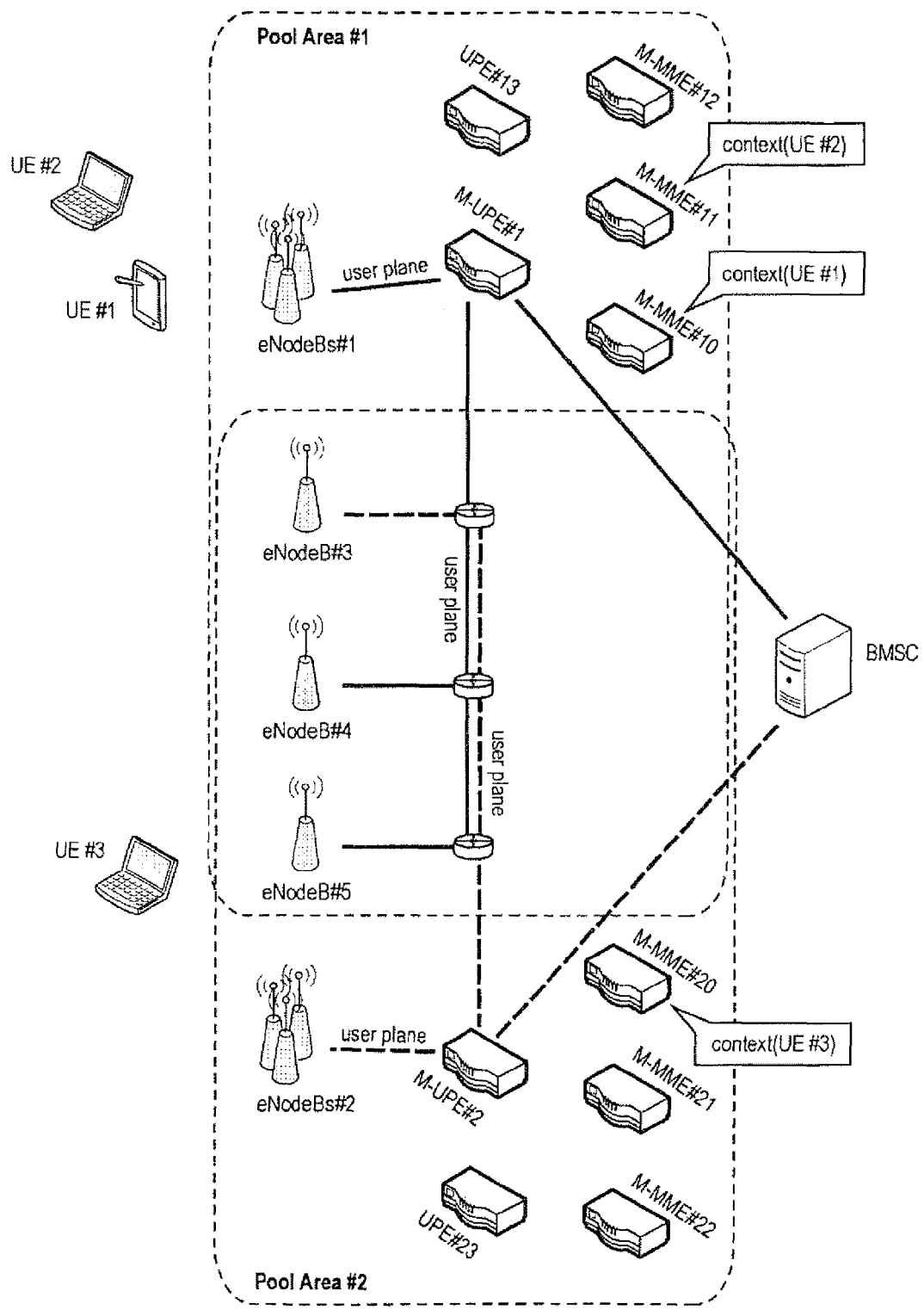
FIG. 23 exemplarily illustrates the established user planes via intermediate hops for a scenario where different UPEs have been chosen by the eNode Bs in the overlapping region of the pool areas for providing the service in response to the session start messages (see FIG. 22).

One potential problem with the solution described with respect to FIG. 23 and FIG. 24 above may be that the session start messages from different mobility management entities might not be sent in synchronized fashion to the base stations. Generally, mobility management entities typically send control messages such as session start messages via point-to-point links to all base stations in their pool area (e.g. utilizing in existing Stream Control Transmission Protocol (SCTP) connections). Therefore, different base stations might experience different delays for receiving the session start messages from different mobility management entities. To account for delays, the base stations may configure some waiting time before selecting a user plane entity for the multicast or broadcast service. The waiting time should to be long enough to assure that all base stations received the same set of session start messages. On the other hand the waiting time should be as short as possible, as it directly accounts to the overall delay of the session start procedure.

The signaling delay between an MME and an base station is characterized by the round trip time (RTT) of the signaling connection. Accordingly, the base stations may measure and store the round trip time to all mobility management entities and may configure the waiting time (after receiving the first session start message) so as to be equal to the highest round trip time. Optionally, some pre-configured additional time may be added to this highest round trip time by all base stations that allows for taking into account mobility management entity processing delays. However, this delay may be negligible because the mobility management entities are typically designed to handle and distribute large amounts of signaling messages with low delay, e.g. considering paging of multiple terminals.

Another aspect regarding above-described solutions for choosing the same user plane entity by all base stations in the overlapping part of different pool areas is that in some alternative solutions there might still be some remaining risk of base stations selecting different user plane entities. For example considering that same number of UE contexts is indicated in session start messages from different mobility management entities this could result in the selection of different user plane entities by the base stations in the overlapping part of the pool areas as the base stations may have to arbitrarily select between the different messages. Therefore, a combination of different selection criteria outlined above may be foreseen as a decision rule in order to achieve an unambiguous selection of the same common user plane entity by at all base stations in the overlapping part of the pool areas. For example, the selection could be based on a combination of indicated number of UE contexts and an identifier value (such as the MME-ID or UPE-ID).

Another alternative solution according to a further embodiment of the invention may be to configure the base stations in the overlapping part of the pool areas to autonomously negotiate a selected user plane entity. For example, one of the base stations in the overlapping region of the pool areas may be designated as a "master" base station. This designated base station may autonomously select one of the user plane entities indicated in the session start messages it received from the mobility management entities. This selection may be for example done on additional information in the session start messages as described above. Upon having selected a user plane entity that master base station may inform the other base stations in the overlapping region of the pool area on its decision so that also these base stations select the indicated user plane entity. Accordingly, all base stations would thus select the same user plane entity and may acknowledge or reject the session start messages as explained above. This alternative solution may have the drawback of further imposing delay on the session start procedure, as the master base station needs to signal its decision (i.e. an identification of the selected user plane entity and the service identifier to indicate for which service the selection has been made) to the other base stations. However, this solution may still reasonable for example, where the base stations in the overlapping region of the pool area maintain direct interfaces or are serially connected to each other, so that the signaling delay is acceptable.

In the embodiments described above, the selection of a common user plane entity is performed at the base stations that are located in the overlapping area. Another option is that the mobility management entities of the overlapping pool areas coordinate selection of a common user plane entity to be used for establishing the user plane for a service to the base station in the overlapping part of the pool areas.

Figure 26:
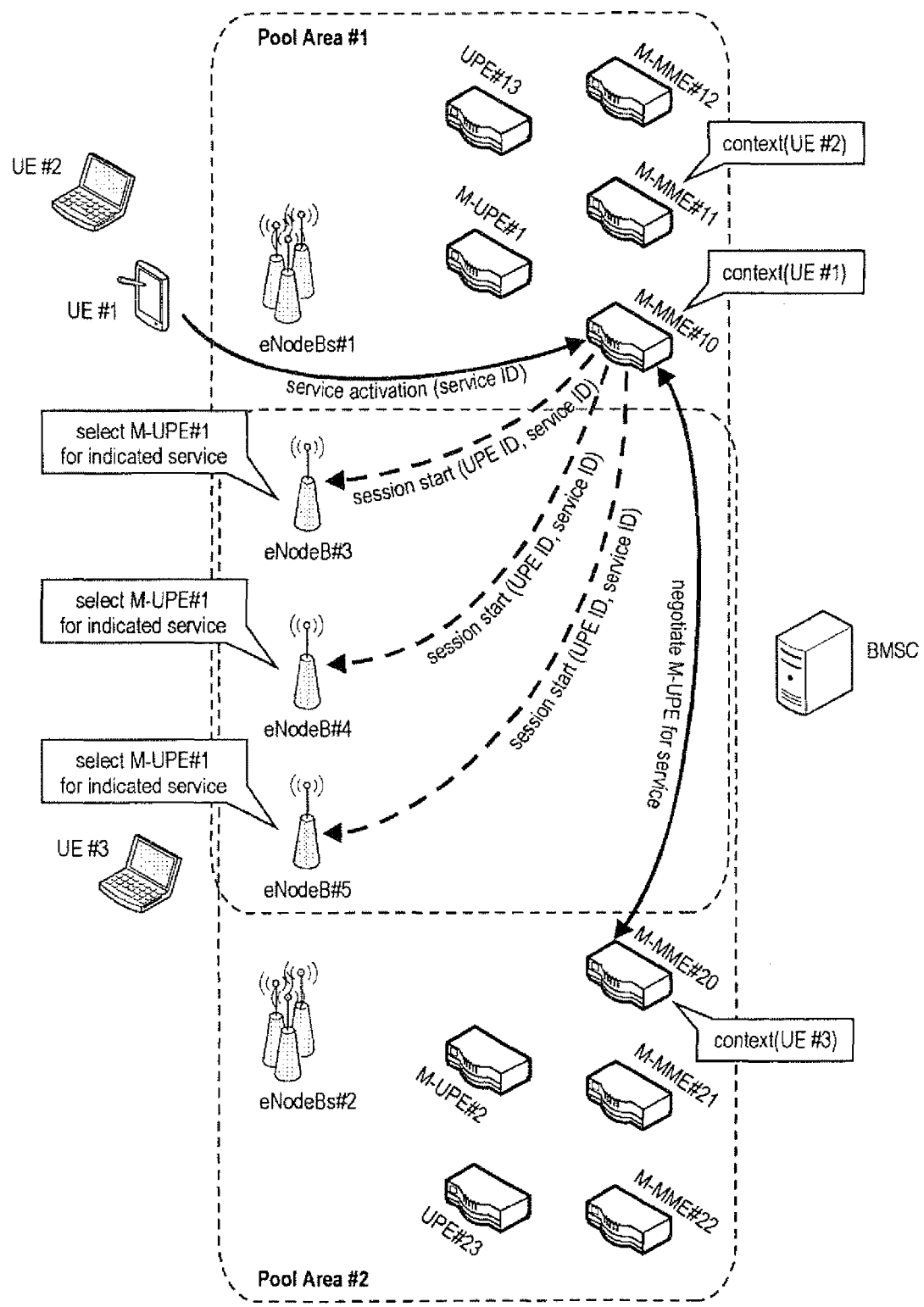
FIG. 26 exemplary shows the selection of a common user plane entity by the mobility management entities of overlapping pool areas in a 3GPP SAE/LTE system and the transmission of session start messages indicating the common user plane entity to base stations (eNodeBs) located in the overlapping region of the pool areas according to an exemplary embodiment of the invention.

FIG. 26 exemplary views the negotiation of a common user plane entity by mobility management entities of overlapping pool areas and the transmission of session start messages by mobility management entities of overlapping pool areas in a 3GPP SAE/LTE system to base stations (eNodeBs) located in the overlapping region of the pool areas according to an exemplary embodiment of the invention. In this exemplary embodiment, it may be again assumed for exemplary purposes only that the mobility management entities in Pool Area #1 have been preconfigured to select M-UPE#1 for multicast or broadcast service, while the mobility management entities in Pool Area #2 have been preconfigured to select M-UPE#2 for multicast or broadcast service.

As will be explained in further detail below, the negotiation of a common user plane entity for the user plane of a particular multicast or broadcast service may be performed by control signaling between specially designated mobility management entities of the respective pool areas (for example by M-MME #10 of Pool Area #1 and M-MME #20 of Pool Area #2) that propagate the result of the negotiation to the remaining mobility management entities of the respective pool areas. Another exemplary solution may be to negotiate the common user plane entity by control signaling between the mobility management entities of the respective overlapping pool areas. The negotiation may be performed proactive, i.e. prior to a session start procedure, or reactive in response to a trigger such as for example service activation by a mobile terminal, a notification from an access node (base station) that it has received multiple session start messages indicating different user plane entities, or upon request by the BMSC.

Similar to the example above where a master base station has been responsible for the user plane entity selection for a service and the communication of the selection result to the other base stations in the overlapping region of the pool areas, one master mobility management entity per pool area could be designated or pre-configured and will be responsible to negotiate a common user plane entity with the designated mobility management entity (of mobility management entities) of the other pool area(s) according to one embodiment of the invention. For example, in the scenario shown in FIG. 26, M-MME #10 of Pool Area #1 and M-MME #20 of Pool Area #2 could be designated mobility management entities.

The designated mobility management entity is known to all mobility management entities in the respective pool area.

Further, the designated mobility management entities of different pool area are also aware of the other designated mobility management entities in the other pool areas. This could be either realized by storing the respective identifiers of the designated mobility management entities or alternatively, if for example using an IP address as an MME identifier, the designated mobility management entities may listen to a well known IP address formed by the respective prefix of the pool area and suffix known to all nodes in the network.

Another alternative would be that the mobility management entities listen to or subscribe to a pre-configured notification channel by joining an IP multicast address. The signaling for the common user plane entity selection may be carried on this channel.

Accordingly, the designated mobility management entities may negotiate the selected user plane entity among each other by exchanging control signaling messages for example via point-to-point links, i.e. explicitly addressing the respective other designated mobility management entities (or mobility management entity). The designated mobility management entities may inform each other on the potential further user plane entity or user plane entities of the other pool areas that could potentially serve the base stations in the overlapping part of the pool areas and the service for which an user plane entity selection should be made. For example, M-MME #10 of Pool Area #1 could inform M-MME #20 of Pool Area #2 that M-UPE #1 is a potential user plane entity that could be selected for the service.

As outlined with respect to FIG. 24 and FIG. 25 above, the information signaled to the respective other designated mobility management entity may be similar to the supplementary information included to the session start messages in the previous embodiments and also a similar selection rule may be used to allow the designated mobility management entities to unambiguously select one of the user plane entities. Upon having selected the user plane entity for the service, the designated mobility management entities may propagate the selection result to the mobility management entities in the respective pool areas.

Accordingly, prior to informing the respective other designated mobility management entities on the potential user plane entity for the service, the designated mobility management entities may query the respective numbers of relevant UE contexts for the service maintained at the other mobility management entities of the respective pool area and may sum up the numbers to derive the total number of mobile terminals having activated the service in the respective pool area. In the negotiation of the common user plane entity, the user plane entity suggested by the designated mobility management entity having indicated the highest number of mobile terminals having activated the service in the respective pool area may be selected as the common user plane entity. Another option is to include a random number or a hash value with a low probability of duplicates to the negotiation messages. It is also possible to base the selection on some sortable identifier (e.g. UPE-ID, MME-ID, PA-ID) as explained previously.

In another alternative solution, which may be applicable to situations where two pool areas overlap, one designated mobility management entity (e.g. M-MME #10 of Pool Area #1) could inform the designated mobility management entity of the other, second pool area (e.g. M-MME #20 of Pool Area #2) on the potential user plane entity (M-UPE #1) that could be selected for the service. Further, the control message conveying this information may further include additional information to facilitate an appropriate selection of an user plane entity as explained above. Upon reception of this information, the designated mobility management entity of the second pool area may gather information it needs for selecting the user plane entity for the service (if not yet present) and may subsequently select a common user plane entity for the service. Subsequently, the mobility management entity of the second pool area may inform the mobility management entity of the first pool area on its selection.

In the examples above, designated mobility management entities in the respective pool areas have been in charge of negotiating the common user plane entity for a multicast or broadcast service. In another embodiment, all mobility management entities of the pool areas having an overlap region may be involved in the negotiation of the user plane entity. Similar to the selection of a common user plane entity by the base stations in the overlapping part of the pool areas, the mobility management entities may autonomously select all the same user plane entity based on similar decision rules and criteria. In order to facilitate this autonomous selection, the mobility management entities may exchange their respective preferred user plane entity for the service (typically the designated user plane entity in the own pool area) to the other mobility management entities of the overlapping pool areas so that all mobility management entities are aware of the available user plane entities that can be chosen. Further, the mobility management entities may also propagate additional/supplementary information for the selection such as the number of UE context maintained by the respective mobility management entity as previously explained herein.

In order to allow the mobility management entities an efficient way to communicate the messages to negotiate a common user plane entity, all mobility management entities of the overlapping pool areas may subscribe to a negotiation channel on which an IP multicast address could be configured that may be used to provide the negotiation messages to all other mobility management entities.

Another possibility to select a user plane entity for providing the user plane to the base station in the overlapping pool area region in case of using a proactive scheme may be the selection of the user plane entity located in the pool area of the first mobility management entity to receive a service activation from a mobile terminal. This is exemplarily shown in FIG. 26, wherein M-MME #10 receives a service activation from UE #1. In response to the service activation M-MME #10 may establish a service related user context for UE #1 and may inform the mobility management entities in pool area #1 and in pool area #2 on its selection of the user plane entity of pool area #1, i.e. M-UPE #1. Accordingly, all other mobility management entities of in pool area #1 and in pool area #2 will also "select" this user plane entity for the service.

Accordingly the mobility management entities will also include a respective identification of M-UPE #1 in the session start messages that will be provided to the base station eNodeB #3, eNodeB #4 and eNodeB #5 and the mobility management entities may all register at M-UPE #1 for the service as will be explained below. As shown in FIG. 26, M-MME #10 (and potentially also all other mobility management entities of pool area #1 and pool area #2 at which a mobile terminal has activated the service) transmits a session start message to all base stations in the overlapping part of the pool areas that indicates selected M-UPE #1 for the user plane of the service.

Hence, in this example, the user plane entity selected by a first mobility management entity to receive a service activation for a service will be also subsequently used by all other mobility management entities for the respective service.

The selection of a common user plane entity for a service by the core network nodes such as for example a mobility management entity may be triggered by different events. For example when receiving (a first) service activation request from a terminal for as particular multicast or broadcast service, the mobility management entity could proactively trigger the user plane entity selection. If designated "master" mobility management entities are responsible for the common user plane entity negotiation and the service activation request is received at a non-designated "slave" mobility management entity, this mobility management entity may trigger the common user plane entity negotiation by a respective request to the designated "master" mobility management entity of its pool area. Such request may for example indicate the service for which the selection should be performed and optionally, depending on the selection rules, further parameters for use in the selection procedure.

Another option is to reactively trigger the coordination on specific notification by the base stations, e.g. requesting resolution of conflicting session start messages. For example, upon having received the session start messages from different mobility management entities that yield different user plane entities (as for example shown in FIG. 24) the base stations may respond to the session start messages by a notification that triggers the selection of the common user plane entity. This notification may for example comprise an identification of the (other) mobility management entities a respective base station has received a session start message from for a respective service and/or may (further) indicate the user plane entities that that have been indicated in the session start messages. Upon having selected the common user plane entity in response to the trigger the base stations may either receive updated session start messages from one or more mobility management entities or another signaling message that indicates the common user plane entity for the service.

Another option to detect at the mobility management entity that a conflicting situation might exist at the base stations, may be based on receiving ACK and NACK messages for the same session start from different base stations. Similar to the reactive option above, this may trigger the common user plane entity selection by mobility management entities and the result of the selection is communicated to the base stations in the overlapping region of the pool areas, so that they all establish the user plane to the same user plane entity.

In any reactive option for a common user plane entity selection described above at least one mobility management entity (e.g. one of the designated mobility management entities) should notify the base stations in the overlapping pool area region on the selected user plane entity.

In case of a proactive common user plane entity selection, the selection of the common user plane entity for a service is performed prior to the service activation. Accordingly, upon service activation the user plane entity for the user plane for the multicast or broadcast service has been selected upon service activation so that the mobility management entities may all indicate the same user plane entity to the base stations in the overlapping region of the pool areas in their session start messages. It should be recognized that it would be of course sufficient if only one single mobility management entity would inform the base station on the user plane entity to which the user plane is to be established. However, due to the mobility management entities not necessarily knowing whether mobile terminals have activated the service at the respective other mobility management entities, every mobility management entity in the pool areas may transmit the session start messages to the base station in the overlapping part of the pool areas.

Alternatively, e.g. in cases where the transmission of the session start messages is independent of the prior service activation of the users (e.g. for broadcast services) one mobility management entity (e.g. the designated "master" mobility management entity of a pool area) may transmit the session start messages to all base station in the overlapping part of the pool areas and the other base station of its pool area, whereby the session start messages addressed to all base station in the overlapping part of the pool areas all indicate the same, i.e. common user plane entity for the service.

As mentioned above one option how the mobility management entities could coordinate the common user plane entity selection for the overlapping pool area is to use point-to-point communication. This might require some signaling between each affected mobility management entity. Considering scenarios where a high number of mobility management entities are involved in the user plane entity selection this control signaling may lead to a high signaling load. On the one hand this leads to inefficient use of resources, i.e. of the mobility management entities themselves and of the transmission network between them. On the other hand, considering the reactive trigger cases, this might also increase the delay of session start. Therefore, some means have to be taking into account how to limit the required signaling.

As mentioned above, it is assumed that all mobility management entities within an MME pool can select the same user plane entity. For example the user plane entity to use for multicast or broadcast services may be statically pre-configured in all mobility management entities of a pool area. Another option might be that the user plane entity to use for a multicast or broadcast service is dynamically selected in all mobility management entities of a pool area based on O&M (Operation & Maintenance) mechanisms, e.g. for load balancing. In a similar way a designated mobility management entity (or "master" M-MME) could be selected within a pool area, which is responsible for coordinating the common user plane entity selection with other "master" M-MMEs located in different pool areas. The result of selection procedure is subsequently informed to the other mobility management entities in the respective pool area. This way the number of mobility management entities involved in the coordination procedure is reduced which limits the required signaling.

In the alternative solution above, where only designated mobility management entities of the respective pool areas transmit session start messages the control signaling for the common user plane entity selection may be significantly reduced, as only the designated mobility management entities of the different pool areas need to negotiate a common user plane entity. The result of the negotiation may not be signaled to the other mobility management entities, as the designated mobility management entities are also responsible for triggering the establishment of the service's user plane to the correct that means selected common user plane entity. However, as this approach may not take into account whether any mobile terminal has activated the service (in case no mobile terminal has activated the service at the designated mobility management entity) this may lead again to a potentially less efficient resource utilization as the user plane might be established, even if no terminal activated the service.

The utilization of point-to-multipoint communication by the mobility management entities, for example by means of an IP multicast address, is another option to coordinate selection of a common user plane entity. As mentioned above, all mobility management entities might join an IP multicast notification channel. Generally, for the coordination to work properly, it should be assured that all affected mobility management entities come to the same selection result. However, if control signaling for the common user plane entity selection is sent on the multicast notification channel it might not be assured that the signaling messages are received by all other mobility management entities, as IP multicast transmission is typically unreliable. Accordingly, not all mobility management entities may end up with the same list of possible user plane entities to select from.

As described above, one possibility to select a user plane entity for providing the user plane to the base station in the overlapping pool area region is to use a proactive scheme. For example the user plane entity located in the pool area of the first mobility management entity to receive service activation from a mobile terminal is selected. In order to achieve this, a mobility management entity receiving the first service activation from a mobile terminal selects a user plane entity and notifies this on the IP multicast notification channel also indicating the respective service identifier. As this notification is received by all other mobility management entities also subscribed to the same IP multicast notification channel, they can all use and register at the same user plane entity for providing the user plane of a multicast broadcast service to the overlapping part of the pool area, when receiving subsequent service activations for the same service.

However, as mentioned above, the unreliable nature of the IP multicast notification channel pose a problem for the coordination to work properly. One option to overcome this problem may be that the mobility management entities repeat their notification of the commonly selected M-UPE on the IP multicast channel. For example each time a mobility management entity receives a service activation request from a terminal, it may notify the user plane entity indicated by the mobility management entity that received the first service activation from a mobile terminal. The repetition of the notification of the common user plane entity enhances the reliability that it is received by all mobility management entities at least once.

Another option to assure a reliable coordination of a common user plane entity selection is that mobility management entities might constantly monitor the notification channel. In case a different selected user plane entity is notified compared to their currently selected one, they might send a query message on the notification channel querying repeated notification of the common user plane entity. According to the responses the mobility management entity might correct its current selection and/or registration.

Another aspect to consider may be the reduction of possible session start delay for reactively triggered user plane entity coordination triggered by the base stations. In this exemplary case, the base stations have to wait until the mobility management entities have resolved a common user plane entity to use in the overlapping pool area, which might lead to a high delay of session start. Optionally the base stations might be allowed to initially establish multicast user planes to different user plane entities, but possibly switch to the common user plane entity when resolved by the mobility management entities at a later stage. This way the additional session start delay could be avoided at the expense of slightly increased signaling.

Figure 27:
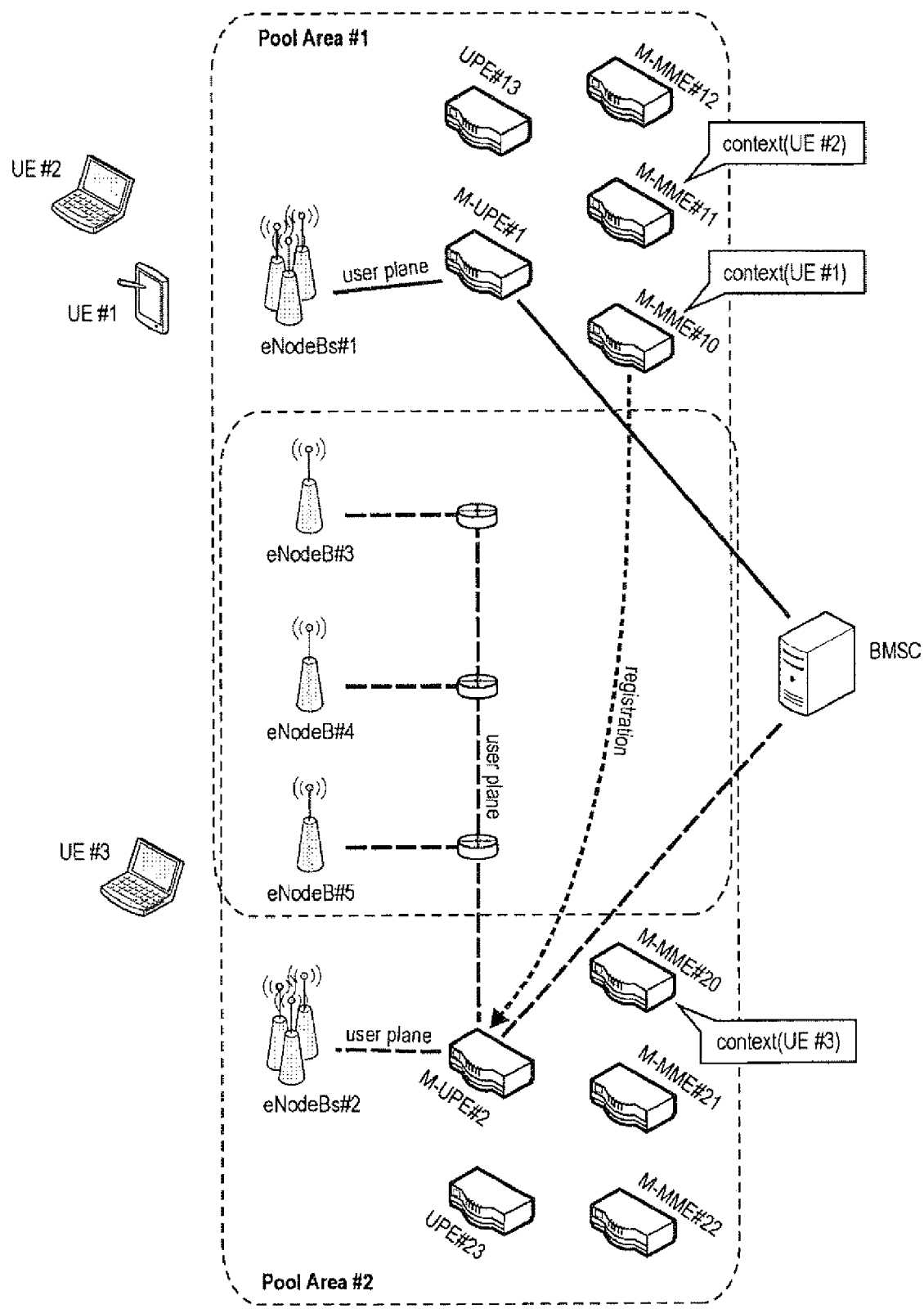
FIG. 27 exemplarily illustrates the established user planes via intermediate hops between a common user plane entity and the eNode Bs in the overlapping region of the pool areas for providing the service in response to the session start messages (see FIG. 26) according to an exemplary embodiment of the invention.

FIG. 27 exemplary views the established user planes in the overlapping part of pool areas in a 3GPP SAE/LTE system between base stations (eNodeBs) located in the overlapping region of the pool areas and the common user plane entity according to an exemplary embodiment of the invention. In this example, it is assumed for exemplary purposes that the common user plane entity selection by the mobility management entities of pool area #1 and pool area #2 has resulted in the selection of M-UPE #2 in pool area #2 so that eNodeB #3, eNodeB #4 and eNodeB #5 have established the user plane to M-UPE #2 for the multicast service. As will be explained in more detail below, in order to ensure service continuity the mobility management entities of pool area #1 (such as M-MME #10) may register at the selected user plane entity (M-UPE #2) upon receiving a service activation from a terminal. It should be noted that the selection of a common user plane entity may of course also result in the selection of M-UPE #1 in pool area #1, which would result in the establishment of the user planes as shown in FIG. 25 and may additionally cause mobility management entities of pool area #2 to register at the M-UPE #1 to ensure service continuity.

Further, it should be noted that in case a proactive common user plane entity selection is performed the mobility management entities may not have yet established a multicast or broadcast service related context for the multicast or broadcast service. If the mobility management entities do not maintain service context yet, they may generate and maintain a service related context in which the common user plane entity for the service may be stored. Generally, a mobility management entity may store further information, for example some kind of state information, in addition to the common user plane entity in the service related context. This state information may for example indicate whether a service corresponding to the service related context is ongoing or not, e.g. the service is active or standby. In a similar way the state information might indicate whether the maintaining mobility management entity already received a service activation from at least one mobile terminal or not. This information might be used by the maintaining mobility management entity to decide whether it is required to send a session start message to the base stations in the overlapping part of the pool areas and the other base station of its pool area when triggered by reception of a session start indication from a multicast or broadcast service centre (BM-SC).

Another embodiment of the invention relates to the use of a centralized network node, such as the BM-SC for ensuring the establishment of user planes to one common user plane entity for a multicast or broadcast service for the overlapping part of different pool areas. For example, a mobility management entity receiving a service activation request for a multicast service might query the BM-SC, if it has information about a common user plane entity to use for the service. The request may for example comprise the service identifier of the service in question. Further, the request may additionally indicate the user plane entity that would be preferred by the requesting mobility management entity. In case a common user plane entity has previously been registered for the service the BM-SC may respond to the query by indicating the common user plane entity to the requesting mobility management entity (e.g. by means of a user plane entity identifier). If no common user plane entity has been registered at the BM-SC yet (e.g. in a service related context, such as an MBMS service context) the BM-SC could register the user plane entity indicated by the requesting mobility management entity, i.e. may "select" the indicated user plane entity as the common user plane entity for the service.

The common user plane entity is only relevant for the base stations located in the overlapping area, as only these eNodeBs are able to connect to user plane entities located in different pool areas. In comparison the eNodeBs located in the non-overlapping part of a pool area can only connect to those user plane entities also located in the respective pool area. It is assumed that the mobility management entity can derive from the service activation request sent by the mobile terminal from which tracking area it was sent. This information can be used at the mobility management entity to decide whether the BM-SC needs to be queried or not, i.e. whether the request was sent from an eNodeB (or cell) in the overlapping area. If so, the mobility management entity may also include the tracking area information, which might be used to identify the respective overlapping area, in the query sent to the BM-SC in order to check whether a user plane entity is already registered for the respective overlapping area at the BM-SC.

In case the BM-SC response indicates a user plane entity, the mobility management entity will use this in subsequent session start messages sent to the base stations in the overlapping area.

In the other case where no user plane entity is indicated in the response (under the assumption that an indication of the mobility management entity's preferred user plane entity is not included in the query), the mobility management entity may register its own selected user plane entity at the BM-SC.

An overlapping region of a pool area might consist of several tracking areas. Therefore, when registering an user plane entity at the BM-SC, the mobility management entity may further include information about all relevant tracking areas in the overlapping pool area region to the registration (or the query if including the preferred user plane entity in the query) in order to keep the BM-SC agnostic of network topology issues. In any case all mobility management entities are ensured to include same user plane entity in the session start messages sent to base stations in the overlapping area.

The registration of common user plane entity at the BM-SC, as described above, may comprise the storage of network node identifiers and tracking areas at the BM-SC in addition to handling the required signaling messages for querying or registering this information. Support of this functionality might require some adaptation of a standard BM-SC, which might be undesired because this would possibly increase the costs of these entities. Therefore, it might be important to minimize required changes to the BM-SC as much as possible.

The required baseline functionality is to centralize the decision on a common user plane entity to use for the overlapping pool area from a set of possibly different user plane entities selected by different mobility management entities. Instead of coordinating a common user plane entity via the BM-SC at (each) service activation from an mobile terminal, the mobility management entities of the different overlapping pool areas could use the BM-SC to resolve multiple user plane entities at the time of session start. When session start is triggered (by BM-SC) all mobility management entities may transmit a request containing their selected/preferred user plane entity to the BM-SC. The request may also comprise session and/or service identifier. The BM-SC may resolve the user plane entities provided in the requests and send a response including the same user plane entity to all mobility management entities, which is subsequently used by all mobility management entities when sending the session start message to the base stations in the overlapping area. The common user plane entity included in the response might, for example, be the one indicated in the first message from a mobility management entity. This way the BM-SC does not need to maintain and store of user plane entity identifiers or location area information. The BM-SC response might be a simple copy of the first mobility management entity request message.

As outlined above a potentially problematic situation for multicast service provisioning to a base station in an overlapping pool area arises, when two or more mobile terminals that are registered to different pool areas receive the same multicast service. This may be particularly problematic in case the mobile terminals are registered to pool areas not providing the multicast user plane and are in idle mode. In one embodiment of the invention, idle state means that the mobile terminals are only known to their respective mobility management entities on a pool area level/tracking area level. As idle mode mobile terminals may also not have a control connection to a base station, the base stations do not have any information about these mobile terminals (such as their location within the network) and it is unknown to which base station in the pool area/tracking area the mobile terminals are attached. The selection of a common user plane entity for the user plane of the service alone may also not resolve the problematic situation.

There might be several possibilities how this situation arises. One possibility, already described above, is that mobile terminals connected to the same base station in an overlapping area are attached to different mobility management entities in different pool areas/tracking areas and are activating the same multicast service. When the service is imminent to start the mobility management entities send (or alternatively request a user plane entity in the respective pool area to send) a multicast session start message the base stations in their pool area to trigger the establishment of a user plane for the multicast service to a respective user plane entity in a respective pool area. The base station in the overlapping pool area receives multiple multicast session start messages and selects one in order to avoid establishment of duplicate multicast user planes for the same service. If now the mobile terminals, attached to the pool area that does not provide the multicast user plane, transit to the idle state, a potentially problematic situation is created as neither the multicast service registration of those mobile terminals is known to the mobility management entities or user plane entity in the pool area that provides the multicast user plane nor can the base station keep track of the attachment status of those mobile terminals, as same are in idle mode.

In another possibility only mobile terminals connected to the base station in the overlapping pool area that are all attached to the same pool area are present. When the service is started, a multicast user plane is established in that particular pool area. If now, due to mobility, an idle mode mobile terminal, which is initially attached to another pool area and which also activated the same multicast service, selects this base station in the overlapping pool area, a potentially problematic situation is created.

According to one exemplary embodiment, service loss in a multicast service may be prevented by allowing the mobility management entity in the pool area hosting the idle mode mobile terminals to register at the user plane entity in the pool area providing the multicast user plane. In order to perform this registration several problems may have to be overcome.

An access node in an overlapping pool area knows to which multicast session start message it initially responded (i.e. positively acknowledged). In other words, the access node is aware to which user plane entity and particularly to which pool area it has established a multicast user plane. However, the access node may typically not trigger the registration procedure, as it may have no knowledge of idle mode mobile terminals within its service area. The mobile terminals in idle mode may only be known to their respective serving mobility management entities. Also a mobility management entity serving an idle mode mobile terminal may potentially not trigger the registration procedure, as it on the one hand does not know to which particular access node an idle mode mobile terminal is listening and on the other hand the mobility management entity may not know to which user plane entity and pool area a access node maintains a multicast user plane.

In idle mode, only the mobile terminal may know to which particular access node it is listening. For exemplary purposes it may be assumed that the mobile terminals in idle mode still receive system information, which is broadcasted by the access node. This system information may also include information on multicast services available in the service area of a respective access node. However, from this multicast service information, a mobile terminal may only derive general availability of a particular multicast service. In order to enable the mobile terminal to trigger the registration procedure, in accordance with an exemplary embodiment of the invention it is proposed to extend this multicast service information provided by the access nodes. In this extended multicast service information, the access node may further transmit tracking area/pool area information of the selected user plane entity or an identifier of the selected user plane entity. Only the access nodes in overlapping parts of two or more pool areas/tracking areas may transmit this extended multicast service information or, alternatively, all access nodes of the pool area/tracking area could transmit the extended multicast service information, for example as part of the system broadcast information.

The access nodes may for example derive the tracking area/pool area information of the selected user plane entity or an identifier of the selected user plane entity from the multicast session start messages. Concerning for exemplary purposes a 3GPP SAE/LTE system the extended multicast service information may be transmitted on the point-to-multipoint MBMS Control Channel (MCCH), which is also received by mobile terminal in idle mode.

Of course a mobile terminal, does not only know to which access node it is listening when being in idle mode. From the context information stored at the mobile terminal, it might also know to which tracking area/pool area it is currently registered. A mobile terminal may generally be supposed to be aware of its current tracking area in systems where the mobile terminals perform a tracking area/pool area update procedure in case it crosses a pool area/tracking area boundary. Therefore, a mobile terminal may constantly compare the broadcasted tracking area/pool area information to the stored tracking area/pool area and in case of difference triggers a tracking area update procedure.

Regarding above-mentioned concept of multi-tracking area registration a mobile terminal might be registered to multiple tracking areas simultaneously. In this case all registered tracking areas might be stored in context information at the mobile terminal. Further, it may constantly compare the broadcasted tracking area information to the stored tracking areas. The mobile terminal would trigger a tracking area update procedure in case the broadcasted tracking area is different to any of stored tracking areas.

Figure 6:
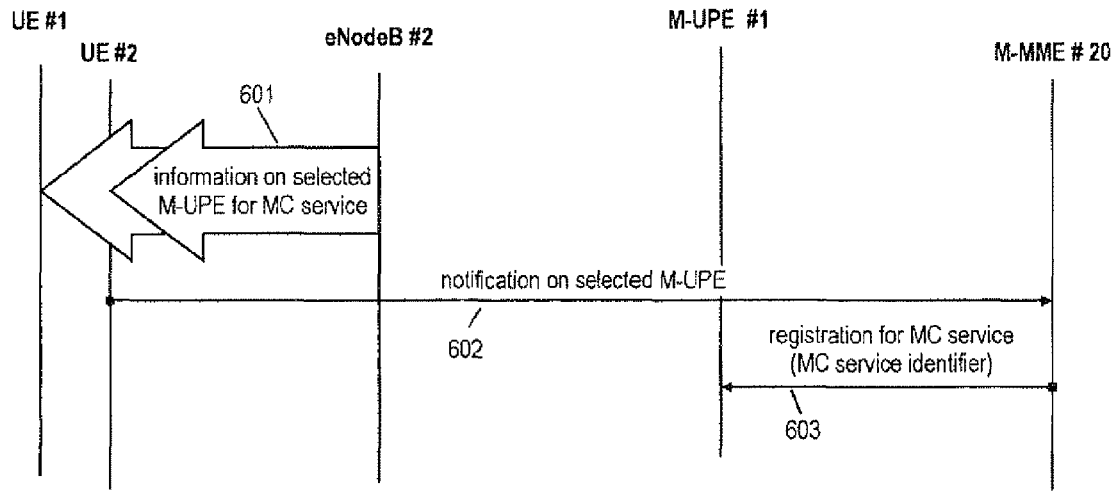
FIG. 6 shows a sequence of exemplary steps in a 3GPP SAE/LTE system for registering a mobility management entity serving a mobile terminal at a user plane entity to which the multicast user plane is established in response to a trigger from the mobile terminal according to an exemplary embodiment of the invention.

According to another exemplary embodiment of the invention a similar approach may be employed for the update of service registration for multicast services. This approach will be outlined with respect to FIG. 6 in the following. A mobile terminal that previously activated a multicast service may receive 601 the multicast service information from the access node (eNodeB #2) to which it is currently attached. From this information the mobile terminal may derive the information of the tracking area/pool area that provides the multicast user plane. Comparing the received information of the multicast user plane to the stored context information, the mobile terminal can detect whether the multicast service is provided from a different tracking area/pool area. In such a case it triggers 602 an update of the service registration at its mobility management entity, e.g. by sending a notification informing its mobility management entity (M-MME #20) on the selected pool area (Pool Area #1) providing the user plane for the multicast service or alternatively the identifier of the user plane entity (M-UPE #1) providing the user plane for the multicast service.

In an exemplary embodiment related to a 3GPP SAE/LTE system this notification could be represented as a Non-Access Stratum (NAS) message exchanged between the mobile terminal (UE #2) and the current attached mobility management entity (M-MME #20).

Receiving this notification (or trigger message) from a mobile terminal (UE #2), the mobility management entity (M-MME #20) may register 603 at the user plane entity (M-UPE #1) in different tracking area/pool area (Pool Area #1). The tracking area/pool area and the respective user plane entity to contact may for example be derived from the content of the notification from the mobile terminal (UE #2).

The user plane entity (M-UPE #1) may store information about all mobility management entities that have registered for a particular multicast service. This stored information could for example comprise mobility management entity identities and tracking area/pool area information. Alternatively, the user plane entity (M-UPE #1) could maintain a counter indicating the number of registered mobility management entities. The registration procedure may for example utilize a direct interface between mobility management entity M-MME #20 of pool area #2 and user plane entity M-UPE #1 of pool area #1 or may be realized via the mobility management entity M-MME #10 in the pool area #1 of the user plane entity providing the multicast user plane.

Figure 7:
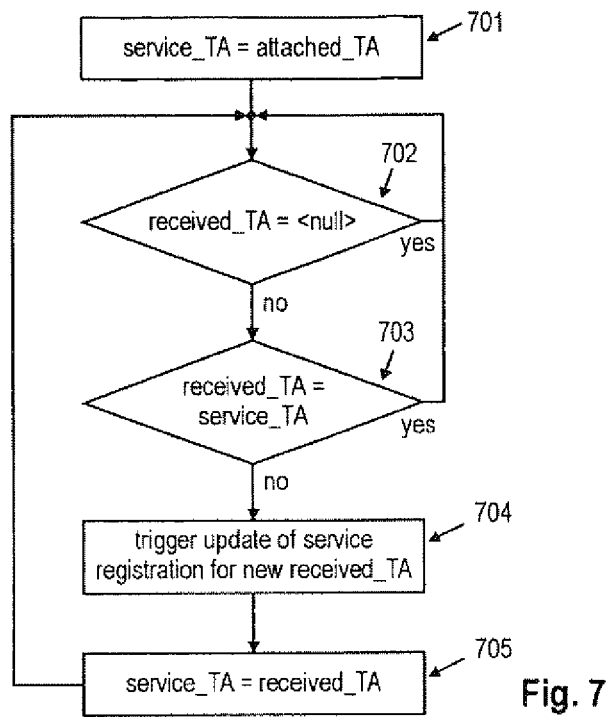
FIG. 7 shows an exemplary flow chart of a procedure in a 3GPP SAE/LTE system performed by a mobile terminal for detecting whether to trigger a registration of its mobility management entity at a user plane entity to which the multicast user plane is established according to an exemplary embodiment of the invention.

Further, FIG. 7 exemplifies the procedure performed at the mobile terminals in order to detect when to trigger an update of the service registration according to one exemplary embodiment of the invention. For exemplary purposes it is assumed in this embodiment that a tracking area corresponds to a pool area. The procedure may be applicable to mobile terminals in both, idle mode and active mode.

Service_TA denotes the tracking area/pool area from which service provisioning is expected. Initially this Service_TA is set 701 to the currently attached tracking area/pool area (attached_TA). The mobile terminal may continuously determine 702 whether it has received multicast service information from the access node to which it is attached. The received_TA, may be decoded from the broadcasted multicast service information and indicates the tracking area/pool area to which the transmitting access node has established the user plane for the multicast service. Comparing 703 both parameters, received_TA and service TA, the mobile terminal can detect if the multicast service is provided by a different tracking area/pool area. In the latter case, an update of the service registration is triggered 704 by the mobile terminal at its mobility management entity in the pool area to which the mobile terminal is attached and the parameter service_TA may be set 705 to the received_TA. Generally, the multicast service provisioning is expected from currently attached tracking area/pool area of the mobile terminal. If the mobile terminal detects that this is not the case, the procedure applies. The procedure may continue during the entire multicast service reception and may be re-initiated after each handover to another administrative area including a tracking area update procedure.

During an ongoing multicast service a mobile terminal that receives the service may be removed from its attached mobility management entity. There are several reasons for this. For example, the mobile terminal stops receiving the multicast service. In this case it typically deactivates the multicast service at the mobility management entity. Another example, may be that the mobile terminal moves to another administrative area (pool area), which implies the transfer of mobile terminal control to another mobility management entity. A further reason might be that the mobile terminal moves out of coverage, runs out of battery or other failure situations occur, which makes the terminal disappear from the network. In any such case, the service context information or even the complete mobile terminal context information (comprising the multicast service context information) is typically removed from the mobility management entity.

Using the individual mobile terminal context information, the mobility management entity may build service context information comprising at least the number of mobile terminals that activated a particular service. Regarding a multicast service a mobility management entity can derive whether it hosts mobile terminals requiring the service. In case it no longer hosts any mobile terminals for a multicast service, the mobility management entity may deregister from the user plane entity to which it previously sent a registration in order to serve the multicast service.

Usually, when the mobility management entity receives an acknowledgement of it's deregistration from the user plane entity, it would send a user plane release message (or deregistration message) to all access nodes in its pool area which previously established a multicast user plane to the user plane entity. As explained above, these are the access nodes from which the mobility management entity received (or has be been informed by a user plane entity on the transmission of) an ACK message in response to a session start message.

According to an exemplary embodiment of the invention the user plane entity indicates in its response to a service deregistration from a mobility management entity whether there are other mobility management entities registered for the particular service. The user plane entity may for example derive this information from stored information about the registered mobility management entities as explained above.

The response may for example indicate whether there are further mobility management entities registered for the multicast service at the user plane entity. In case the user plane entity indicates that there are no other mobility management entities registered, the deregistering mobility management entity may send a user plane release message to all access nodes in its service area, as there are no more terminals to receive the service so that all user planes may be terminated and the access nodes may stop multicasting the service. Even in case the deregistering mobility management entity is located in a different pool area/tracking area than the user plane entity, no further registered mobility management entity at the user plane entity means that also all other mobility management entities in the pool area/tracking area of the deregistering mobility management entity have already deregistered from the user plane entity (if there were any registrations at all).

Otherwise, if there are further mobility management entities registered for the multicast service at the user plane entity, the user plane entity may additionally include information in the response message that indicate to the deregistering mobility management entity, whether there is one or more of the registered mobility management entities located in the same pool area as the deregistering mobility management entity or not.

If one or more of the registered mobility management entities is located in the same pool area as the deregistering mobility management entity this means that there are other terminals attached receiving the multicast service attached to at least one mobility management entity of the same pool area as the deregistering mobility management entity. This, the deregistering mobility management entity refrains from sending a user plane release notification to the access nodes in its pool area/tracking area.

If no further registered mobility management entity is located in the same pool area as the deregistering mobility management entity this means that no more terminals in the current pool area are receiving the multicast service, but there are potentially further mobile terminals attached to another pool area that are receiving the multicast service. Hence, the deregistering mobility management entity sends a user plane release notification to those access nodes within its pool are that are in the non-overlapping part of the pool area/tracking area, i.e. to those access nodes that are only assigned to the deregistering mobility management entity's pool area.

Thus, the multicast user plane to the user plane entity from an access node in an overlapping pool area is only terminated if no mobile terminal is attached to a mobility management entity in a pool area to which at least one access node of the user plane entity's pool area is simultaneously assigned and service continuity for the remaining mobile terminal(s) receiving the service from the access node but being attached to another pool area may be achieved.

Figure 8:
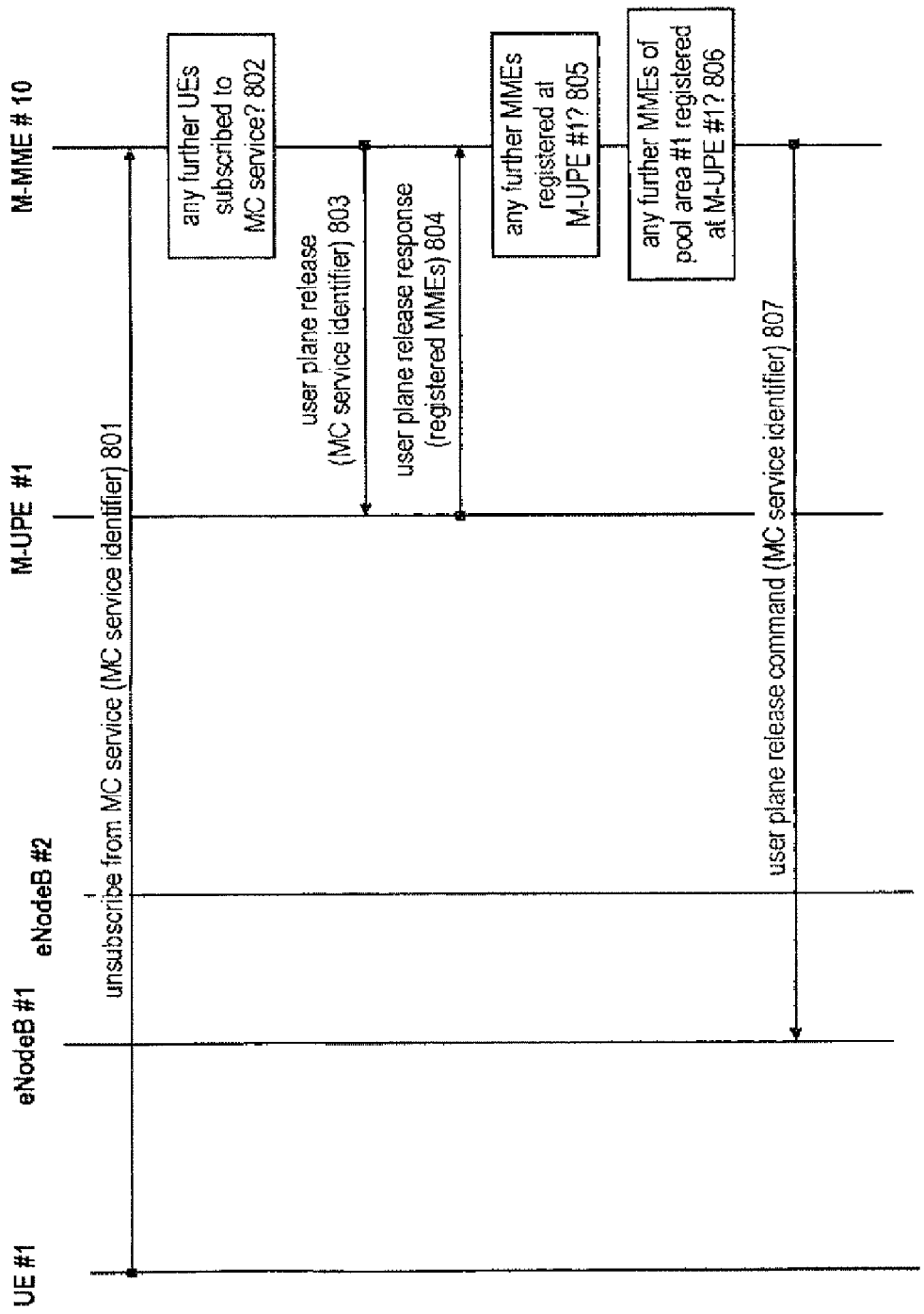
FIG. 8 shows an exemplary procedure in a 3GPP SAE/LTE system for handling multicast service deregistrations from a mobility management entity according to an exemplary embodiment of the invention, where the mobility management entity and the user plane entity to which the multicast user plane is established are located in the same pool area.

FIG. 8 exemplifies the described procedure taking into account two overlapping pool areas where a deregistering mobility management entity and the user plane entity to which the multicast user plane is established belong to the same pool area (or tracking area). For exemplary purposes it is assumed that a mobile terminal UE #1 attached to pool area #1 unsubscribes 801 from the multicast service at its mobility management entity M-MME #10.

The mobility management entity M-MME #10 determines in response to this unsubscription, whether any further mobile terminals have subscribed to the multicast service at the mobility management entity M-MME #10. This could be for example realized by checking context information of the different mobile terminals served by the mobility management entity M-MME #10 for subscriptions to the multicast service based on the multicast service identifier indicated by the mobile terminal UE #1. If there are no further mobile terminals subscribed to the service, the mobility management entity M-MME #10 sends 803 a deregistration message to the user plane entity M-UPE #1.

The user plane entity M-UPE #1 determines whether there are further mobility management entities registered for the multicast service based on stored information on the registrations. The user plane entity M-UPE #1 returns 804 a deregistration response (confirmation) indicating whether there are further mobility management entities registered to the service and if so, whether there is at least one mobility management entity of pool area #1 registered for the multicast service.

Based on the deregistration response (confirmation) from the user plane entity M-UPE #1, the mobility management entity M-MME #10 determines 805 next, whether there are further mobility management entities registered at the user plane entity M-UPE #1 for the service. If not the mobility management entity M-MME #10 may send a user plane release message to all access nodes of pool area #1.

If there are further mobility management entities registered at the user plane entity M-UPE #1 for the service the mobility management entity M-MME #10 may further determine 806 (based on the deregistration response) whether there is a mobility management entity of pool area #1 registered at the user plane entity M-UPE #1. If so, the mobility management entity M-MME #10 refrains from sending any user plane release notifications. Otherwise, if no more mobility management entities of pool area #1 are registered at the user plane entity M-UPE #1, the mobility management entity M-MME #10 sends 807 a user plane release command including an identification of the multicast service to all access nodes in pool area #1 exclusively assigned to pool area #1 (i.e. eNodeB #1) so that the user plane is only terminated at those access nodes.

Figure 13:
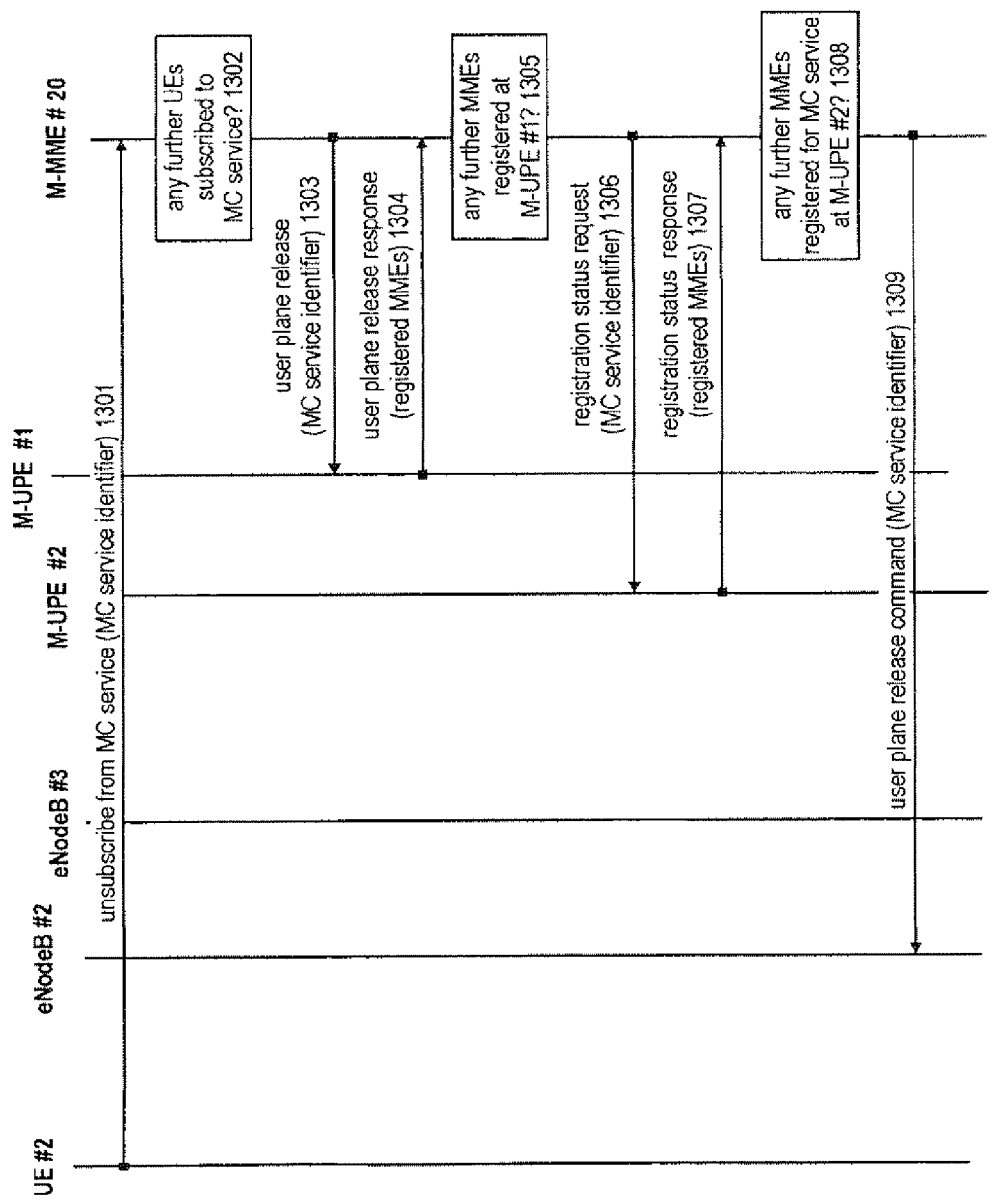
FIG. 13 shows an exemplary procedure in a 3GPP SAE/LTE system for handling multicast service deregistrations from a mobility management entity according to an exemplary embodiment of the invention, where the mobility management entity and the user plane entity to which the multicast user plane is established are located in different pool areas.
Figure 14:
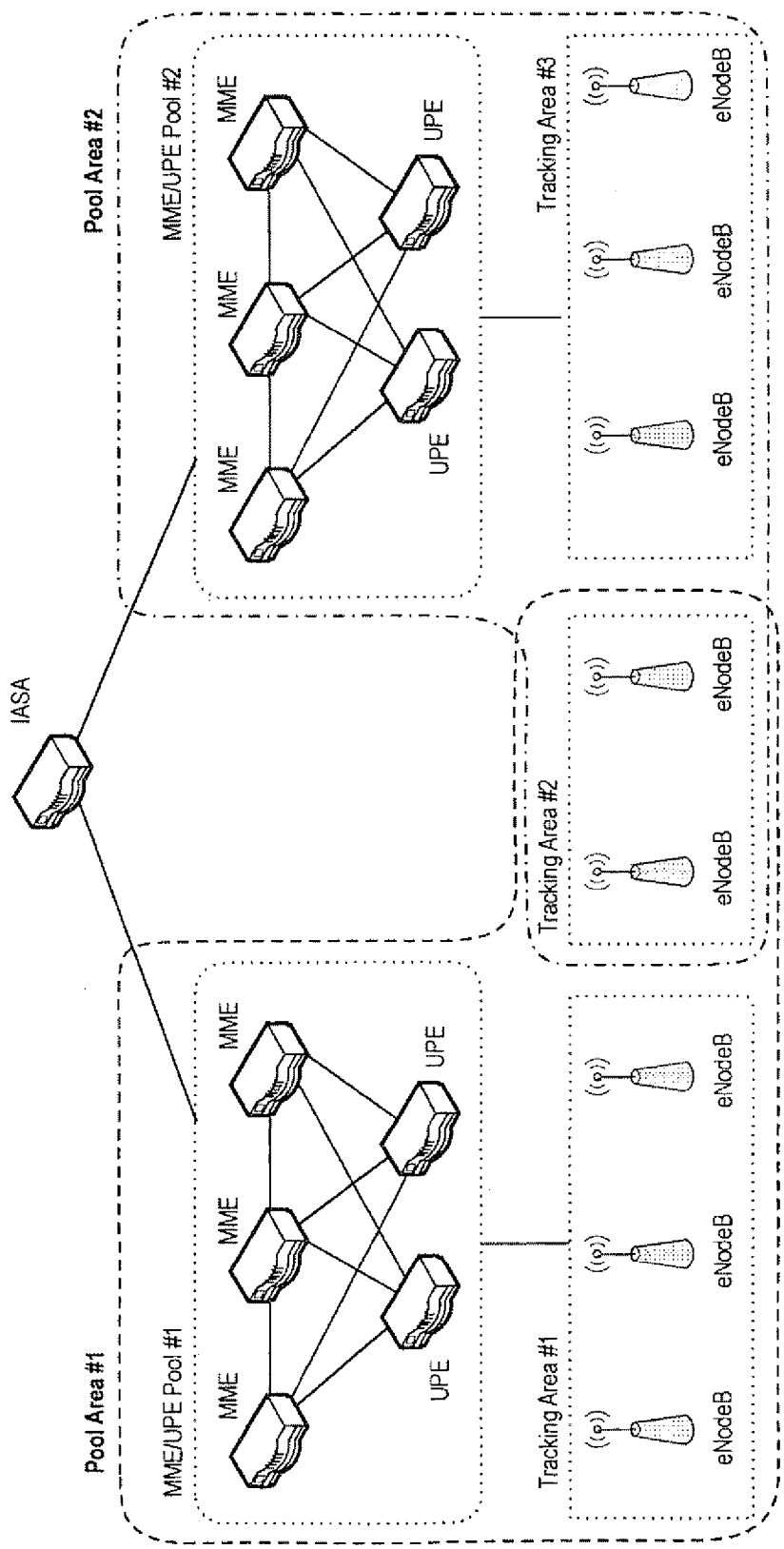
FIGS. 14 & 15 show the relation between mobility management entity/user plane entity pool areas and the different tracking area concepts.
Figure 15:
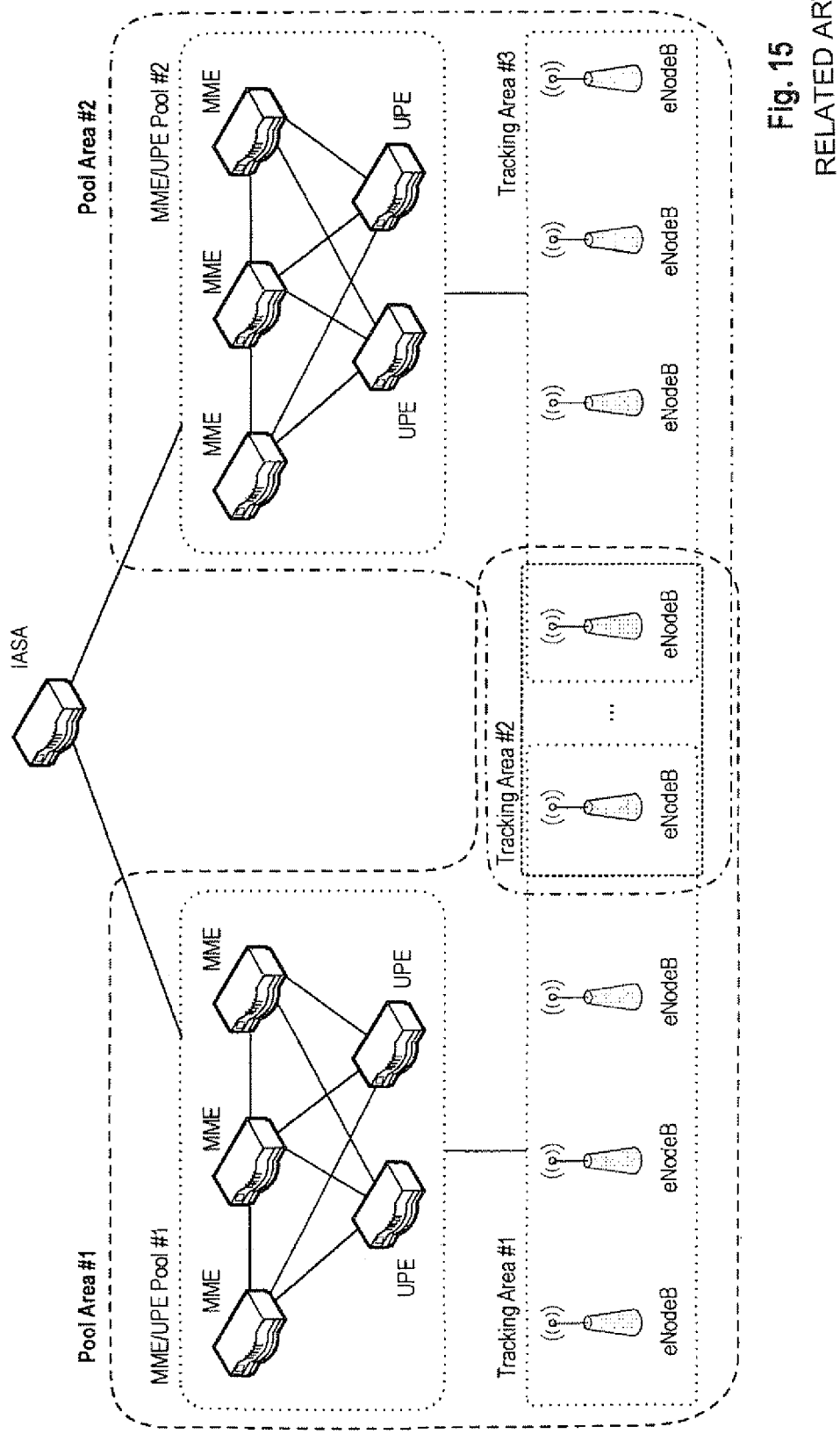

FIG. 13 exemplifies the described procedure taking into account two overlapping pool areas where a deregistering mobility management entity and the user plane entity to which the multicast user plane is established belong to different pool areas (or tracking areas). For exemplary purposes it is assumed that a mobile terminal UE #2 attached to pool area #2 unsubscribes 1301 from the multicast service at its mobility management entity M-MME #20. The mobility management entity M-MME #20 determines in response to this unsubscription, whether any further mobile terminals have subscribed to the multicast service at the mobility management entity M-MME #20. This could be for example realized by checking context information of the different mobile terminals served by the mobility management entity M-MME #20 for subscriptions to the multicast service based on the multicast service identifier indicated by the mobile terminal UE #2. If there are no further mobile terminals subscribed to the service, the mobility management entity M-MME #20 sends 1303 a deregistration message to the user plane entity M-UPE #1.

The user plane entity M-UPE #1 determines whether there are further mobility management entities registered for the multicast service based on stored information on the registrations. The user plane entity M-UPE #1 returns 1304 a deregistration response (confirmation) indicating whether there are further mobility management entities registered to the service and if so, whether there is at least one mobility management entity of pool area #1 registered for the multicast service.

Based on the deregistration response (confirmation) from the user plane entity M-UPE #1, the mobility management entity M-MME #20 determines 1305 next, whether there are further mobility management entities registered at the user plane entity M-UPE #1 for the multicast service.

If not, the mobility management entity M-MME #20 may send 1306 a deregistration message (registration status request) for the multicast service to the user plane entity M-UPE #2. On the one hand the message may deregister the mobility management entity M-MME #20 from the multicast service at the user plane entity M-UPE #2. Further, the deregistration message (registration status request) may simultaneously request the user plane entity M-UPE #2 to indicate to the mobility management entity M-MME #20 whether there are further mobility management entities registered for the service at user plane entity M-UPE #2.

The user plane entity M-UPE #2 determines whether there are further mobility management entities registered for the multicast service—e.g. based on stored information on the registrations. The user plane entity M-UPE #2 returns 1307 a deregistration response (registration status response) indicating whether there are further mobility management entities registered to the multicast service indicated in the deregistration message (registration status request).

Based on the deregistration response (registration status response) from the user plane entity M-UPE #2, the mobility management entity M-MME #20 determines 1308 next, whether there are further mobility management entities registered at the user plane entity M-UPE #2 for the service.

If so, the mobility management entity M-MME #20 may send a user plane release message to all access nodes assigned to pool area #1 and pool area #2 simultaneously, but not those exclusively assigned to pool area #2. If not, the mobility management entity M-MME #20 may send a user plane release message to all access nodes of pool area #2 also including those simultaneously assigned to pool area #1 and pool area #2. The access nodes receiving the user plane release message may then terminate the user plane for the multicast service.

Another embodiment pertains to a situation where all mobility management entities in a pool area of the user plane entity to which the multicast user plane has been established have deregistered from the user plane entity. In this embodiment, it may be assumed that a service deregistration for the multicast service is received at a user plane entity from a mobility management entity located in the same pool area/tracking area. As before the user plane entity may indicate in the response whether there are further mobility management entities registered for the multicast service and whether at least one of the remaining registered mobility management entities is located in the same pool area/tracking area as the deregistering mobility management entity.

If there is no further mobility management entity in the pool area of the user plane entity registered for the multicast service, it may be advantageous to decide to relocate the multicast user plane to a pool area/tracking area of which a mobility management entity is still registered for the service. Accordingly, the deregistering mobility management entity may send a user plane release notification to the access nodes being assigned to several pool areas/tracking areas to indicate to the access nodes that the user plane to the current serving user plane entity should be terminated upon having established a new user plane to another mobility management entity of another pool area/tracking area. Further, the deregistration response may also indicate the pool area/tracking area (or even an identifier of a mobility management entity or identifiers of mobility management entities therein) of which mobility management entities are still registered to the multicast service at the user plane entity.

The deregistering mobility management entity may determine an identifier of one of a mobility management entity located in one of the indicated pool area(s)/tracking area(s), and may request this mobility management entity to trigger the establishment of a respective user plane between each access node in an overlapping part of the pool area/tracking area (i.e. assigned the pool area/tracking area of the deregistering mobility management entity and the pool area/tracking area of the requested mobility management entity) and a user plane entity of the pool area/tracking area of the mobility management entity receiving the request.

In the following further embodiments of the invention, it may be assumed for exemplary purposes that a multi-tracking area registration is used so that each access node is always assigned to a single tracking area, i.e. broadcasts only a single tracking area identifier (e.g. TA-ID) in its radio cell(s). Further, in the scenarios shown in FIGS. 16 through 21, it may be assumed that the access node(s) in the overlapping region of the pool areas (here: eNodeB #2) form one or more separate tracking areas (from the access nodes in the non-overlapping region) so that the upon attachment to an access node in the overlapping region of the pool areas #1 and #2, a mobile terminal will perform a routing area update procedure, e.g. in response to detecting a new tracking area identifier being broadcast by the access node to which the mobile terminal attaches to in the overlapping region of the pool areas #1 and #2.

In a variation of the embodiments shown in FIGS. 16 through 21, the mobile terminal UE #2 may be assumed to be in idle mode so that idle mode mobility procedures, such as a cell reselection and a tracking area update procedure, are used for mobility support. In case the mobile terminal needs to perform a mobility procedure the mobile terminal may for example temporarily switch from idle mode to active mode for the mobility procedure, and may return to idle mode again, once having finished the mobility procedure. When switching to active mode, this may result in the establishment of context information in the access node(s) to which the mobile terminal is attached, which may inter alia include information on the services the mobile terminal has subscribed. As will be outlined in more detail below, this mobile terminal related context information together with multicast service related context information in the access node may be used by the access node to determine whether the mobility management entity serving the mobile terminal may need to be informed on the establishment of a user plane for a multicast service in the respective tracking area to a user plane entity in another pool area than that of the mobility management entity or not.

Figure 16:
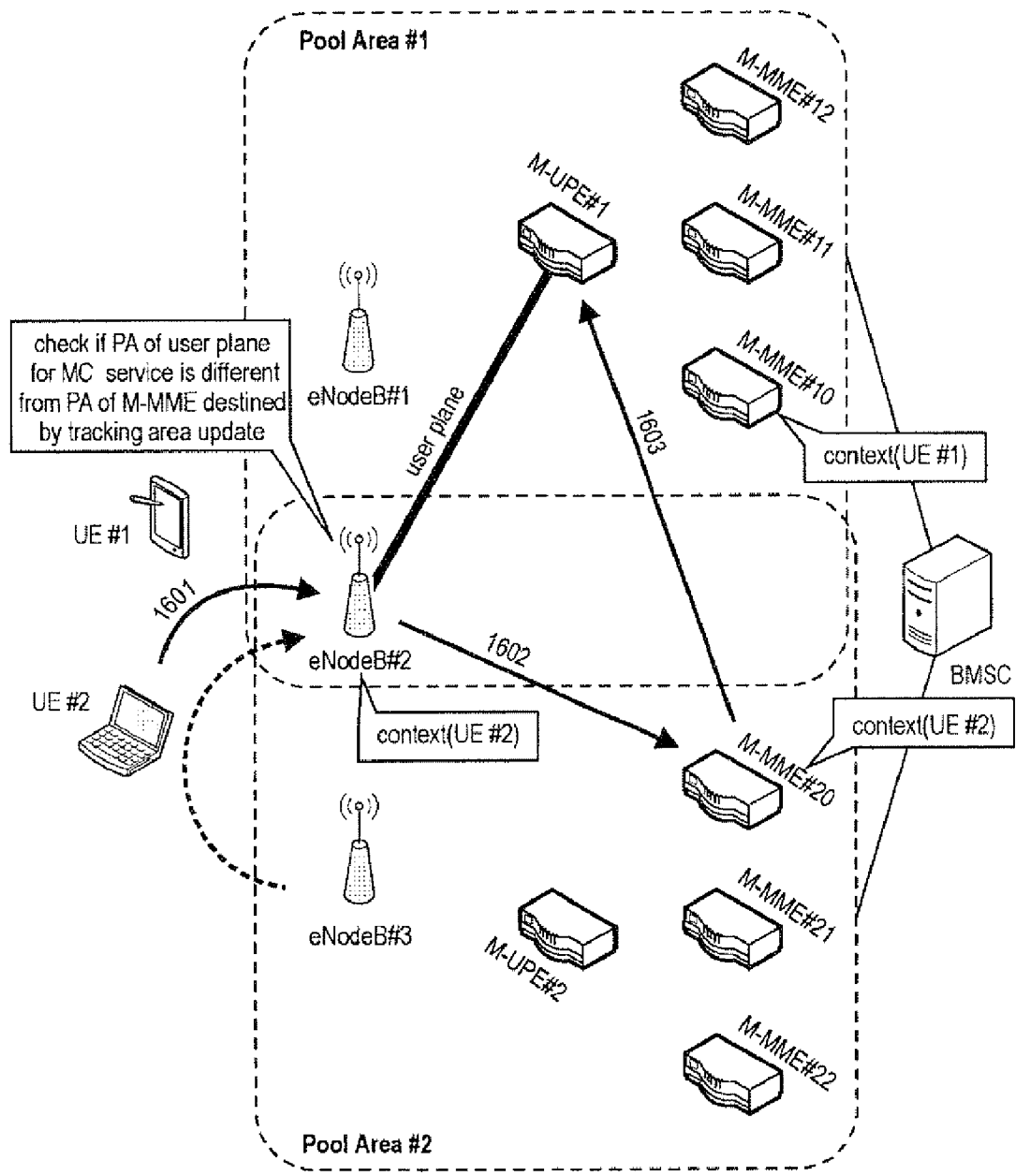
FIG. 16 exemplary views a proactive procedure in a 3GPP SAE/LTE system according to an exemplary embodiment of the invention which may be used for triggering a registration of a mobility management entity at a user plane entity to which the multicast user plane is established in response to a tracking area update.
Figure 17:
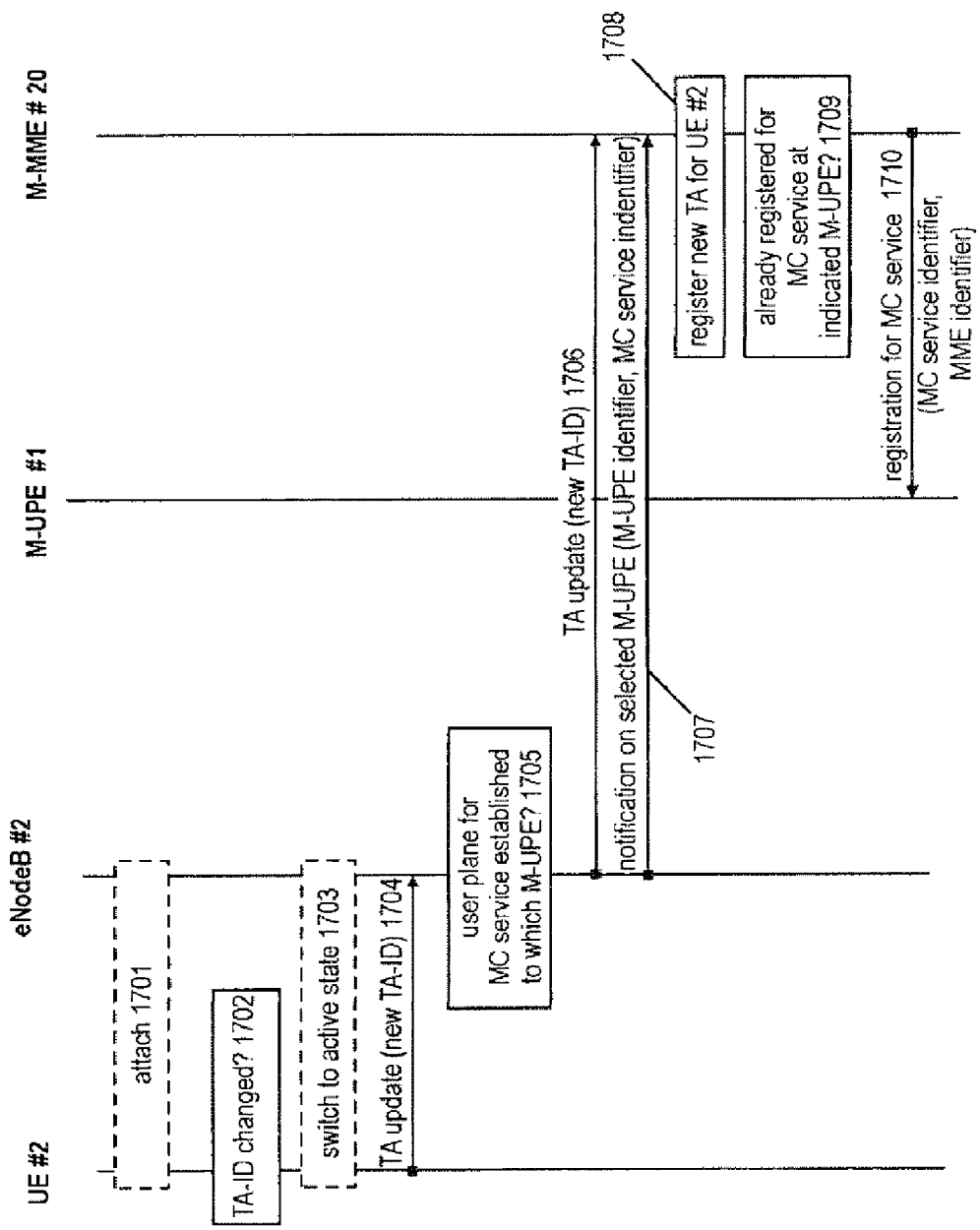
FIG. 17 shows an exemplary flow chart of a proactive procedure in a 3GPP SAE/LTE system for triggering a registration of a mobility management entity in response to a tracking area update according to an exemplary embodiment of the invention, where the mobility management entity and the user plane entity to which the multicast user plane is established are located in different pool areas.
Figure 18:
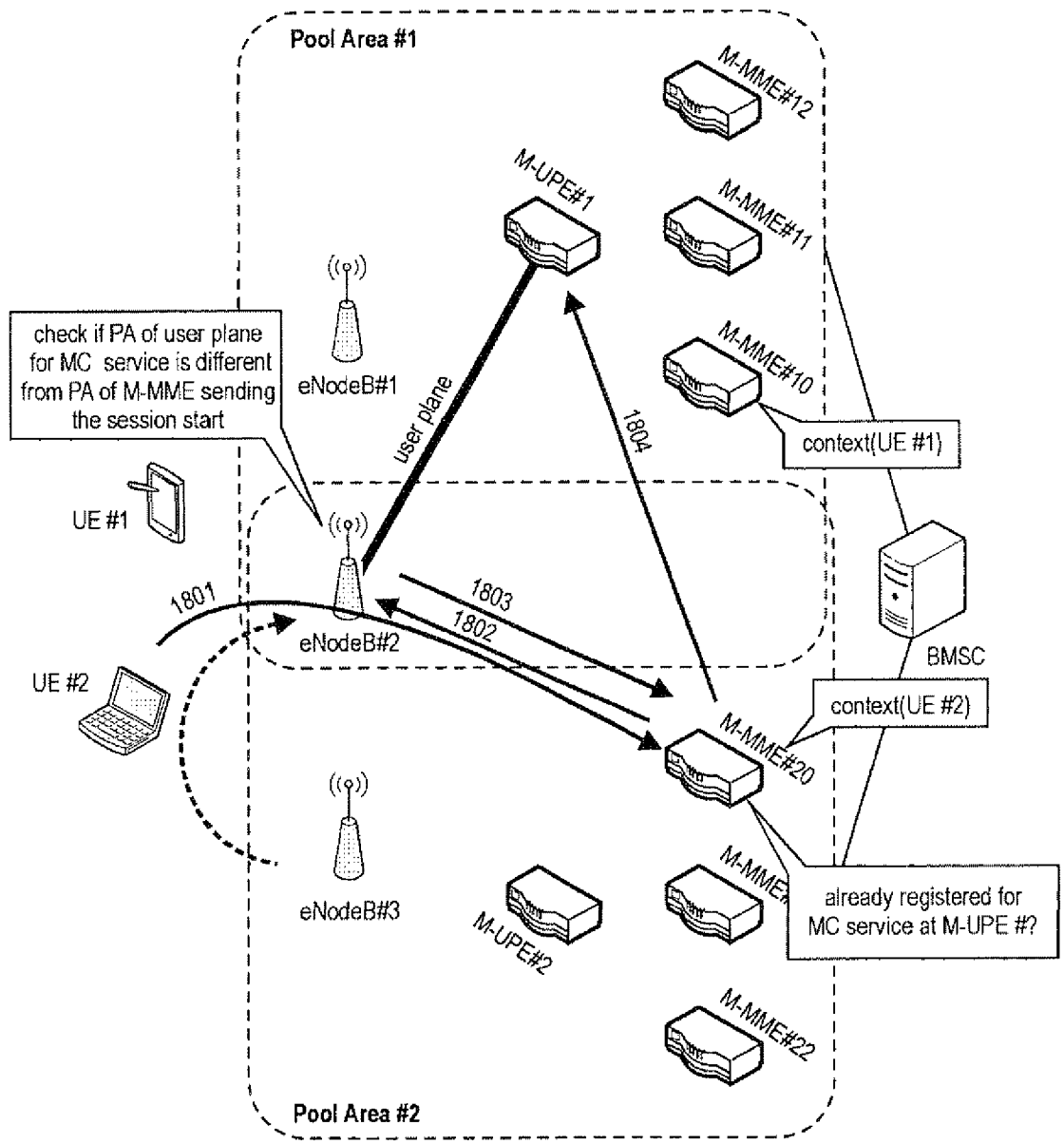
FIG. 18 exemplary views a reactive procedure in a 3GPP SAE/LTE system according to an exemplary embodiment of the invention which may be used for triggering a registration of a mobility management entity at a user plane entity to which the multicast user plane is established in response to a tracking area update.
Figure 19:
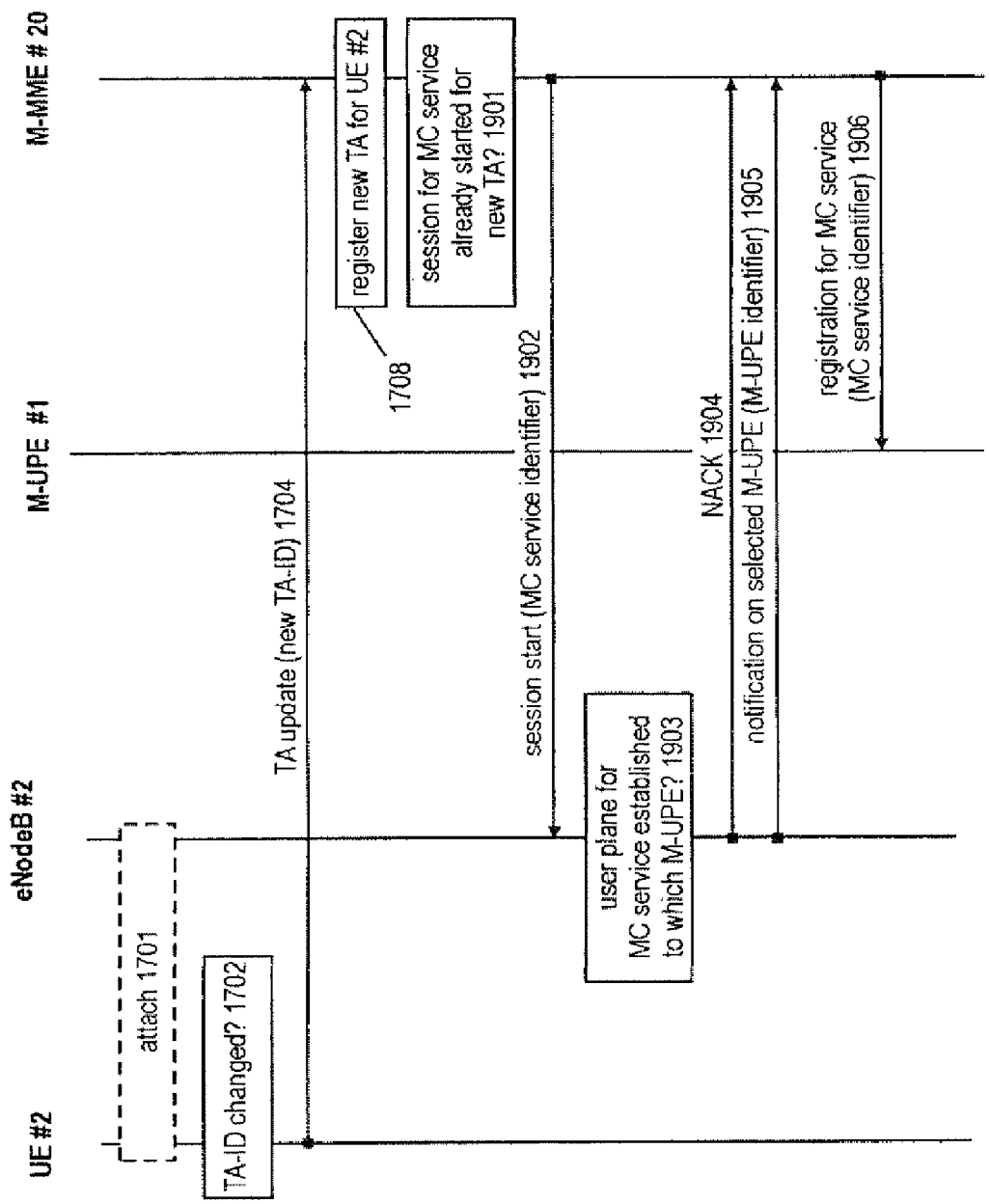
FIG. 19 shows an exemplary flow chart of a reactive procedure in a 3GPP SAE/LTE system for triggering a registration of a mobility management entity in response to a tracking area update according to an exemplary embodiment of the invention, where the mobility management entity and the user plane entity to which the multicast user plane is established are located in different pool areas.

In the following one embodiment of the invention will be discussed with respect to FIG. 16 and FIG. 17. When a mobile terminal UE#2 is moving in idle state (or is in idle mode), at least in 3GPP-based systems, the mobile terminal is only known to its currently attached mobility management entity on a tracking area level, as previously mentioned herein. In this state the selected access node eNodeB #2 does typically not possess any context information of the mobile terminal UE #2.

However, if the mobile terminal UE #2 selected and attached 1701 to an access node eNodeB #2 that is not part of its currently registered tracking area, it will recognize 1702 that the tracking area identifier provided by the new access node eNodeB #2 yields a different tracking area than its previously registered tracking area(s) and performs a tracking area procedure 1601. The mobile terminal UE #2 may send 1704 a tracking area update message (also referred to as a location area update) via its selected access node eNodeB #2 to its mobility management entity M-MME #20 in the core network. This message may comprise the tracking area of the currently selected access node eNodeB#2.

In order to send this message (which may be for example a non-access stratum message), the mobile terminal UE #2 may establish a RRC connection to the selected access node, i.e. will switch 1703 to active mode. During this RRC connection establishment the access node eNodeB #2 will receive the mobile terminal's context information that inter alia comprises information on the multicast service (e.g. a multicast service identifier).

In case the access node is providing a bearer service for the user plane of the multicast service (e.g. an MBMS bearer) it will also maintain a corresponding multicast service context (e.g. MBMS service context) comprising a service identifier and at least an identifier of the network element (user plane entity) providing the multicast user plane for this service. Utilizing the stored context information, the access node eNodeB #2 may find out 1705 whether it is providing a bearer service for the multicast service that is also required by the mobile terminal UE #2 sending the tracking area update. The access node eNodeB #2 may for example compare the multicast service identifier contained in the mobile terminal related context with the one in the multicast service context so as to find out 1705, whether a bearer service on the user plane is already provided for the multicast service.

Further, by utilizing information on the configuration of the network, the access node eNodeB #2 may also derive whether the user plane entity providing the multicast service (i.e. the user plane entity to which the user plane for the multicast service is established) and the mobility management entity that is the destination of the tracking area update message are assigned to different pool areas. If this should be the case, the access node knows that it potentially has to trigger 1602 the mobility management entity M-MME #20 to register at the user plane entity of a different pool area in order to assure the multicast service continuity for the mobile terminal as explained previously.

Optionally the access node eNodeB #2 may further take into account whether it is located in an overlapping pool area, i.e. is connected to different pools of core network entities, which may be also known to the access node eNodeB #2 from network configuration information. In case both conditions match, i.e. the access node eNodeB #2 is located in an overlapping pool area region and the mobility management entity M-MME #20 serving the mobile terminal UE #2 and the user plane entity M-UPE #1 to which the user plane of the multicast service is established are assigned to different pool areas, the access node eNodeB #2 may trigger 1602 an update of service registration by the mobility management entity M-MME #20.

When the access node decides to trigger 1602 the mobility management entity, there are several options how to provide the required information to the mobility management entity M-MME #20. On the one hand, the notification comprising information on the user plane entity M-UPE #1 to which the user plane for the service is established could be sent 1707 piggyback with the tracking area update message the access node eNodeB #2 forwards 1706 to the mobility management entity M-MME #20. For example in an 3GPP-based UTRAN a DIRECT INFORMATION TRANSFER message of the RANAP protocol may be used to exchange non-access stratum signaling such as a tracking area update from the mobile terminal between the access node and the core network. Here the user plane entity information could be added as new information element (1E) to the message.

Another option to inform the mobility management entity M-MME #20 serving the mobile terminal UE #2 on the user plane entity M-UPE #1 to which the user plane is established for the multicast service, the access node eNodeB #2 may use a dedicated signaling message (e.g. RANAP message).

The reception of the information about the user plane entity to which the user plane is established for the multicast service (also referred to as user plane entity information) at the mobility management entity might be used as a trigger to register 1603 itself at the indicated user plane entity, if the user plane entity is located in another pool area than the mobility management entity. A registration of the mobility management entity of first pool area at the user plane entity of a second pool area may only be performed once per tracking area. Therefore, prior to sending 1710 a registration for the multicast service to the user plane entity indicated in the notification from the access node eNodeB #2, the mobility management entity M-MME #20 may check 1709, whether it has already registered at the indicated user plane entity M-UPE #1. Hence, if the mobility management entity M-MME #20 has previously registered at the user plane entity in the other pool area, it may ignore further triggers for the registration. Obviously, upon reception of the tracking area update message, the mobility management entity M-MME #20 will also register 1708 the new tracking area for the mobile terminal UE #2.

In case the user plane entity information is piggybacked on the tracking area update message, the mobility management entity M-MME #20 may derive the respective tracking area from this information. In case the access node eNodeB #2 used a dedicated message to inform the mobility management entity M-MME #20 on the user plane entity M-UPE #1 to register at, the access node eNodeB #2 may either include a tracking area identifier or a mobile terminal identifier to the dedicated signaling message. Either one of these identifiers may be used at the mobility management entity to derive the applicable tracking area.

The registration message sent 1710 by the mobility management entity M-MME #20 should include an identifier of the multicast service for which the management entity M-MME #20 registers at the user plane entity M-UPE #1. Further, the registration message may optionally comprise an identifier (MME identifier) of the registering mobility management entity M-MME #20 (if the identifier may not be implicitly derived from the registration message itself). The user plane entity M-UPE #1 may maintain a list of MME identifiers may for mobility management entities that have registered for a service which may allow the user plane entity to determine whether (upon deregistration) other mobility management entities are still registered for the service.

This procedure described above may be performed for each tracking area update message sent the mobile terminals.

Considering a large number of users this might lead to considerable load at the access node and increased resource consumption for signaling (for example due to required processing at the access node and the additional information sent over the interface between the access node and the mobility management entity). As discussed before, a registration of a mobility management entity at an user plane entity of another pool area may be performed once for a respective tracking area. Therefore, in a further variation, an access node might keep track to which mobility management entity and for which tracking area it already provided the required information, so that it may notify the user plane entity information only once per mobility management entity and tracking area (and service).

As the mobility management entity is informed by the access node on a potential need for a registration at a user plane entity of another pool area, the procedure described above may be referred to as being proactive.

The access node triggering a mobility management entity registration may require some additional information and functionality to be available at an access node in comparison to conventional system, such as context information and knowledge of the network topology. The access node needs to detect whether to provide the information about the user plane entity to which the user plane for a multicast service is to be established to the mobility management entity (being the destination of a tracking area update by a mobile terminal), e.g. by comparing service identifiers contained in mobile terminal context and multicast service information (e.g. MBMS context information). Further, the access node might need to piggyback the user plane entity information on a non-access stratum message not directly related to the multicast service or use a dedicated message. Also some functionality at the mobility management entity may be required to detect the trigger (user plane entity information) send by the access node.

Another embodiment of the invention provides a reactive trigger of mobility management entity registration, which may reduce the load of the access node with respect to triggering mobility management entity registrations significantly. This embodiment will be described with respect to FIGS. 18 and 19 in more detail.

In this alternative solution, the information about the user plane entity located in the different pool area may be provided to the mobility management entity M-MME #20 during a session start request/response exchange 1802, 1803 between mobility management entity M-MME #20 and access node eNodeB #2. This procedure may be triggered by the tracking area update message sent 1801 by mobile terminal UE #2. Unlike in the exemplary embodiment shown in FIG. 16 and FIG. 17, the access node eNodeB #2 to which the mobile terminal UE #2 attaches does not need to analyze the content of the tracking area update but may simply forward the tracking area update to the destined mobility management entity M-MME #20 serving the mobile terminal UE #2.

The mobility management entity M-MME #20 may for example store information to which user plane entities it is currently registered. This information may be maintained per multicast service and/or per tracking area. Upon having attached 1701 to the new access node eNodeB#2 and having detected 1702 a change in the tracking area identifier, the mobile terminal UE#2 may send 1801, 1704 a tracking area update message to its serving mobility management entity M-MME #20. This message may comprise the tracking area of the currently selected access node eNodeB#2. The mobility management entity M-MME #20 will register 1708 the new tracking area of the mobile terminal UE #2. Utilizing the stored context information (e.g. multicast service related context information), the mobility management entity M-MME #20 may further find out 1901, which multicast service(s) the mobile terminal UE #2 sending the tracking area update has subscribed to and whether it already has registered itself at some user plane entity for the indicated tracking area for a respective multicast service.

If this is the case, no further steps except for registering the new tracking area identifier for the mobile terminal UE #2 need to be performed by the mobility management entity M-MME #20, as the user plane for the multicast service has been already established.

If this is not the case, the mobility management entity M-MME #20 may for example select an user plane entity of its own pool area (such as M-UPE #20) and sends 1902 session start message including the user plane entity identifier of the user plane entity in its tracking area to at least the access node eNodeB #2 that was selected by the mobile terminal UE #2.

In case the access node eNodeB #2 is already providing a user plane (e.g. multicast service bearer) for the service, the access node eNodeB #2 may also maintain a corresponding multicast service context comprising a service identifier and at least an identifier of the node providing the multicast user plane (here M-UPE #1). Also the session start message sent by the mobility management entity may comprise a service identifier (e.g. TMGI).

Utilizing stored multicast service context information the access node eNodeB #2 receiving the session start message may determine 1903 whether it already established a user plane for the service to another user plane entity. If this is the case, the access node eNodeB #2 replies 1904 to the session start with a NACK message and may further notify 1905 the mobility management entity M-MME #20 on the user plane entity M-UPE #1 to which the user plane for the multicast service has been established for the tracking area. This information of the notification may be sent as part of the NACK or in a dedicated signaling message (as outlined above). If sent with the NACK no additional identification of the multicast service needs to be included. If a dedicated signaling message is used and no implicit identification of the multicast service and tracking area for which the notification is sent is possible, the notification may include a tracking area identifier and a multicast service identifier in addition to the identification of the user plane entity M-UPE #1 to which the user plane is established.

Utilizing the notification on the selected user plane entity M-UPE #1 providing the user plane may trigger the mobility management entity M-MME #20 to register 1906 at the indicated user plane entity M-UPE #1 for the multicast service. In case the mobility management entity already registered itself to the previously selected user plane entity that it used 1902 in the session start message sent to the access node it will also de-register from it.

Considering realistic scenarios with a large number of users, possibly many mobility management entities might be involved. For example in the worst case, each mobility management entity in the mobility management entity pool would receive tracking area update messages from some mobile terminals. However, session start and respective NACK messages might be triggered only once per mobility management entity and tracking area and only if the mobility management entity is not already registered at some user plane entity (M-UPE) to which the user plane is established for the indicated tracking area. Further, only to the access node from which it received the tracking area update message it may be required to the send the session start message (i.e. not to all access nodes in the tracking area). However, considering that the mobile terminal may move to a different access node in the respective tracking area without any signaling because it might transit to idle state immediately after sending the tracking area update message, it might be beneficial if the mobility management entity sends the session start message to all the access nodes in the new tracking area indicated by the mobile terminal during the tracking area update procedure. Taking all this into account the created load should be limited even when considering realistic scenarios.

In the previous exemplary embodiment described with respect to FIGS. 16 through 19, the access node eNodeB #2 selected by the mobile terminal UE #2 decides whether a mobility management entity M-MME #20 serving the mobile terminal needs to be informed on the establishment of a user plane connection to a user plane entity M-UPE #1 of another pool area. The access node thereby either proactively or reactively triggered the mobility management entity to update it service registration by notifying information about the user plane entity providing the multicast user plane for a given service (and tracking area). In an alternative embodiment, it may be foreseen to use a "centralized" approach, where a network entity in the core network keeps track of user plane entities having established a user plane for multicast or broadcast services to the access nodes in the access network. Thereby, the user plane entities may for example register themselves for a given service and tracking area at the central core network entity. As one option, the BM-SC, along with its other multicast service functionalities, could also provide this registration functionality.

For example in an MBMS service, when the provision of an MBMS bearer is requested for providing a user plane connection, e.g. at service activation sent by a mobile terminal, the requesting entities (mobility management entity or user plane entity) may register user plane entity to which the user plane connection is established for the service at the BM-SC. This registration may be for example performed using dedicated signaling procedures or in a combined procedure used for authorization of service provisioning for a mobile terminal. The BM-SC may maintain a list of entity identifiers providing a multicast service. Hence, the BM-SC may maintain information per multicast service indicating which entity in the core network provides a multicast user plane for which tracking area. The information about the tracking area may either comprised in the entity identifier itself (i.e. the entity's identifier may implicitly identify the tracking area) or it could be stored as an additional parameter.

Figure 20:
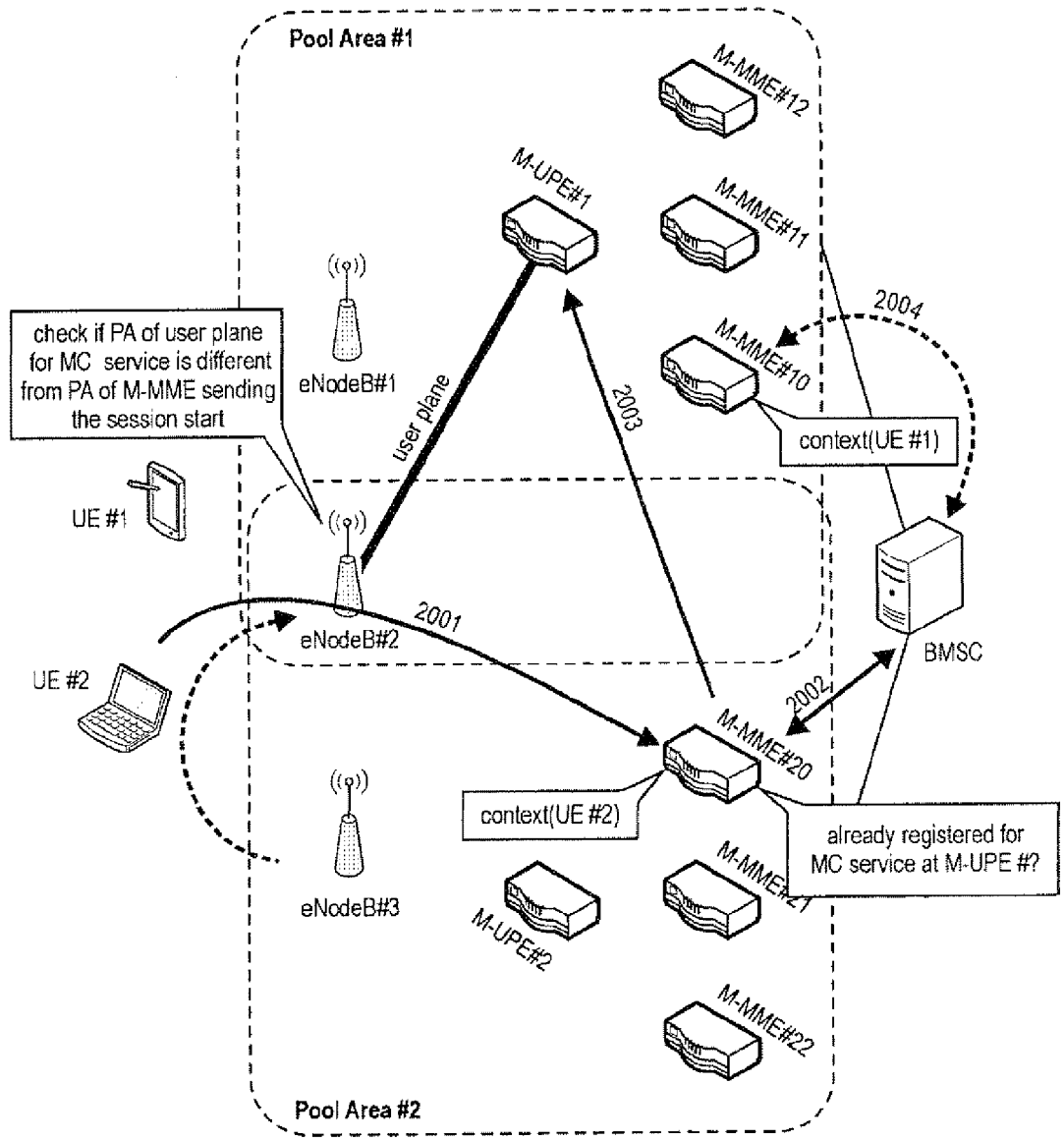
FIG. 20 exemplary views a procedure in a 3GPP SAE/LTE system according to an exemplary embodiment of the invention using a centralized registration of user plane entities so as to facilitate triggering a registration of a mobility management entity at a user plane entity to which the multicast user plane is established in response to a tracking area update.
Figure 21:
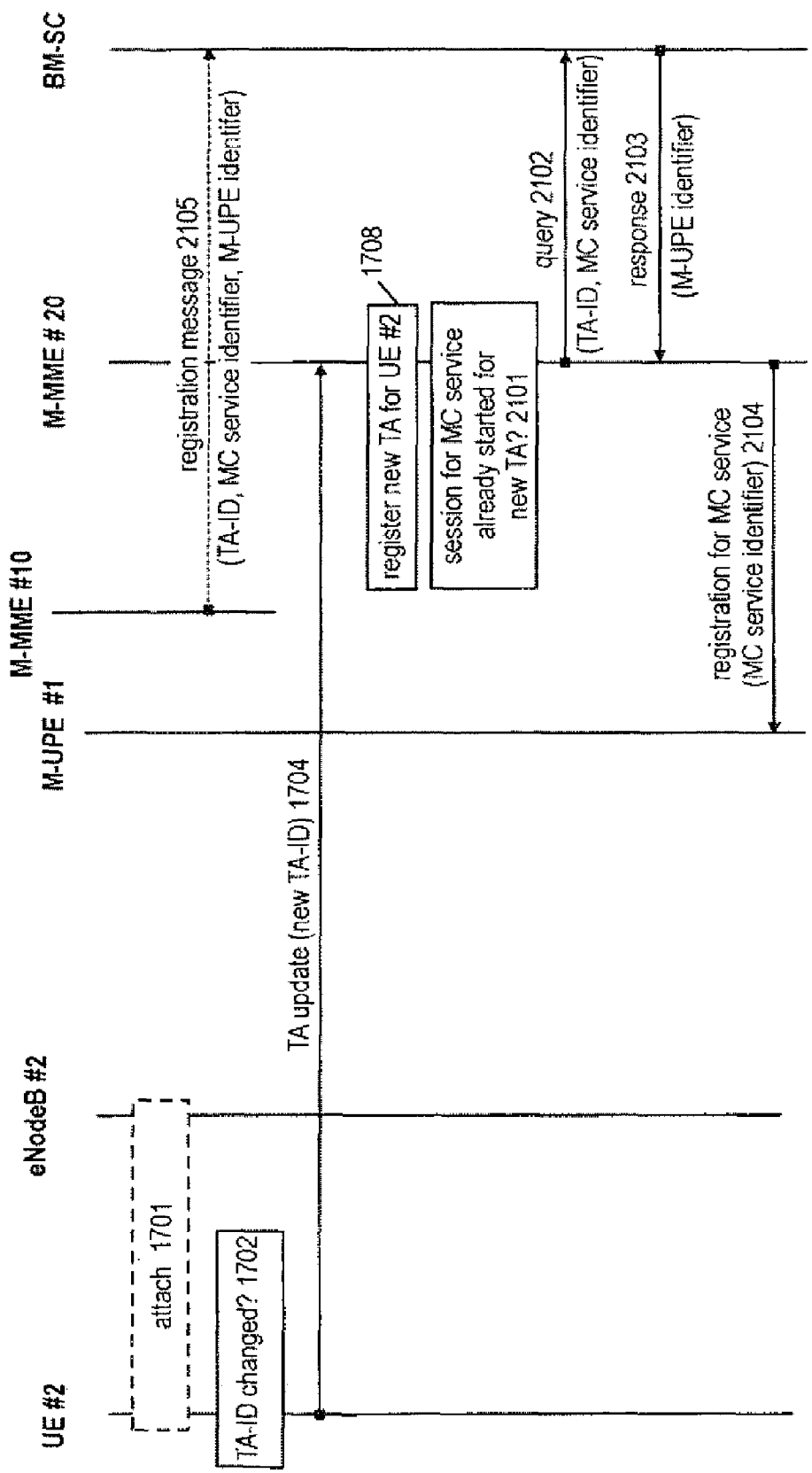
FIG. 21 shows an exemplary flow chart of a reactive procedure in a 3GPP SAE/LTE system using a centralized registration of user plane entities so as to facilitate triggering a registration of a mobility management entity in response to a tracking area update according to an exemplary embodiment of the invention, where the mobility management entity and the user plane entity to which the multicast user plane is established are located in different pool areas.

The use of this central registration of core network entities terminating the user plane for the multicast services will be exemplarily outlined in more detail with respect to FIG. 20 and FIG. 21. The mobility management entity M-MME #20 receiving 2001, 1704 a tracking area update message from a mobile terminal UE #2 maintains a mobile terminal related context information, which may inter alia include the services of the mobile terminal UE #2. The tracking area update message sent 2001, 1704 by the mobile terminal UE #2 to the mobility management entity M-MME #20 may also comprise the tracking area of the currently selected access node eNodeB #2. Further, the mobility management entity M-MME #20 stores registration information per multicast service and per tracking area, e.g. by maintaining a list indicating for which service the mobility management entity has registered at which user plane entity (for respective tracking areas). Based on the registration information, the mobility management entity M-MME #20 can find out 2101 whether it already has registered itself at some user plane entity for the service for the tracking area indicated in the tracking area update message. If this is not the case, the mobility management entity M-MME #20 may query 2002, 2102 a central core network entity such as the BM-SC so as to request information which user plane entity (if any) maintains a user plane connection for a particular service for the respective tracking area. This query may thereby include the tracking area identifier of the tracking area indicated in the tracking area update message from the mobile terminal and a multicast service identifier.

The core network entity receiving the query may check its list of registered entities and might respond 2103 with information on a user plane entity that is registered for the indicated tracking area and service. This information may for example be an identifier of the respective user plane entity. The mobility management entity M-MME #20 may use this response to update its service registration. In case the core network entity BM-SC indicates no user plane entity, i.e. that no user plane has been yet established for the tracking area, the mobility management entity M-MME #20 might select a user plane entity to which the user plane for the service and tracking area should be established and triggers the establishment of the user plane, for example by sending a session start message including an identification of the selected user plane entity to at least the access node eNodeB #2 to which the mobile terminal has attached or to all access nodes in the tracking area. Advantageously, the selected user plane entity is located in the same pool are as the mobility management entity.

Further, the mobility management entity M-MME #20 may subsequently register the selected user plane entity at the core network entity for the multicast service and tracking area, or alternatively, a selected user plane entity registers itself at the central network entity BM-SC. In the example shown in FIG. 20 and FIG. 21 it has been assumed that the user plane has already been established to user plane entity M-UPE #1 by another mobility management entity in pool area #1 (e.g. mobility management entity M-MME #10) so that this mobility management entity has already registered 2004, 2105 the user plane entity M-UPE #1 at the central network node (e.g. BM-SC). A registration message for registering a user plane entity for a particular tracking area and service may for example include an identifier of the multicast service, an identifier of the tracking area and an identifier of the user plane entity to which the user plane is established. If a user plane to a particular tracking area is terminated the mobility management entity initiating the termination of the user plane may also deregister the user plane entity to which the user plane has been established for the tracking area at the core network entity.

In case the response to the query indicates that a user plane for the tracking area and the service exists, i.e. the response identifies a respective entity, the mobility management entity M-MME #20 registers 2003, 2104 at the respective user plane entity M-UPE #1.

As already mentioned above a tracking area is used to limit required signaling and stored context information for mobile terminals moving in an idle state. A tracking area may be considered an administrative mobility area within which a mobile terminal may move without the need for any signaling exchange with the network. Typically a tracking area comprises an area served by multiple access nodes, hence comprising several cells. A tracking area might be identified by a specific identifier (TA-ID). Alternatively, a tracking area may also be referred to as a location area (LA) or routing area (RA). Similarly, the procedures described with respect to the update of a tracking area may also be referred to as tracking area update procedure or routing area update procedure.

The different embodiments described above are especially suitable for network architectures implementing a clear separation of control and user plane functionalities that is reflected by the different network entities being responsible for either control or user plane. For example, it has been assumed for exemplary purposes that the mobility management and session management are functions implemented at the mobility management entity. However, another architectural option might be to locate the session management functionality in user plane entities, i.e. for example in the user plane entities, resulting in a separation of mobility management functionality (located in mobility management entities) and session management functionality (located in user plane entities). Naturally this kind of separation of mobility management and session management may require exchange of signaling messages between the different entities implementing the respective functionality in case mobility procedures, for example a tracking area update, might influence session management (and vice versa).

Regarding multicast services this implies that all session-based control procedures, like session start, would be handled by the user plane entity. In this scenario the different embodiments described above may be modified so as to address this functional split of session management and mobility management to different core network entities. For example, when needing to perform a session management procedure in response to a mobility management procedure (like handover procedures or tracking area update procedures) the mobility management entity may trigger a respective user plane entity in its pool area to perform a required session management procedure.

For example, if the mobility management entity should decide that a session start procedure for a multicast service is required for a tracking area for which the mobility management entity has received a tracking area update of a mobile terminal requesting the multicast service, the mobility management entity may use a request/response scheme to trigger the user plane entity to perform the session start procedure with the respective access node(s) in the tracking area. Similarly, the requested user plane entity may report, whether the session start procedure has been successful or whether a NACK message and notification has been received identifying another user plane entity in another pool area to which the user plane for the service has been established. The user plane entity forwards such notification to the mobility management entity so that same may register at the indicated user plane entity of the other pool area as described above.

Similar to the procedure discussed above, in case the user plane entity contains the session management functionality, it will also maintain a multicast service context. Utilizing this stored service context, the selected user plane entity can find out whether it already provides the multicast service to this tracking area for which a session start procedure should be performed. If this is not the case, it sends session start message to the access nodes located in the tracking area. The user plane entity sends a session start message in the tracking area only once for all mobility management entities which have not previously registered for the service and tracking area Utilizing stored service context information an access nodes receiving the session start message can find out whether it already established a multicast user plane for the service to another user plane entity, similar as described above. If this is the case, the access node replies to the session start with a NACK message including information on the selected user plane entity (which may be within the same or another pool area as the mobility management entity triggering the session start procedure and triggered user plane entity sending the session start message). The user plane entity receiving the NACK message forwards this information to the registering mobility management entity, which triggers the mobility management entity to register at the indicated user plane entity.

Obviously the potential problem of service interruption does not exist for non-overlapping pool areas or access nodes in parts of a pool area not overlapping with another one. For these access nodes no specific means have to be applied, i.e. an access node of a non-overlapping pool area or a non-overlapping part of a pool area is generally not required to transmit extended system information for multicast services. However, according to one exemplary embodiment, also access nodes in non-overlapping areas may broadcast extended system information as already indicated above. However, in this case the information on tracking area/pool area of the selected user plane entity would never differ from the current tracking area/pool area of the mobile terminal.

In case the access node in non-overlapping areas don't broadcast extended system information, the mobile terminals could interpret the lack of this information as being in a part of the pool area that is not overlapping with another one. Hence, they know that there is no problem with service continuity requiring any action from the mobile terminal.

Taking into account above considerations obviously a mixed operation of overlapping and non-overlapping pool areas may be supported. For example, a mobile terminal entering an overlapping part of the pool area might detect that the multicast user plane is provided from a different pool area and trigger appropriate action. If due to mobility the mobile terminal moves back into a non-overlapping part of its current pool area, no additional action is required, as here the multicast user plane is provided from the mobile terminal's current pool area. If due to mobility the mobile terminal moves to a non-overlapping part of another pool area (than its current pool area), a normal handover procedure may take place. Eventually, the mobile terminal will be attached to the other pool area and in its current location the multicast user plane will always be provided by that.

Some embodiments described above have been based on signaling from the mobile terminal to the respective core network entities. However, this signaling exchange may require an active communication connection between the mobile terminal and the radio network, in order to transport the signaling messages from the mobile terminal to the respective core network entities (i.e. mobility management entity). For mobile terminals in active mode this communication connection might be present. However, for mobile terminals in idle mode it may not be present and may need to be established in the first place. The required procedures consume mobile terminal resources (e.g. battery) as well as radio resources (e.g. for the RRC signaling).

According to a further embodiment of the invention each mobile terminal in an overlapping pool area detecting that the multicast user plane is provided from a different tracking area/pool area than it is currently attached, may trigger the update of service registration at its mobility management entity. However, for a particular mobility management entity this registration at a user plane entity of another pool area is only required once, e.g. when triggered the first time, as no per-mobile terminal registration at the user plane entity is provided. Subsequent trigger messages would be ignored, but still consume scarce resources as described above.

In order to overcome this drawback another embodiment of the invention proposes an enhanced procedure improving the resource utilization. As mentioned above the transmission of the signaling message (see e.g. FIG. 6, notification in step 602) from a mobile terminal to a mobility management entity triggering the update of the service registration requires an active communication connection between the mobile terminal and the radio network, e.g. access node. Therefore, the mobility management entity receiving the trigger message may determine to which access node the mobile terminal is connected. In other words the mobility management entity knows which access node provides the multicast service but established a multicast user plane to a different pool area.

In case at least one mobile terminal triggered an update of service registration from a particular access node, the mobility management entity may inform the access node after successful registration at the user plane entity in the different pool area. The access node may include this information in the broadcasted system information for the multicast service. Thus the extended multicast service information broadcast by the access node may be used to inform the mobile terminals about the tracking area/pool area providing the multicast user plane and additionally which other tracking area/pool area have registered at the service providing tracking area/pool area. Therefore, other mobile terminals may detect even in idle mode that service registration is already updated and do not need to send an additional trigger message, resulting in saved mobile terminal and radio resource.

Figure 9:
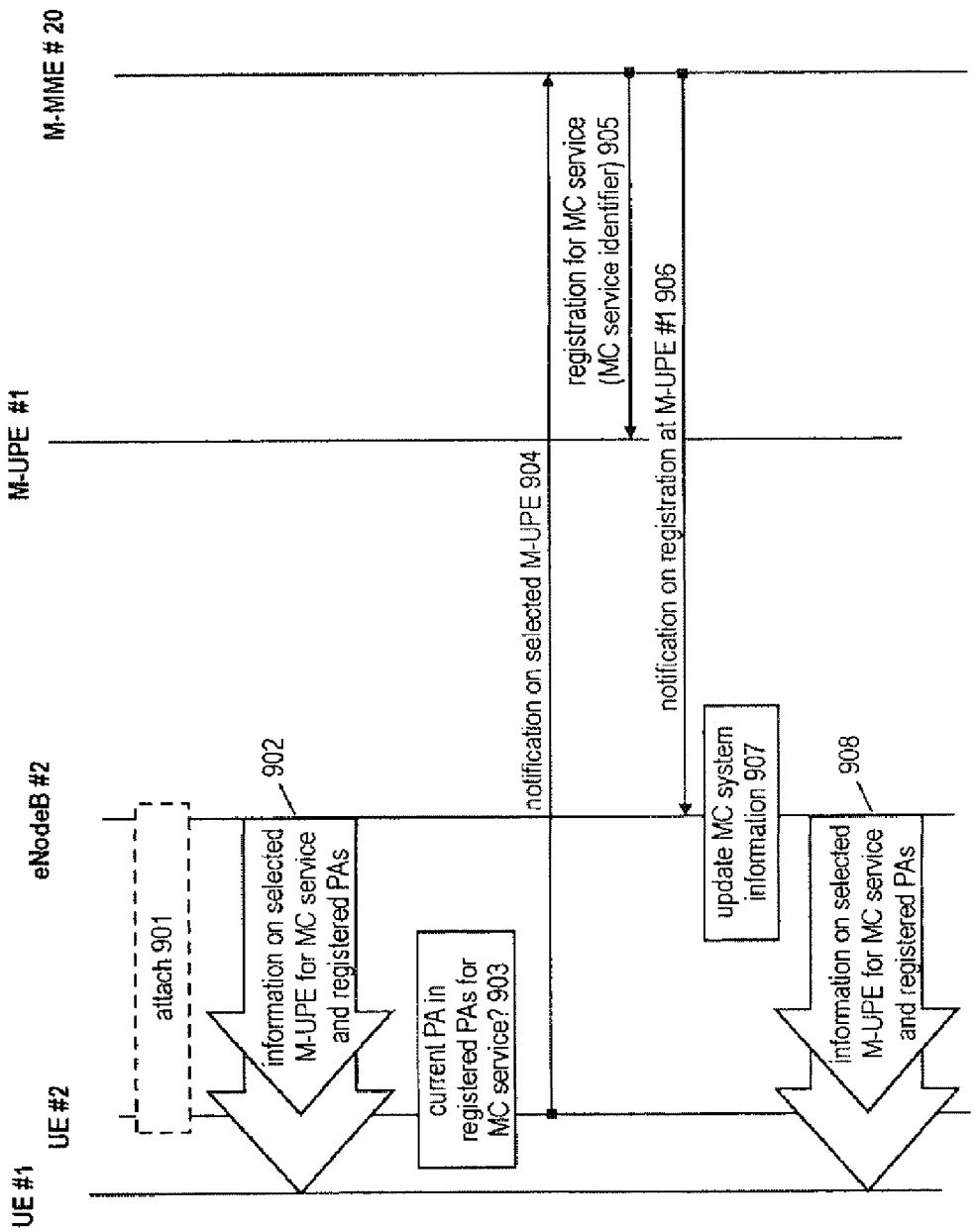
FIG. 9 shows another sequence of exemplary steps in a 3GPP SAE/LTE system for registering a mobility management entity serving a mobile terminal at a user plane entity to which the multicast user plane is established in response to a trigger from the mobile terminal according to an exemplary embodiment of the invention.

According to the exemplary embodiment shown in FIG. 9, a mobile terminal UE #2 attaches 901 to pool Area #2 via access node (eNodeB #2) assigned to pool area #1 and pool area #2 and receives 902 system information including information on multicast services provided by the access node. The multicast service information of a respective provided service in the service area of access node eNodeB #2 may include the information on the tracking area/pool area providing the multicast user plane and additionally which other tracking area/pool area have registered at the service providing tracking area/pool area. Based on this information on the multicast service the mobile node may decide 903 whether a service registration update is required, for example by utilizing the method illustrated in FIG. 12.

Figure 12:
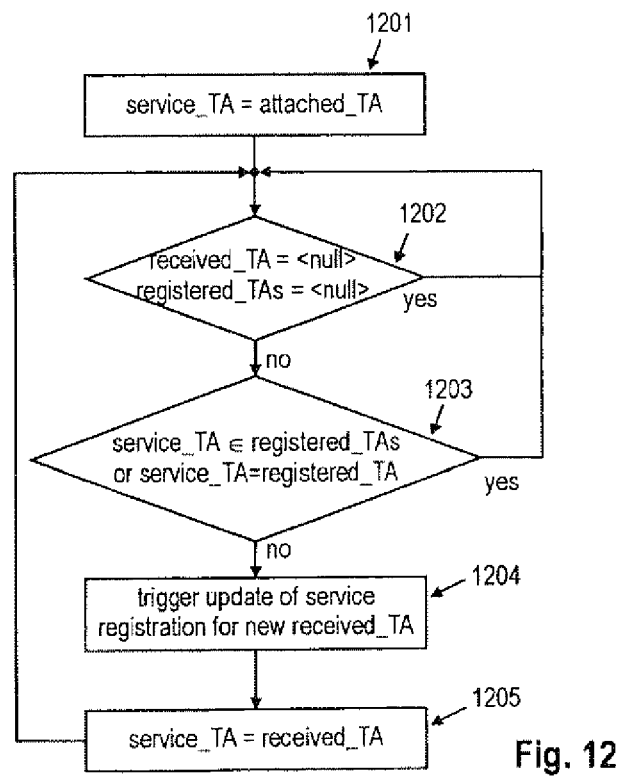
FIG. 12 shows another exemplary flow chart of a procedure in a 3GPP SAE/LTE system performed by a mobile terminal for detecting whether to trigger a registration of its mobility management entity at a user plane entity to which the multicast user plane is established according to an exemplary embodiment of the invention.

FIG. 12 shows a procedure performed at the mobile terminals in order to detect when to trigger an update of the service registration according to one exemplary embodiment of the invention. As for FIG. 7 it may be assumed for exemplary purposes that a tracking area corresponds to a pool area. The procedure may be applicable to mobile terminals in both, idle mode and active mode.

The parameter service_TA again denotes the tracking area/pool area from which service provisioning is expected. Initially this service_TA is set 1201 to the currently attached tracking area/pool area (attached_TA). The mobile terminal may continuously determine 1202 whether it has received multicast service information from the access node to which it is attached. The received_TA as well as the registered_TAs may be decoded from the broadcasted multicast service information. The received_TA may indicate the tracking area/pool area to which the transmitting access node has established the user plane for the multicast service. Further, the registered_TAs may indicate the tracking areas of which mobility management entities have registered at the user plane entity in the tracking area/pool area to which the transmitting access node has established the user plane for the multicast service. By determining 1203 whether service_TA is either equivalent to received_TA or is contained in registered_TAs, the mobile terminal may detect if a service registration update is required or not. If the service_TA may be matched to one of the received parameters no update is necessary. Otherwise the mobile terminal may trigger 1204 an update of the service registration at its mobility management entity and the parameter service_TA may be set 1205 to the received_TA. Generally, the multicast service provisioning is expected from currently attached tracking area/pool area of the mobile terminal. If the mobile terminal detects that this is not the case, the procedure applies. The procedure may continue during the entire multicast service reception and may be re-initiated after each handover to another administrative area including a tracking area update procedure.

Returning to FIG. 9, the mobile terminal may trigger 904 an update of service registration at its mobility management entity M-MME #20 depending on the evaluation in step 903. The mobility management entity M-MME #20 may send 905 a registration to the user plane entity M-UPE #1 in response to the notification from the mobile terminal UE #2. The notification in step 904 may indicate the multicast service (multicast service identifier) for which a registration is required an may further either indicate the pool area to which the multicast user plane for the multicast service has been established, or an identifier (e.g. IP address) of the user plane entity M-UPE #1. If the pool area is indicated mobility management entity M-MME #20 may resolve the identifier of the user plane entity M-UPE #1 therefrom. After successful registration at the user plane entity M-UPE #1 in pool area #1, the mobility management entity M-MME #20 in pool area #2 may inform 906 the access node eNodeB #2 on the registration. This access node may update 907 the multicast service information (e.g. service provided by pool area #1, pool area #2 registered at pool area #1) and may include the updated information in the broadcasted system information. Subsequent mobile terminals reading 908 the updated system information can derive that an update of service registration already took place and would not send an additional trigger message.

Some of the embodiments described herein particularly focus on mobile terminals in idle mode. Of course also mobile terminals in active mode might hand over to an access node in an overlapping pool area during an ongoing multicast service. In case the multicast user plane is provided from another pool area than the mobile terminal is attached to, a similar situation occurs as already described above.

In contrast to mobile terminals in idle mode, mobile terminals in active mode may be typically known to the access node because they maintain an active communication connection to the network. This knowledge on the mobile terminal may also comprise information about the mobile terminals current pool area, which may be for example stored in mobile terminal context information at the access node. For example, in a cellular environment the radio network typically controls the handover for mobile terminals in active mode. In this case the access node to which the mobile terminal is currently connected is called the source node and the access node to which the mobile terminal should handover is called the target access node.

According to another embodiment of the invention, after the handover is performed, the target access node may send a notification, e.g. HO Complete message, to the respective mobility-handling core network entity, e.g. mobility management entity, in order to inform same about the new location of the mobile terminal. Using the stored context information on the mobile terminal, the target access node may detect if the pool area providing the multicast service is different to the pool area of the mobile terminal. In this case, the target access node could add information on the selected user plane entity for the multicast service and the user plane entity's tracking area/pool area in the HO Complete message to the mobility management entity. This additional information may trigger the mobility management entity to update the service registration at the user plane entity in the different pool area.

Before the actual handover is performed, i.e. that the mobile terminal connects to the target access node, there may also be some information exchanged between the source and the target nodes, e.g. HO Request message. This information may also comprise information about the currently requested (multicast) service(s) in order to allow the target access node to assess, if the service(s) could be further provided in the service area of the target access node. The target access node knows which multicast services are provided in its service area and the respective user plane configuration of the services. Therefore, it is already possible at reception of the HO Request to determine at the target access node whether a trigger for the update of service registration at the mobility management entity for a multicast service indicated to be received by the mobile terminal in handover is required or not.

In any case, the required message triggering the update of service registration at the mobility management entity can be integrated with the signaling messages required for active mode mobility. Therefore, in combination with the solution and enhancement described above, it might not be required for idle mode mobile terminals to trigger the procedure, resulting in better utilization of mobile terminal and network resources.

Figure 10:
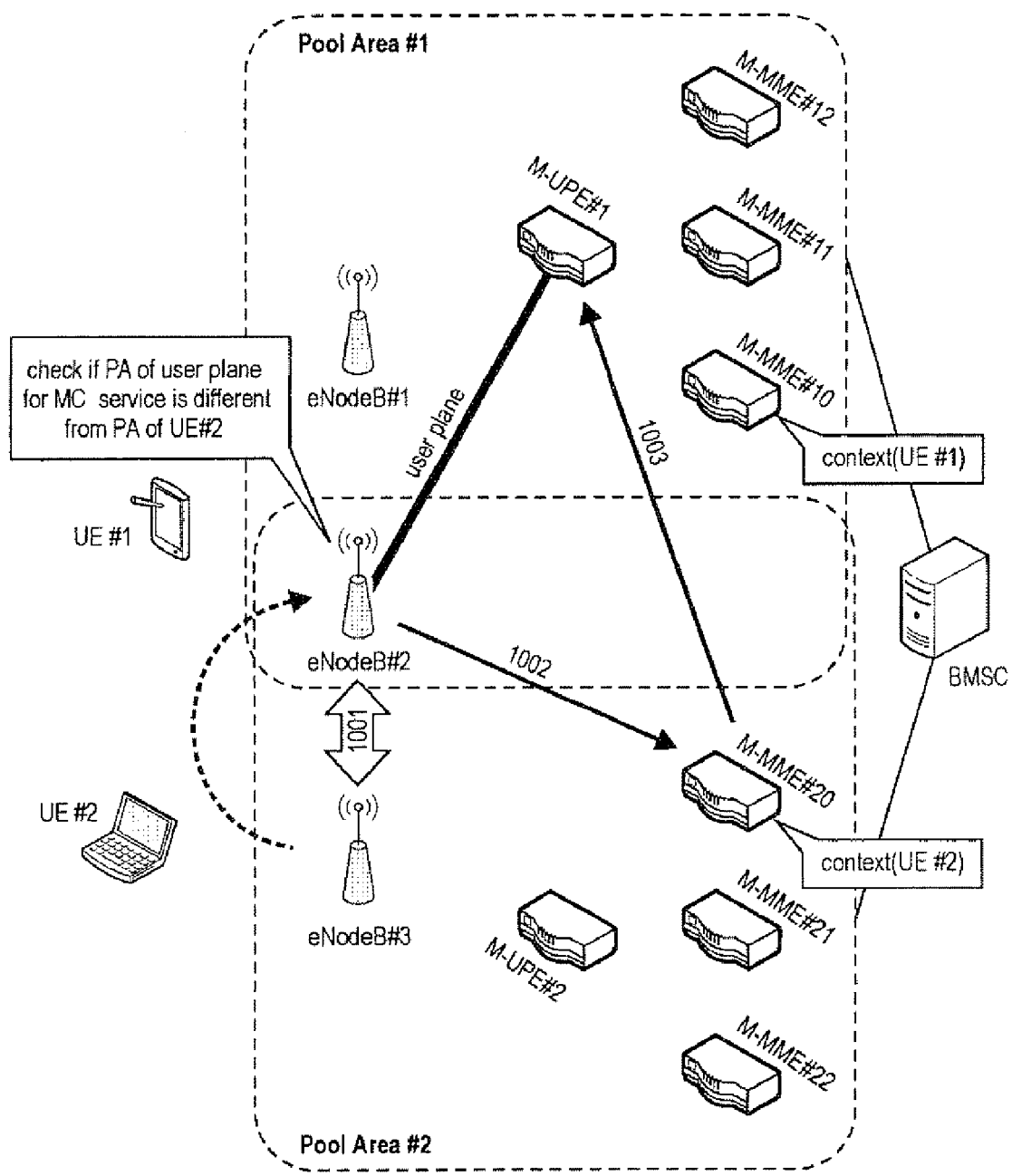
FIG. 10 shows a sequence of exemplary steps in a 3GPP SAE/LTE system for registering a mobility management entity serving a mobile terminal at a user plane entity to which the multicast user plane is established in response to a trigger from an access node to which the mobile terminal is handed over according to an exemplary embodiment of the invention.

FIG. 10 shows the triggering of a multicast service registration by a target access node upon handover of a mobile terminal according to an exemplary embodiment of the invention. In this example the mobile terminal UE #2 attached to pool area #2 is considered to be in active mode, when handing over from the source access node eNodeB #3 to the target access node eNodeB #2 in the overlapping pool area. As described before in the signaling 1001 between source access node and target access node during the handover procedure the source access node provides the target access node with service information on the service(s) of the mobile terminal UE #2, e.g. as part of a transfer of UE context information. This service information also identifies the multicast service received by the mobile terminal and on the user plane configuration thereof (including the pool area of the user plane). The target access node may check its context information on the multicast service, for example including the multicast user plane configuration of the multicast service in the service area of the target access node. If the user plane configuration in the target access node's context and the user plane configuration received for the multicast service from the source access node do not match, the target access node may trigger 1002 an update of the service registration at mobility management entity M-MME #20 of pool area #2. Alternatively, the target access node may compare the current pool area of the mobile terminal which might be indicated in the transferred UE context information to the pool area providing the multicast service which might be derived from stored context information on the multicast service. If the current pool area of the mobile terminals does not match the pool area providing the multicast service, the target access node may trigger 1002 an update of the service registration at mobility management entity M-MME #20 of pool area #2.

According to the notification the mobility management entity M-MME #20 may register 1003 for the multicast service at user plane entity M-UPE #1 of pool area #1, after having resolved an identifier of the user plane entity M-UPE #1 from the pool area information contained in the notification or based on the identifier of the user plane entity M-UPE #1 contained in the notification (step 1002) from the target access node.

Most embodiments described above relate to an ongoing multicast service. In other words the procedures might take place when the service is already started. However, in some situations it might be possible to update the service registration already during the service start phase. This might be the case when multiple mobile terminals are connected to the same access node in an overlapping pool area but activate the same multicast service at mobility management entities in different pool areas.

As already mentioned above, in this case the access node in the overlapping pool area may receive multiple session start messages for the same service from different pool areas. The access node may select one and sends an ACK for the selected session start message and NACKs the other ones. Obviously, the mobility management entities receiving (or being informed on) a rejection of the multicast session start message are potentially required to perform an update of the service registration during the service transmission later. Therefore, according to another embodiment of the invention, it might be advantageous to perform the registration update already when receiving (or being informed on) the rejection message.

Figure 11:
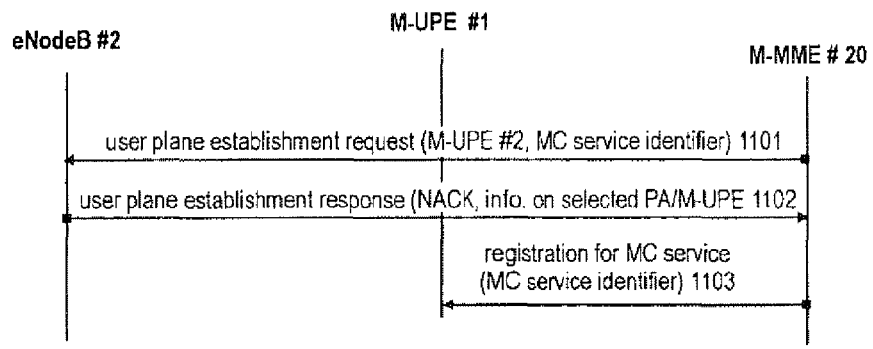
FIG. 11 shows a sequence of exemplary steps in a 3GPP SAE/LTE system for registering a mobility management entity serving a mobile terminal at a user plane entity to which the multicast user plane is established in response to a trigger from an access node according to an exemplary embodiment of the invention.

FIG. 11 shows the procedure for registering a mobility management entity at a user plane entity of a pool area other than that of the mobility management entity according to an exemplary embodiment of the invention. In a first step, a mobility management entity M-MME #20 of pool area #2 transmits 1101 a user plane establishment request for a multicast service to an access node eNodeB #2 in the overlapping part of the pool areas #1 and #2. Assuming that the access node has decided to establish the multicast user plane for the service to a user plane entity of pool area #1, it may respond 1102 with a NACK message including information about the selected user plane entity and/or its tracking area/pool area. Receiving the NACK message may in turn trigger the mobility management entity MME #20 to register 1103 at the user plane entity M-UPE #1 in the different pool area.

In combination with the different embodiments described above, the access node in the overlapping area may instantly broadcast extended system information for the multicast service, comprising information about the selected user plane entity and its pool area providing the multicast user plane and which other tracking area/pool area have registered there. Due to this, it might not be required for an idle mode mobile terminal to trigger the update of service registration during an ongoing service, resulting in better utilization of mobile terminal and network resources.

The exemplary embodiments described herein have been mainly focused on a cellular mobile network architecture using specific protocols, like a SAE/LTE system standardized in 3GPP. Accordingly, the mobility management entity may for example correspond the MME of a 3GPP-based SAE/LTE system and the user plane entity may be a UPE providing the user plane for a multicast service, e.g. a MBMS service. Of course, a UPE may not only be responsible for one single multicast service but could for example also provide the user plane for several multicast services and/or other dedicated and/or broadcast services.

Similarly, an access node may for example be an eNodeB in the 3GPP-based SAE/LTE system.

However, the aspects of the invention as described in the various embodiments above may also apply to other mobile communications networks utilizing an architecture and protocols as standardized in the IETF (Internet Engineering Task Force).

In particular the invention is related to a system using IP Mobility Support for IPv4 (MIPv4) as standardized in RFC 3344, "Mobility Support for IPv4" (available at http://www.ietf.org and incorporated herein by reference). This RFC introduces several functional entities to IPv4-based networks to enable user mobility. The first is a Mobile Node (MN), which is a host or router that changes its point of attachment from one network or subnetwork to another. Another MIPv4 specific entity is a Home Agent (HA), which may be considered a router on a mobile node's home network which tunnels datagrams for delivery to the mobile node when the mobile node is away from home, and maintains current location information for the mobile node. Finally a Foreign Agent (FA) is introduced in MIPv4, which is a router on a mobile node's visited network which provides routing services to the mobile node while registered.

With respect to above described concepts subject to the different embodiments of the invention, the home agent may be considered to provide similar functions as the core network entities of a 3GPP-based SAE/LTE system. Hence, in one embodiment, the mobility management entity and user plane entity may be considered to be corresponding to a home agent. Accordingly, one embodiment of the invention foresees that a home agent of a mobile terminal in a first network may register for a multicast service at another home agent of another network. Similarly, a pool area or tracking area may thus be similar to the network (identified by a given prefix of the IPv4 addresses defined in the network) served by a home agent or a foreign agent respectively. Obviously, one or more home agents and one or more foreign agents could be present in a single pool area/tracking area.

Further, the foreign agent may be considered to have a function corresponding to same of the access node in the various embodiments described herein. In MIPv4, a care-of address (CoA) denotes the termination point of a tunnel toward a mobile node, for datagrams forwarded to the mobile node while it is away from home. The MIPv4 protocol can use two different types of care-of address, whereas the type of "foreign agent care-of address" using an address of a foreign agent with which the mobile node is registered, is most relevant to this invention.

In accordance with another embodiment of the invention the following scenario may be considered for exemplary purposes. Two or more mobile nodes may request the same multicast service, e.g. may register their home address at the same server providing the multicast service. All mobile nodes may further be considered to be attached to the same (foreign) network and using the same foreign agent. However, at least two mobile nodes may have different home networks (i.e. are served by different home agents).

In this scenario each home agent tunnels the same multicast service to the foreign agent. So the foreign agent receives the same service data multiple times via the different tunnels. As the foreign agent can compare the service data received from different home agents it is able to detect same services. Obviously the data would be needed just once and could be replicated in the foreign agent for transmission to each mobile node. This may allow for saving resources in the network between the foreign agent and the home agents.

Therefore, an optimization might be that the foreign agent just uses one tunnel to one of the home agent and terminates the other ones.

In case the mobile node to which the remaining tunnel is associated is leaving the service, e.g. because service reception is terminated at the mobile node or the mobile node moves to another network, the tunnel between the foreign agent and the home agent is terminated. This would result in loss of service for the other mobile nodes that activated the same multicast service. In order to overcome this problem, one embodiment of the invention proposes that a foreign agent applying the described optimization for multicast services could indicate information about the selected tunnel and respectively the selected home agent to the connected mobile nodes, e.g. by including this information into its agent advertisements. In case a mobile node receives this indication, it could trigger its home agent to notify or register at the other home agent. This way the tunnel could be kept even if the respective mobile node is no longer present and service continuity is achieved for the other mobile nodes.

In most embodiments described herein reference to pool areas and tracking areas has been frequently made. In this respect it should be further noted that mobile communications systems typically support different states for the mobile terminals usually called active and idle. During the active state, the mobile terminals maintain active communication channels with the network and are able to receive and transmit data. However, the maintenance of these communication channels usually consumes a lot of scarce battery resources, even in cases the mobile terminal do not have any data for reception or transmission. In order to avoid this unnecessary drain of battery power from the mobile terminals in such cases, the mobile terminals may transit to the idle state. In this state the mobile terminal is typically still registered in the mobile network, but does not actively maintain communication channels. In order to transmit or receive data it has to transit to the active state first. In contrast to the active state, the terminal's location may not be specifically known in the idle state. So in case the network receives some data for transmission to the mobile terminal it has to locate it in the first place and command it to transit to the active state. This procedure is typically called paging.

Of course it is possible for the mobile terminal to move while being in the idle state. As the network does not know the location of the terminal, the paging has to be performed in the entire network in the worst case. In order to limit this signaling effort mobile communications networks typically configure some administrative areas often called tracking area (TA). Mobile terminals in the idle state are known on this tracking area level. In case they move out of such an area, they would notify this to the network, e.g. using a tracking area update procedure.

In a 3GPP SAE/LTE system the entity that controls roaming activities of a mobile terminal across tracking areas within a pool area and across pool areas is the mobility management entity. Moreover, one mobility management entity pool is expected to require mapping information between tracking area IDs and cells in this tracking area for a particular geographical area. In other words, a pool area might comprise one or more tracking areas, but a mobility management entity may know which tracking areas belong to its own pool area. Therefore, it can derive whether a multicast service is provided in another pool area from tracking area information.

Accordingly, in another embodiment of the invention, all procedures where the mobility management entity has been informed on a pool area may also utilize information on a particular tracking area, as this information may be sufficient for the mobility management entity to identify network entities (such as a user plane entity for multicast services) in another pool area. Accordingly, in those procedures information on the tracking area may be provided to the mobility management entity instead of information on the pool area.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for establishing a user plane between a user plane entity and different access nodes assigned to different pool areas simultaneously for multicast or broadcast service provision, the method comprising:
receiving at a respective access node assigned to the different pool areas simultaneously plural session start messages indicating different user plane entities of the different pool areas,
selecting by a respective access node assigned to the different pool areas simultaneously one user plane entity out of the indicated user plane entities indicated in the session start messages based on a selection rule common to all access nodes assigned to the different pool areas simultaneously, wherein the selection rule ensures that the access nodes assigned to different pool areas simultaneously select the same user plane entity out of one of the different pool areas, and
establishing by the access nodes a respective user plane to the same selected user plane entity for multicast or broadcast service provision.

2. The method according to claim 1, wherein the service start messages received at the access nodes assigned to the different pool areas for the multicast or broadcast service comprise a common service identifier identifying the multicast or broadcast service.

3. The method according to claim 1, further comprising tunneling service data of the multicast or broadcast service from the selected user plane entity to the respective access nodes assigned to the different pool areas via the established user plane.

4. The method according to claim 1, wherein the session start messages are received from mobility management entities of the different pool areas, wherein the mobility management entities serve mobile terminals to receive the multicast or broadcast service in respective ones of the different pool areas.

5. The method according to claim 4, further comprising transmitting a positive acknowledgement from a respective access node having received session start messages for the multicast or broadcast service to a mobility management entity having indicated the selected user plane entity in its session start message.

6. The method according to claim 4, further comprising notifying the mobility management entities having transmitted a session start message indicating an un-selected user plane entity on the selected user plane entity.

7. The method according to claim 6, wherein the notification is transmitted either by a respective access node having received session start messages for the multicast or broadcast service, or together with or in a negative acknowledgment transmitted by an access node to a mobility management entity in response to receiving a session start message from the mobility management entity.

8. The method according to claim 6, wherein the notification includes an identifier of the selected user plane entity or identifies the pool area of the selected user plane entity.

9. The method according to claim 1, further comprising delaying by a respective access node the selection of the user plane entity to establish a user plane to a configurable time interval.

10. The method according to claim 9, wherein the time interval is based on the round trip time of data exchanged between an access node and respective mobility management entities with which the access node is capable of communicating.

11. The method according to claim 9, wherein the time interval is set to the highest round trip time of data exchanged between an access node and respective mobility management entities with which the access node is capable of communicating.

12. The method according to claim 11, wherein the time interval is set to the highest round trip time of data exchanged between an access node and respective mobility management entities with which the access node is capable of communicating plus an additional processing delay of the mobility management entities.

13. A method for establishing a user plane between a user plane entity and different access nodes in an overlap region of overlapping pool areas for multicast or broadcast service provision, the method comprising:
determining by mobility management entities of different at least partly overlapping pool areas that are serving mobile terminals in the different pool areas a user plane entity of one of the pool areas to which access nodes of the overlapping part of the different pool areas are to establish a user plane for a multicast or broadcast service to be provided to the mobile terminals, and
transmitting at least one message to a respective one of the access nodes of the overlapping part of the different pool areas that is explicitly or implicitly identifying the user plane entity to which the user plane is to be established.

14. The method according to claim 13, wherein the determination of the user plane entity to which the user plane is to be established is either triggered by a mobility management entity upon receiving a service activation message for the multicast or broadcast service, or triggered by a notification from an access node indicating that session start messages for the same multicast or broadcast service identifying different user plane entities have been received, and the at least one message is transmitted in response to the notification.

15. An access node for establishing a user plane between a user plane entity and the access node wherein the access node is assigned to different pool areas simultaneously for multicast or broadcast service provision, the access node comprising:
 a communication unit for receiving plural session start messages indicating different user plane entities of the different pool areas, and
 a processing unit for selecting one user plane entity out of the indicated user plane entities indicated in the session start messages based on a selection rule common to all access nodes assigned to the different pool areas simultaneously,
 wherein the selection rule ensures that all access nodes assigned to different pool areas simultaneously select the same user plane entity out of one of the different pool areas, and the communication unit is adapted to establish by the access nodes a respective user plane to the same selected user plane entity for multicast or broadcast service provision.

16. An access node for establishing a user plane between a user plane entity and the access node wherein the access node is assigned to different pool areas simultaneously for multicast or broadcast service provision, the access node comprising:
 a receiver that receives from different mobility management entities of the different pool areas session start messages indicating different user plane entities of the different pool areas, and
 a transmitter that transmits a notification indicating that session start messages for the same multicast or broadcast service identifying different user plane entities have been received, to at least one of the different mobility management entities,
 wherein the receiver is adapted to receive in response to the notification a message indicating a user plane entity of one of the different pool areas, and wherein the access node is adapted to establish a user plane to the indicated user plane entity for multicast or broadcast service provision.

17. A mobility management entity for establishing a user plane between a user plane entity and different access nodes located in an overlap region of overlapping pool areas for multicast or broadcast service provision, the mobility management entity comprising:
 a processing unit that determines a user plane entity of one of different pool areas to which access nodes of the overlapping part of the different pool areas are to establish a user plane for a multicast or broadcast service to be provided to mobile terminals served by the mobility management entity, and
 a communication unit that transmits a message to a respective one of the access nodes of the overlapping part of the different pool areas that is explicitly or implicitly identifying the user plane entity to which the user plane is to be established.

18. A non-transitory computer readable medium for storing instructions that, when executed by a processor of an access node, cause the access node to establish a user plane between a user plane entity and the access node wherein the access node is assigned to different pool areas simultaneously for multicast or broadcast service provision, by:
 receiving plural session start messages indicating different user plane entities of the different pool areas,
 selecting one user plane entity out of the indicated user plane entities indicated in the session start messages based on a selection rule common to all access nodes assigned to the different pool areas simultaneously, wherein the selection rule ensures that all access nodes assigned to different pool areas simultaneously select the same user plane entity out of one of the different pool areas, and
 establishing by the access nodes a respective user plane to the same selected user plane entity for multicast or broadcast service provision.

19. A non-transitory computer readable medium for storing instructions that, when executed by a processor of an access node, cause the access node to establish a user plane between a user plane entity and the access node wherein the access node is assigned to different pool areas simultaneously for multicast or broadcast service provision, by:
 receiving from different mobility management entities of the different pool areas session start messages indicating different user plane entities of the different pool areas,
 transmitting a notification indicating that session start messages for the same multicast or broadcast service identifying different user plane entities have been received, to at least one of the different mobility management entities,
 receiving in response to the notification a message indicating a user plane entity of one of the different pool areas, and
 establishing a user plane to the indicated user plane entity for multicast or broadcast service provision.

20. A non-transitory computer readable medium storing instruction that, when executed by a mobility management entity, cause the mobility management entity to establish a user plane between a user plane entity and different access nodes located in an overlap region of overlapping pool areas for multicast or broadcast service provision, by:
 determining a user plane entity of one of different pool areas to which access nodes of the overlapping part of the different pool areas are to establish a user plane for a multicast or broadcast service to be provided to mobile terminals served by the mobility management entity, and
 transmitting a message to a respective one of the access nodes of the overlapping part of the different pool areas that is explicitly or implicitly identifying the user plane entity to which the user plane is to be established.

* * * * *